US008533002B2

(12) United States Patent
Mesaros

(10) Patent No.: US 8,533,002 B2
(45) Date of Patent: Sep. 10, 2013

(54) DAS PREDICTIVE MODELING AND REPORTING FUNCTION

(75) Inventor: Gregory J. Mesaros, Tampa, FL (US)

(73) Assignee: eWinWin, Inc., Tampa, FL (US)

( * ) Notice: Subject to any disclaimer, the term of this patent is extended or adjusted under 35 U.S.C. 154(b) by 465 days.

(21) Appl. No.: 13/017,961

(22) Filed: Jan. 31, 2011

(65) Prior Publication Data
US 2011/0125592 A1    May 26, 2011

Related U.S. Application Data

(63) Continuation of application No. 10/464,585, filed on Jun. 18, 2003, now Pat. No. 7,899,707.

(60) Provisional application No. 60/389,534, filed on Jun. 18, 2002.

(51) Int. Cl.
G06Q 30/02    (2012.01)
G06Q 10/10    (2012.01)
G06Q 10/06    (2012.01)
G06Q 30/06    (2012.01)
G06Q 10/08    (2012.01)

(52) U.S. Cl.
USPC .......................................................... 705/1.1

(58) Field of Classification Search
None
See application file for complete search history.

(56) References Cited

U.S. PATENT DOCUMENTS

| | | | |
|---|---|---|---|
| 4,789,928 A | 12/1988 | Fujisaki | |
| 4,799,156 A | 1/1989 | Shavit et al. | |
| 4,887,207 A | 12/1989 | Natarajan | |
| 4,947,028 A | 8/1990 | Gorog | |
| 4,992,940 A | 2/1991 | Dworkin | |
| 5,053,956 A | 10/1991 | Donald et al. | |
| 5,053,957 A | 10/1991 | Suzuki | |
| 5,063,506 A | 11/1991 | Brockwell et al. | |
| 5,402,336 A | 3/1995 | Spiegelhoff et al. | |
| 5,414,838 A | 5/1995 | Kolton et al. | |
| 5,444,630 A | 8/1995 | Dlugos | |
| 5,564,115 A | 10/1996 | Clarkson | |
| 5,592,375 A | 1/1997 | Salmon et al. | |
| 5,615,109 A | 3/1997 | Eder | |
| 5,623,660 A | 4/1997 | Josephson | |
| 5,664,115 A | 9/1997 | Fraser | |
| 5,689,652 A | 11/1997 | Lupien et al. | |
| 5,710,887 A | 1/1998 | Chelliah et al. | |
| 5,717,989 A | 2/1998 | Tozzoli et al. | |
| 5,732,400 A | 3/1998 | Mandler et al. | |

(Continued)

FOREIGN PATENT DOCUMENTS

| | | |
|---|---|---|
| JP | 11-184910 | 7/1999 |
| WO | 9821713 | 5/1998 |

(Continued)

OTHER PUBLICATIONS

OA dated Nov. 17, 2011 for U.S. Appl. No. 09/922,884, 13 pages.

(Continued)

Primary Examiner — Jonathan Ouellette
(74) Attorney, Agent, or Firm — Lewis and Roca LLP

(57) ABSTRACT

A system and method facilitating the management of current and prospective customers and customer information is provided. The invention includes an aggregation system adapted to provide management and generation of current and prospective customers. The invention further provides management of current and prospective customer information. Additionally, the aggregation system provides for generating advertisements based at least in part upon market information. Finally, the present invention also includes a printstream aggregation method facilitating the printing of print orders.

20 Claims, 26 Drawing Sheets

(56) References Cited

U.S. PATENT DOCUMENTS

| | | |
|---|---|---|
| 5,734,890 A | 3/1998 | Case et al. |
| 5,794,207 A | 8/1998 | Walker et al. |
| 5,797,127 A | 8/1998 | Walker et al. |
| 5,822,736 A | 10/1998 | Hartman et al. |
| 5,826,244 A | 10/1998 | Huberman |
| 5,835,896 A | 11/1998 | Fisher et al. |
| 5,837,071 A | 11/1998 | Andersson et al. |
| 5,842,178 A | 11/1998 | Giovannoli |
| 5,845,265 A | 12/1998 | Woolston |
| 5,850,442 A | 12/1998 | Muftic |
| 5,870,721 A | 2/1999 | Norris |
| 5,878,400 A | 3/1999 | Carter, III |
| 5,884,271 A | 3/1999 | Pitroda |
| 5,890,138 A | 3/1999 | Godin et al. |
| 5,897,620 A | 4/1999 | Walker et al. |
| 5,903,830 A | 5/1999 | Joao et al. |
| 5,923,741 A | 7/1999 | Wright et al. |
| 5,933,817 A | 8/1999 | Hucal |
| 5,940,807 A | 8/1999 | Purcell |
| 5,945,653 A | 8/1999 | Walker et al. |
| 5,950,172 A | 9/1999 | Klingman |
| 5,960,411 A | 9/1999 | Hartman et al. |
| 5,966,697 A | 10/1999 | Fergerson et al. |
| 5,970,478 A | 10/1999 | Walker et al. |
| 5,974,396 A | 10/1999 | Anderson et al. |
| 5,974,406 A | 10/1999 | Bisdikian et al. |
| 5,987,434 A | 11/1999 | Libman |
| 5,995,943 A | 11/1999 | Bull et al. |
| 5,999,915 A | 12/1999 | Nahan et al. |
| 6,014,638 A | 1/2000 | Burge et al. |
| 6,016,484 A | 1/2000 | Williams et al. |
| 6,026,383 A | 2/2000 | Ausubel |
| 6,032,136 A | 2/2000 | Brake et al. |
| 6,035,289 A | 3/2000 | Chou et al. |
| 6,052,670 A | 4/2000 | Johnson |
| 6,055,519 A | 4/2000 | Kennedy et al. |
| 6,055,573 A | 4/2000 | Gardenswartz et al. |
| 6,064,981 A | 5/2000 | Barni et al. |
| 6,078,906 A | 6/2000 | Huberman |
| 6,101,484 A | 8/2000 | Halbert et al. |
| 6,108,632 A | 8/2000 | Reeder et al. |
| 6,108,639 A | 8/2000 | Walker et al. |
| 6,112,185 A | 8/2000 | Walker et al. |
| 6,112,189 A | 8/2000 | Rickard et al. |
| 6,131,087 A | 10/2000 | Luke et al. |
| 6,141,653 A | 10/2000 | Conklin et al. |
| 6,151,588 A | 11/2000 | Tozzoli et al. |
| 6,154,738 A | 11/2000 | Call |
| 6,167,383 A | 12/2000 | Henson |
| 6,195,646 B1 | 2/2001 | Grosh et al. |
| 6,219,653 B1 | 4/2001 | O'Neill et al. |
| 6,233,566 B1 | 5/2001 | Levine et al. |
| 6,236,972 B1 | 5/2001 | Shkedy |
| 6,236,977 B1 | 5/2001 | Verba et al. |
| 6,236,978 B1 | 5/2001 | Tuzhilin |
| 6,249,772 B1 | 6/2001 | Walker et al. |
| 6,253,189 B1 | 6/2001 | Feezell et al. |
| 6,260,019 B1 | 7/2001 | Courts |
| 6,260,024 B1 | 7/2001 | Shkedy |
| 6,266,651 B1 | 7/2001 | Woolston |
| 6,269,343 B1 | 7/2001 | Pallakoff |
| 6,289,348 B1 | 9/2001 | Richard et al. |
| 6,323,894 B1 | 11/2001 | Katz |
| 6,327,574 B1 | 12/2001 | Kramer et al. |
| 6,332,127 B1 | 12/2001 | Bandera et al. |
| 6,332,135 B1 | 12/2001 | Conklin et al. |
| 6,336,105 B1 | 1/2002 | Conklin et al. |
| 6,338,050 B1 | 1/2002 | Conklin et al. |
| 6,360,205 B1 | 3/2002 | Iyengar et al. |
| 6,397,208 B1 | 5/2002 | Lee |
| 6,415,270 B1 | 7/2002 | Rackson et al. |
| 6,418,415 B1 | 7/2002 | Walker et al. |
| 6,418,441 B1 | 7/2002 | Call |
| 6,449,601 B1 | 9/2002 | Friedland et al. |
| 6,450,407 B1 | 9/2002 | Freeman et al. |
| 6,456,986 B1 | 9/2002 | Boardman et al. |
| 6,466,919 B1 | 10/2002 | Walker et al. |
| 6,496,568 B1 | 12/2002 | Nelson |
| 6,505,046 B1 | 1/2003 | Baker |
| 6,507,279 B2 | 1/2003 | Loof |
| 6,510,434 B1 | 1/2003 | Anderson et al. |
| 6,519,571 B1 | 2/2003 | Guheen et al. |
| 6,553,346 B1 | 4/2003 | Walker et al. |
| 6,553,350 B2 | 4/2003 | Carter |
| 6,560,501 B1 | 5/2003 | Walser et al. |
| 6,578,014 B1 | 6/2003 | Murcko, Jr. |
| 6,584,451 B1 | 6/2003 | Shoham et al. |
| 6,587,835 B1 | 7/2003 | Treyz et al. |
| 6,598,026 B1 | 7/2003 | Ojha et al. |
| 6,601,043 B1 | 7/2003 | Purcell |
| 6,604,089 B1 | 8/2003 | Van Horn et al. |
| 6,606,603 B1 | 8/2003 | Joseph et al. |
| 6,606,607 B1 | 8/2003 | Martin et al. |
| 6,607,136 B1 | 8/2003 | Atsmon et al. |
| 6,631,356 B1 | 10/2003 | Van Horn et al. |
| 6,647,257 B2 | 11/2003 | Owensby |
| 6,647,373 B1 | 11/2003 | Carlton-Foss |
| 6,658,093 B1 | 12/2003 | Langseth et al. |
| 6,662,194 B1 | 12/2003 | Joao et al. |
| 6,705,520 B1 | 3/2004 | Pitroda et al. |
| 6,716,101 B1 | 4/2004 | Meadows et al. |
| 6,754,636 B1 | 6/2004 | Walker et al. |
| 6,769,607 B1 | 8/2004 | Pitroda et al. |
| 6,778,968 B1 | 8/2004 | Gulati |
| 6,782,370 B1 | 8/2004 | Stack |
| 6,785,661 B1 | 8/2004 | Mandler et al. |
| 6,847,938 B1 | 1/2005 | Moore |
| 6,847,965 B2 | 1/2005 | Walker et al. |
| 6,850,907 B2 | 2/2005 | Lutnick et al. |
| 6,868,392 B1 | 3/2005 | Ogasawara |
| 6,871,140 B1 | 3/2005 | Florance et al. |
| 6,871,190 B1 | 3/2005 | Seymour et al. |
| 6,876,974 B1 | 4/2005 | Marsh et al. |
| 6,876,977 B1 | 4/2005 | Marks |
| 6,876,982 B1 | 4/2005 | Lancaster |
| 6,876,983 B1 | 4/2005 | Goddard |
| 6,877,655 B1 | 4/2005 | Robertson et al. |
| 6,877,665 B2 | 4/2005 | Challa et al. |
| 6,915,275 B2 | 7/2005 | Banerjee et al. |
| 6,925,446 B2 | 8/2005 | Watanabe |
| 6,928,416 B1 | 8/2005 | Bertash |
| 6,934,690 B1 | 8/2005 | Van Horn et al. |
| 6,954,734 B1 | 10/2005 | Kuelbs et al. |
| 6,985,879 B2 | 1/2006 | Walker et al. |
| 6,990,467 B1 | 1/2006 | Kwan |
| 6,992,794 B2 | 1/2006 | Keane et al. |
| 7,013,286 B1 | 3/2006 | Aggarwal et al. |
| 7,039,603 B2 | 5/2006 | Walker et al. |
| 7,047,206 B1 | 5/2006 | Schultze |
| 7,062,452 B1 | 6/2006 | Lotvin et al. |
| 7,065,494 B1 | 6/2006 | Evans |
| 7,069,228 B1 | 6/2006 | Rose et al. |
| 7,072,849 B1 | 7/2006 | Filepp et al. |
| 7,072,853 B2 | 7/2006 | Shkedi |
| 7,076,447 B1 | 7/2006 | Peyser et al. |
| 7,080,030 B2 | 7/2006 | Eglen et al. |
| 7,082,408 B1 | 7/2006 | Baumann et al. |
| 7,103,565 B1 | 9/2006 | Vaid |
| 7,107,225 B1 | 9/2006 | McClung, III |
| 7,107,226 B1 | 9/2006 | Cassidy et al. |
| 7,120,592 B1 | 10/2006 | Lewis |
| 7,124,099 B1 | 10/2006 | Mesaros |
| 7,124,107 B1 | 10/2006 | Pishevar et al. |
| 7,133,835 B1 | 11/2006 | Fusz et al. |
| 7,143,057 B2 | 11/2006 | Kuelbs et al. |
| 7,146,330 B1 | 12/2006 | Alon et al. |
| 7,165,045 B1 | 1/2007 | Kim-E |
| 7,181,419 B1 | 2/2007 | Mesaros |
| 7,194,427 B1 | 3/2007 | Van Horn et al. |
| 7,194,442 B1 | 3/2007 | Flanagan et al. |
| 7,213,754 B2 | 5/2007 | Eglen et al. |
| 7,240,021 B1 | 7/2007 | Walker et al. |
| 7,243,082 B1 | 7/2007 | Forlai |
| 7,254,833 B1 | 8/2007 | Cornelius et al. |

| Patent Number | Date | Inventor |
|---|---|---|
| 7,263,498 B1 | 8/2007 | Van Horn et al. |
| 7,263,505 B1 | 8/2007 | Forlai |
| 7,296,001 B1 | 11/2007 | Ephrati et al. |
| 7,330,826 B1 | 2/2008 | Porat et al. |
| 7,343,317 B2 | 3/2008 | Jokinen et al. |
| 7,349,890 B1 | 3/2008 | Pathak et al. |
| 7,363,246 B1 | 4/2008 | Van Horn et al. |
| 7,364,086 B2 | 4/2008 | Mesaros |
| 7,376,613 B1 | 5/2008 | Cofino et al. |
| 7,379,899 B1 | 5/2008 | Junger |
| 7,415,428 B2 | 8/2008 | Garwood |
| 7,415,617 B2 | 8/2008 | Ginter et al. |
| 7,433,832 B1 | 10/2008 | Bezos et al. |
| 7,464,051 B1 | 12/2008 | Heggem |
| 7,475,024 B1 | 1/2009 | Phan |
| 7,480,627 B1 | 1/2009 | Van Horn et al. |
| 7,496,543 B1 | 2/2009 | Bamford et al. |
| 7,516,089 B1 | 4/2009 | Walker et al. |
| 7,523,045 B1 | 4/2009 | Walker et al. |
| 7,539,742 B2 | 5/2009 | Spector |
| 7,542,927 B2 | 6/2009 | Mukai |
| 7,552,069 B2 | 6/2009 | Kepecs |
| 7,577,582 B1 | 8/2009 | Ojha et al. |
| 7,584,146 B1 | 9/2009 | Duhon |
| 7,593,871 B1 | 9/2009 | Mesaros |
| 7,596,509 B1 | 9/2009 | Bryson |
| 7,599,857 B2 | 10/2009 | Bishop et al. |
| 7,606,731 B2 | 10/2009 | McClung, III |
| 7,624,044 B2 | 11/2009 | Wren |
| 7,630,919 B1 | 12/2009 | Obrecht |
| 7,636,672 B2 | 12/2009 | Angles et al. |
| 7,672,870 B2 | 3/2010 | Haines et al. |
| 7,680,696 B1 | 3/2010 | Murray |
| 7,689,463 B1 | 3/2010 | Mesaros |
| 7,689,468 B2 | 3/2010 | Walker et al. |
| 7,689,469 B1 | 3/2010 | Mesaros |
| 7,693,748 B1 | 4/2010 | Mesaros |
| 7,698,173 B1 | 4/2010 | Burge et al. |
| 7,698,208 B2 | 4/2010 | Hirani et al. |
| 7,698,240 B1 | 4/2010 | Chatterjee et al. |
| 7,706,838 B2 | 4/2010 | Atsmon et al. |
| 7,725,350 B2 | 5/2010 | Schlee |
| 7,729,977 B2 | 6/2010 | Xiao et al. |
| 7,747,473 B1 | 6/2010 | Mesaros |
| 7,792,699 B2 | 9/2010 | Kwie |
| 7,801,803 B2 | 9/2010 | Forlai |
| 7,813,955 B2 | 10/2010 | Ariff et al. |
| 7,814,106 B2 | 10/2010 | Guido et al. |
| 7,814,114 B2 | 10/2010 | Mi et al. |
| 7,815,114 B2 | 10/2010 | Mesaros |
| 7,818,212 B1 | 10/2010 | Mesaros |
| 7,860,776 B1 | 12/2010 | Chin et al. |
| 7,890,373 B2 | 2/2011 | Junger |
| 7,899,707 B1 | 3/2011 | Mesaros |
| 7,912,761 B2 | 3/2011 | Vaid |
| 7,917,386 B2 | 3/2011 | Christensen |
| 7,917,416 B2 | 3/2011 | Quinn et al. |
| 7,937,288 B2 | 5/2011 | Blaser et al. |
| 7,942,316 B2 | 5/2011 | Bennett et al. |
| 7,953,730 B1 | 5/2011 | Bleckner et al. |
| 7,958,007 B2 | 6/2011 | Urbanski et al. |
| 8,005,747 B2 | 8/2011 | Forlai |
| 8,015,583 B2 | 9/2011 | Bates et al. |
| 8,024,226 B2 | 9/2011 | Fusz et al. |
| 8,032,409 B1 | 10/2011 | Mikurak |
| 8,032,422 B2 | 10/2011 | Pickard et al. |
| 8,036,941 B2 | 10/2011 | Bennett et al. |
| 8,073,762 B2 | 12/2011 | Sheth et al. |
| 8,140,402 B1 | 3/2012 | Mesaros |
| 8,140,405 B2 | 3/2012 | Mesaros |
| 8,140,442 B2 | 3/2012 | Heyer |
| 8,140,615 B2 | 3/2012 | Miller et al. |
| 8,150,735 B2 | 4/2012 | Walker et al. |
| 8,160,931 B2 | 4/2012 | Mesaros |
| 8,196,811 B2 | 6/2012 | Mesaros |
| 8,219,460 B1 | 7/2012 | Mesaros |
| 8,249,942 B2 | 8/2012 | Mesaros |
| 8,271,327 B2 | 9/2012 | Walker et al. |
| 8,271,332 B2 | 9/2012 | Mesaros |
| 8,285,598 B2 | 10/2012 | Mesaros |
| 8,311,896 B2 | 11/2012 | Mesaros |
| 8,341,035 B2 | 12/2012 | Mesaros |
| 8,401,918 B2 | 3/2013 | Mesaros |
| 8,438,075 B2 | 5/2013 | Mesaros |
| 2001/0011264 A1 | 8/2001 | Kawasaki |
| 2001/0014868 A1 | 8/2001 | Herz et al. |
| 2001/0018660 A1 | 8/2001 | Sehr |
| 2001/0039514 A1 | 11/2001 | Barenbaum |
| 2001/0044751 A1 | 11/2001 | Pugliese, III et al. |
| 2001/0047296 A1 | 11/2001 | Wyker |
| 2001/0047311 A1 | 11/2001 | Singh |
| 2002/0004765 A1 | 1/2002 | Han et al. |
| 2002/0007324 A1 | 1/2002 | Centner et al. |
| 2002/0026351 A1 | 2/2002 | Coleman |
| 2002/0032573 A1 | 3/2002 | Williams et al. |
| 2002/0035536 A1 | 3/2002 | Gellman |
| 2002/0040352 A1 | 4/2002 | McCormick |
| 2002/0046105 A1 | 4/2002 | Gardenswartz et al. |
| 2002/0046147 A1 | 4/2002 | Livesay et al. |
| 2002/0052782 A1 | 5/2002 | Landesmann |
| 2002/0065762 A1 | 5/2002 | Lee et al. |
| 2002/0065769 A1 | 5/2002 | Irribarren et al. |
| 2002/0069079 A1 | 6/2002 | Vega |
| 2002/0080950 A1 | 6/2002 | Koko et al. |
| 2002/0082881 A1 | 6/2002 | Price et al. |
| 2002/0091580 A1 | 7/2002 | Wang |
| 2002/0099643 A1 | 7/2002 | Abeshouse et al. |
| 2002/0103741 A1 | 8/2002 | Boies et al. |
| 2002/0107773 A1 | 8/2002 | Abdou |
| 2002/0116282 A1 | 8/2002 | Martin et al. |
| 2002/0143692 A1 | 10/2002 | Heimermann et al. |
| 2002/0147670 A1 | 10/2002 | Lange |
| 2002/0165771 A1 | 11/2002 | Walker et al. |
| 2002/0165821 A1 | 11/2002 | Tree |
| 2002/0169703 A1 | 11/2002 | Lutnick et al. |
| 2002/0169759 A1 | 11/2002 | Kraft et al. |
| 2002/0174051 A1 | 11/2002 | Wise |
| 2002/0188508 A1 | 12/2002 | Lee et al. |
| 2003/0004802 A1 | 1/2003 | Callegari |
| 2003/0004808 A1 | 1/2003 | Elhaoussine et al. |
| 2003/0004823 A1 | 1/2003 | Sagy |
| 2003/0028473 A1 | 2/2003 | Eso et al. |
| 2003/0041002 A1 | 2/2003 | Hao et al. |
| 2003/0055774 A1 | 3/2003 | Ginsberg |
| 2003/0088494 A1 | 5/2003 | Lee |
| 2003/0093355 A1 | 5/2003 | Issa |
| 2003/0109949 A1 | 6/2003 | Ikeda |
| 2003/0111531 A1 | 6/2003 | Williams et al. |
| 2003/0115100 A1 | 6/2003 | Teicher |
| 2003/0126040 A1 | 7/2003 | Mesaros |
| 2003/0126250 A1 | 7/2003 | Jhanji |
| 2003/0149619 A1 | 8/2003 | Stanley et al. |
| 2003/0167222 A1 | 9/2003 | Mehrotra et al. |
| 2003/0195832 A1 | 10/2003 | Cao et al. |
| 2003/0200150 A1 | 10/2003 | Westcott et al. |
| 2003/0208412 A1 | 11/2003 | Hillestad et al. |
| 2003/0216960 A1 | 11/2003 | Postrel |
| 2003/0233276 A1 | 12/2003 | Pearlman et al. |
| 2003/0233557 A1 | 12/2003 | Zimmerman |
| 2004/0015415 A1 | 1/2004 | Cofino et al. |
| 2004/0039661 A1 | 2/2004 | Fuzell-Casey et al. |
| 2004/0039677 A1 | 2/2004 | Mura et al. |
| 2004/0093276 A1 | 5/2004 | Nishio |
| 2004/0128197 A1 | 7/2004 | Bam et al. |
| 2004/0215467 A1 | 10/2004 | Coffman et al. |
| 2004/0215500 A1 | 10/2004 | Monahan |
| 2005/0021400 A1 | 1/2005 | Postrel |
| 2005/0021401 A1 | 1/2005 | Postrel |
| 2005/0038713 A1 | 2/2005 | Pickard et al. |
| 2005/0149458 A1 | 7/2005 | Eglen et al. |
| 2005/0171918 A1 | 8/2005 | Eden et al. |
| 2005/0197857 A1 | 9/2005 | Avery |
| 2005/0216337 A1 | 9/2005 | Roberts et al. |
| 2005/0272442 A1 | 12/2005 | Miller et al. |
| 2005/0273415 A1 | 12/2005 | Mathews et al. |
| 2006/0036491 A1 | 2/2006 | Leung et al. |
| 2006/0059062 A1 | 3/2006 | Wood et al. |
| 2006/0069619 A1 | 3/2006 | Walker et al. |

| | | |
|---|---|---|
| 2006/0095327 A1 | 5/2006 | Vaughn et al. |
| 2006/0095366 A1 | 5/2006 | Sheth et al. |
| 2006/0106678 A1 | 5/2006 | Walker et al. |
| 2006/0129454 A1 | 6/2006 | Moon et al. |
| 2006/0143080 A1 | 6/2006 | Garg et al. |
| 2006/0178918 A1 | 8/2006 | Mikurak |
| 2007/0150349 A1 | 6/2007 | Handel et al. |
| 2007/0220169 A1 | 9/2007 | Silver et al. |
| 2008/0015711 A1 | 1/2008 | Charland et al. |
| 2008/0052189 A1 | 2/2008 | Walker et al. |
| 2008/0052750 A1 | 2/2008 | Grunnet-Jepsen et al. |
| 2008/0071634 A1 | 3/2008 | Rampell et al. |
| 2008/0082418 A1 | 4/2008 | Fordyce et al. |
| 2008/0126201 A1 | 5/2008 | Ullah |
| 2008/0255886 A1 | 10/2008 | Unkefer et al. |
| 2009/0055328 A1 | 2/2009 | Bamford et al. |
| 2009/0059856 A1 | 3/2009 | Kermoal et al. |
| 2009/0083136 A1 | 3/2009 | Blackwood |
| 2009/0089177 A1 | 4/2009 | Dayton et al. |
| 2009/0150218 A1 | 6/2009 | Brunner et al. |
| 2009/0187455 A1 | 7/2009 | Fernandes et al. |
| 2009/0198622 A1 | 8/2009 | Temte et al. |
| 2009/0276305 A1 | 11/2009 | Clopp |
| 2009/0307073 A1 | 12/2009 | MirrokniBanadaki et al. |
| 2009/0319359 A1 | 12/2009 | Soza et al. |
| 2009/0327034 A1 | 12/2009 | Peterson |
| 2009/0327038 A1 | 12/2009 | Peterson |
| 2009/0327101 A1 | 12/2009 | Sayed |
| 2009/0327140 A1 | 12/2009 | Kuo |
| 2010/0088174 A1 | 4/2010 | Cohagan et al. |
| 2010/0125525 A1 | 5/2010 | Inamdar |
| 2010/0169161 A1 | 7/2010 | Sacco |
| 2011/0004515 A1 | 1/2011 | Mesaros |
| 2011/0016010 A1 | 1/2011 | Mesaros |
| 2011/0040624 A1 | 2/2011 | Jhanji |
| 2011/0213648 A1 | 9/2011 | Mesaros |
| 2011/0213649 A1 | 9/2011 | Mesaros |
| 2011/0213650 A1 | 9/2011 | Mesaros |
| 2011/0213653 A1 | 9/2011 | Mesaros |
| 2011/0238476 A1 | 9/2011 | Carr et al. |
| 2011/0246271 A1 | 10/2011 | Mesaros |
| 2011/0246274 A1 | 10/2011 | Mesaros |
| 2011/0264499 A1 | 10/2011 | Abendroth et al. |
| 2011/0270699 A1 | 11/2011 | Mesaros |
| 2011/0270700 A1 | 11/2011 | Mesaros |
| 2012/0022970 A1 | 1/2012 | Mesaros |
| 2012/0029993 A1 | 2/2012 | Mesaros |
| 2012/0029995 A1 | 2/2012 | Mesaros |
| 2012/0035999 A1 | 2/2012 | Mesaros |
| 2012/0036000 A1 | 2/2012 | Mesaros |
| 2012/0036031 A1 | 2/2012 | Mesaros |
| 2012/0041811 A1 | 2/2012 | Mesaros |
| 2012/0054012 A1 | 3/2012 | Mesaros |
| 2012/0158475 A1 | 6/2012 | Mesaros |
| 2012/0158479 A1 | 6/2012 | Raisch |
| 2012/0179526 A1 | 7/2012 | Mesaros |
| 2012/0179530 A1 | 7/2012 | Mesaros |
| 2012/0197705 A1 | 8/2012 | Mesaros |
| 2012/0197722 A1 | 8/2012 | Mesaros |
| 2012/0203603 A1 | 8/2012 | Mesaros |
| 2012/0203611 A1 | 8/2012 | Mesaros |
| 2012/0203615 A1 | 8/2012 | Mesaros |
| 2012/0209683 A1 | 8/2012 | Mesaros |
| 2012/0209737 A1 | 8/2012 | Mesaros |
| 2012/0209738 A1 | 8/2012 | Mesaros |
| 2012/0209739 A1 | 8/2012 | Mesaros |
| 2012/0209740 A1 | 8/2012 | Mesaros |
| 2012/0209743 A1 | 8/2012 | Mesaros |
| 2012/0226541 A1 | 9/2012 | Mesaros |
| 2012/0245993 A1 | 9/2012 | Mesaros |
| 2012/0253912 A1 | 10/2012 | Mesaros |
| 2012/0253977 A1 | 10/2012 | Mesaros |
| 2012/0265590 A1 | 10/2012 | Mesaros |
| 2012/0265600 A1 | 10/2012 | Mesaros |
| 2012/0278157 A1 | 11/2012 | Mesaros |
| 2012/0284110 A1 | 11/2012 | Mesaros |
| 2012/0290395 A1 | 11/2012 | Mesaros |
| 2012/0310738 A1 | 12/2012 | Mesaros |
| 2013/0006741 A1 | 1/2013 | Mesaros |
| 2013/0013385 A1 | 1/2013 | Mesaros |
| 2013/0013388 A1 | 1/2013 | Mesaros |
| 2013/0080282 A1 | 3/2013 | Mesaros |
| 2013/0117086 A1 | 5/2013 | Mesaros |

FOREIGN PATENT DOCUMENTS

| | | |
|---|---|---|
| WO | WO 9821713 A2 | 5/1998 |
| WO | 0050970 A2 | 8/2000 |
| WO | WO 00/50970 A2 | 8/2000 |
| WO | WO 00/70424 A2 | 11/2000 |
| WO | WO 2008/083371 | 7/2008 |

OTHER PUBLICATIONS

OA dated Jan. 3, 2012 for U.S. Appl. No. 13/106,622, 20 pages.
OA dated Nov. 17, 2011 for U.S. Appl. No. 12/704,280, 18 pages.
Notice of Allowance mailed dated Dec. 5, 2011 for U.S. Appl. No. 12/539,714, 26 pages.
First Office Action dated Nov. 4, 2011 for U.S. Appl. No. 13/160,128, 58 pages.
Mercata.com, Archived by Archive.org on or before Jun. 19, 2000.
Kauffman et al., "Bid Together Buy Together; On the efficacy of group-buying business models in Internet-based Selling", May 16, 2001.
OA dated Oct. 24, 2011 for U.S. Appl. No. 11/618,412, 42 pages.
OA dated Jan. 3, 2012 for U.S. Appl. No. 13/105,387, 107 pages.
Garner, K., "Culture Vulture: up from under—Germaine Greer," Off Our Backs, Jun. 24, 1971, vol. 1, Iss. 23, p. 14.
OA dated Dec. 16, 2011 for U.S. Appl. No. 11/618,418, 29 pages.
OA dated Oct. 18, 2011 for U.S. Appl. No. 12/788,513, 61 pages.
Tippr http://www.tipper.com/ Internet Archive (Feb. 29, 2008)—http://web.archive.org/web/20080229121727/http://tippr.com/.
OA dated Jan. 4, 2012 for U.S. Appl. No. 09/922,884, 13 pages.
OA dated Jan. 10, 2012 for U.S. Appl. No. 13/272,147, 13 pages.
Anon. "Open Market Introduces New Software for Dynamic Web-based Commerce" PR Newswire, Oct. 1, 1996.
Millman, H. "Legacy Data Links Shrink Costs," InfoWorld, vol. 20, No. 1, pp. 51, 56, Jan. 5, 1998.
Anon. "ELCOM: Virgin Trains Cuts Procurement Costs with elcom. com; New Electronic Ordering System Offers Personalised Pricing," M2 Presswire, Jul. 18, 2000.
OA dated Jan. 3, 2012 for U.S. Appl. No. 13/270,133, 14 pages.
OA dated Oct. 28, 2011 for U.S. Appl. No. 12/539,714, 89 pages.
OA dated Dec. 22, 2011 for U.S. Appl. No. 13/269,360, 19 pages.
Office Action dated Dec. 9, 2011 for U.S. Appl. No. 13/160,128, 58 pages.
Office Action dated Dec. 28, 2011 for U.S. Appl. No. 13/275,054, 17 pages.
Office Action dated Dec. 29, 2011 for U.S. Appl. No. 13/274,213, 18 pages.
Rozic, Jeff, "Who's Watching While You Surf?", Inside Business 3, 5, 64, May 2001.
eWinWin, Inc. v. Groupon, Inc. Appeal Per Curiam Decision dated Oct. 9, 2012.
eWinWin, Inc. v. Groupon, Inc. Reply Brief of Appellant dated Jun. 4, 2012.
eWinWin, Inc. v. Groupon, Inc. Brief of Appellee dated May 17, 2012.
eWinWin, Inc. v. Groupon, Inc. Brief of Appellant dated Apr. 2, 2012.
Order re Motion for Summary Judgment dated Nov. 23, 2011.
eWinWin, Inc.'s Opposition to Groupon, Inc.'s Motion for Summary Judgment of Non-Infringement dated Nov. 8, 2011.
Groupon, Inc.'s Motion for Summary Judgment of Non-Infringment dated Oct. 17, 2011.
Order re eWinWin, Inc. Motion for Reconsideration dated Oct. 3, 2011.
Order re Claim Construction dated Sep. 5, 2011.
eWinWin, Inc. Supplemental Brief in Support of Claim Construction dated Aug. 24, 2011.
Groupon, Inc.'s Supplemental Claim Construction Brief dated Aug. 24, 2011.
eWinWin, Inc.'s Reply Brief in Support of Claim Construction dated Aug. 5, 2011.
Groupon, Inc.'s Responsive Claim Construction Brief dated Aug. 5, 2011.

Groupon, Inc.'s Opening Claim Constructin Brief dated Jul. 5, 2011.
Opening Claim Construction Brief of eWinWin, Inc.dated Jul. 5, 2011.
U.S. Appl. No. 13/275,054 Final Office Action mailed Nov. 5, 2012.
U.S. Appl. No. 13/292,971 Office Action mailed Dec. 4, 2012.
U.S. Appl. No. 13/292,971 Office Action mailed Sep. 14, 2012.
U.S. Appl. No. 13/449,275 Office Action mailed Oct. 4, 2012.
U.S. Appl. No. 13/449,276 Office Action mailed Sep. 26, 2012.
U.S. Appl. No. 13/449,658 Office Action mailed Oct. 30, 2012.
U.S. Appl. No. 13/452,647 Office Action mailed Dec. 7, 2012.
U.S. Appl. No. 13/460,512 Office Action mailed Dec. 10, 2012.
U.S. Appl. No. 13/523,820 Office Action mailed Nov. 8, 2012.
U.S. Appl. No. 13/525,040 Office Action mailed Nov. 23, 2012.
U.S. Appl. No. 13/407,622 Office Action mailed Dec. 3, 2012.
U.S. Appl. No. 13/407,622 Office Action mailed Sep. 12, 2012.
U.S. Appl. No. 12/881,923 Final Office Action mailed Oct. 5, 2012.
U.S. Appl. No. 13/251,668 Office Action mailed Sep. 14, 2012.
U.S. Appl. No. 13/345,681 Final Office Action mailed Sep. 20, 2012.
U.S. Appl. No. 13/621,158 Office Action mailed Dec. 5, 2012.
U.S. Appl. No. 13/274,213 Final Office Action mailed Aug. 1, 2012.
U.S. Appl. No. 13/538,302 Office Action mailed Oct. 25, 2012.
U.S. Appl. No. 13/105,387 Final Office Action mailed Aug. 15, 2012.
U.S. Appl. No. 11/618,418 Final Office Action mailed Jul. 26, 2012.
U.S. Appl. No. 11/680,415 Office Action mailed Aug. 31, 2012.
U.S. Appl. No. 13/517,528 Office Action mailed Dec. 6, 2012.
Mercata.com, "Our Privacy Policy", Archived by Archive.org on or before May 26, 2000.
Mercata.com, "Special Offers", Archived by Archive.org on or before Jun. 19, 2000.
Mercata.com, "Terms of Use", Published by Mercata.com, Nov. 6, 2000.
We-Commerce.com, "The We-Commerce™ Network Mission", Archived by Archive.org on or before Oct. 23, 2000.
U.S. Appl. No. 13/104,723 Office Action mailed Feb. 22, 2013.
U.S. Appl. No. 13/269,360 Final Office Action mailed Apr. 17, 2013.
U.S. Appl. No. 13/270,133 Final Office Action mailed Feb. 1, 2013.
U.S. Appl. No. 13/275,054 Final Office Action mailed Feb. 21, 2013.
U.S. Appl. No. 13/292,971 Final Office Action mailed Apr. 18, 2003.
U.S. Appl. No. 13/449,275 Final Office Action mailed Feb. 22, 2013.
U.S. Appl. No. 13/449,276 Final Office Action mailed Feb. 25, 2013.
U.S. Appl. No. 13/452,647 Final Office Action mailed May 2, 2013.
U.S. Appl. No. 13/460,478 Final Office Action mailed Apr. 29, 2013.
U.S. Appl. No. 13/460,478 Office Action mailed Dec. 20, 2012.
U.S. Appl. No. 13/460,512 Final Office Action mailed May 2, 2013.
U.S. Appl. No. 13/523,820 Office Action mailed Feb. 26, 2013.
U.S. Appl. No. 13/491,449 Final Office Action mailed May 2, 2013.
U.S. Appl. No. 13/491,449 Office Action mailed Dec. 19, 2012.
U.S. Appl. No. 13/525,040 Final Office Action mailed Apr. 18, 2013.
U.S. Appl. No. 13/407,622 Final Office Action mailed Apr. 17, 2013.
U.S. Appl. No. 13/609,806 Final Office Action mailed May 1, 2013.
U.S. Appl. No. 13/609,806 Office Action mailed Jan. 10, 2013.
U.S. Appl. No. 13/251,668 Office Action mailed May 10, 2013.
U.S. Appl. No. 13/251,668 Final Office Action mailed Dec. 24, 2012.
U.S. Appl. No. 13/609,250 Office Action mailed Jan. 3, 2013.
U.S. Appl. No. 13/621,158 Final Office Action mailed Mar. 27, 2013.
U.S. Appl. No. 13/274,213 Office Action mailed Apr. 23, 2013.
U.S. Appl. No. 13/274,213 Final Office Action mailed Jan. 9, 2013.
U.S. Appl. No. 11/152,462 Office Action mailed Feb. 6, 2013.
U.S. Appl. No. 13/160,128 Office Action mailed May 23, 2013.
U.S. Appl. No. 13/160,176 Office Action mailed Apr. 19, 2013.
U.S. Appl. No. 13/538,302 Final Office Action mailed Mar. 26, 2013.
U.S. Appl. No. 13/272,147 Final Office Action mailed Jan. 9, 2013.
U.S. Appl. No. 11/680,431 Office Action mailed Mar. 11, 2013.
U.S. Appl. No. 13/517,528 Office Action mailed May 8, 2013.
U.S. Appl. No. 13/584,809 Office Action mailed Feb. 14, 2013.
U.S. Appl. No. 13/271,464 Office Action mailed May 10, 2012.
U.S. Appl. No. 09/922,884 Office Action mailed May 1, 2012.
U.S. Appl. No. 13/104,723 Final Office Action mailed Jun. 8, 2012.
U.S. Appl. No. 13/270,133 Final Office Action mailed Jun. 12, 2012.
U.S. Appl. No. 13/292,971 Office Action mailed Jun. 14, 2012.
U.S. Appl. No. 13/272,144 Office Action mailed May 16, 2012.
U.S. Appl. No. 11/680,415 Final Office Action mailed May 2, 2012.
U.S. Appl. No. 13/269,360 Final Office Action mailed Jul. 6, 2012.
U.S. Appl. No. 12/710,095 Final Office Action mailed Jun. 28, 2012.
U.S. Appl. No. 12/881,923 Office Action mailed Jun. 29, 2012.
U.S. Appl. No. 13/345,681 Office Action mailed Jun. 20, 2012.
U.S. Appl. No. 11/618,412 Final Office Action mailed May 1, 2012.
"Excite@Home Standardizes on Siebel eBusiness; Leading Broadband Media Company Relies on Siebel Systems to Manage Customer Relationships Across Its Entire Family of Services," Business Wire, Jan. 19, 2000.
"Global Real Estate Markets Spell Opportunity, Experts Tell Realtors," PR Newswire, Nov. 21, 1991.
"Lucent Launches On-Line Catalog" M2 Presswire, Jan. 22, 1999.
"Screen Savers," Lawyer, Feb. 19, 2001.
"The Oil and Gas Asset Clearinghouse, a Pertoleum Place Company, to Host It's Second Exclusively Online Auction of Oil and Gas Properties on Aug. 14-16, 2000." PR Newswire, p. 5591, Aug. 3, 2000, 2 pages.
Amazon.com, "Help/Shipping", Archived on Feb. 2, 2003 by www.archive.org. Last accessed Mar. 19, 2008, 9 pages.
Ashton Technology Group, Inc. Announces NASDAQ National Market System Listing; Enters into Clearing Arrangements with 8 National Brokerage Firms, Business Wire, Jan. 3, 2000. http://www.findarticles.com/p/articles/mi_m0EIN/is_2000_Jan_3/ai_58429780/print. Last accessed Apr. 8, 2009, 3 pages.
Beaty. Mass Customisation. Manufacturing Engineer, vol. 75, issue 5, Oct. 1996, pp. 217-220.
Blyth, et al. Merchandising System Collecting Data. Derwent Information Ltd. Last accessed Jan. 20, 2009, 2 pages.
Breyer. "Bargains in Cyberspace," National Home Center News, vol. 26, No. 21, p. 21, Nov. 20, 2000.
Business Editors and High Tech Writers, "eWinWin Announces the Release of DAS 3.0, the Next Generation of B2B Demand Aggregation Solutions" Dec. 28, 2000, Businee wire, p. 1 (4 pages).
Business Editors. "Weatherchem Announces Major eCommerce Success with eWinWin", Aug. 9, 2001, Business Wire, (p. 1) 2 pages.
CBOT, "Trading in Futures Can Provide Considerable Financial Rewards", Last accessed Mar. 19, 2008, 41 pages.
Chicago Board of Trade, "Knowledge Center," as archived by Archive.org, on Feb. 13, 2003.
China—Welcome to the Machine: New Machinery, Electronics B-to-B Website Launched. China Online, Jul. 24, 2000, 1 page.
Computer Geeks Discount Outlet, "Order Status," Mar. 1, 2002.
Deierlein. "Smart Fuel Buying," Fleet Equipment, vol. 24, No. 8, pp. 42-44, Aug. 1998.
Dibiase. The Inventory Simulator: A Micro Computer Based Inventory Model. Modeling and Simulation on Microcomputers, Paul F. Hogan, ed., Society for Computer Simulation (SCS), La Jolla, pp. 104-106, Jan. 1987.
DomainTradeLIVE! Launched by solutionhome.com. Business Wire, Oct. 20, 1999, 1 page.
Easley, et al. Time and the Process of Security Price Adjustment, Journal of Finance, vol. 47, No. 2, Jun. 1992. http://ideas.repec.org/a/bla/jfinan/v47y1992i2p576-605.html. Last accessed Sep. 10, 2009, 30 pages.
Edwards. "Increase Your Bottom Line : Automated Customer Service and Marketing," E-Business Advisor, vol. 17, No. 7, p. 30, Jul. 1999.
Enos. Vying to be the Top Dog. Upside vol. 12, No. 3, pp. 160-165, Mar. 2000.
eWinWin, "eCommerce Redefined : The Positive Impact of eWinWin's Demand Aggregation System on the Manufacturing Supply Chain", Oct. 2000. Last accessed Mar. 19, 2008, 11 pages.
Gaonkar, et al. Strategic Sourcing and Collaborative Planning in Internet Enabled Supply Chain Networks Producing Multigeneration Products. IEEE Transactions on Automation Science and Engineering, vol. 2, issue 1, Jan. 2005, pp. 54-66.
Gurley. Creating a Great E-Commerce Business. Fortune, Mar. 16, 1998.
International Search Report for PCT Application No. PCT/US 07/89195, mailed May 12, 2008, 8 pages.
Jonsson, et al. Impact of Processing and Queueing Times on Order Quantities. Mater. Flow, vol. 2, No. 4, pp. 221-230, Aug. 1985.
Kantrow, American Express Sets a Three-Tier Pricing on Optima, Dialog: File 148 #05812190 (The Gale Group), American Banker, v157, n25, p. 1(2), Feb. 6, 1992.

Koenig, et al. Quantitative Industrial Ecology. IEEE Transactions on Systems, Man and Cybernetics, Part C, Issue 1, Feb. 1998, pp. 16-28.

Lamparter. "Natural Selection." American Printer, vol. 217, No. 3, pp. 54-64, Jun. 1996.

Magna Cash Cybersource Partner to Expand Online Payment Options. PR Newswire, New York, Jan. 15.

Market Engineering Research for Structural Impacts of e-Business in the European Chemicals Industry (Ch. 3), Structural Impact of e-Business on the Chemicals Industry, Frost & Sullivan, Market Research Report, Jun. 2001.

Maxwell, Pricing education in the United States of America: responding to the needs of business, The Journal of Product & Brand Management, Santa Barbara, Aug. 1998, vol. 7, Issue 4, p. 336-341.

Medrano, et al. Strategic Behaviour and Price Discovery, RAND Journal of Economics, vol. 32, No. 2, Jun. 21, 2001. https://editorialexpress.com/cgi-bin/rje_online.cgi?action=view&year=2001&issue=sum&page=221&&tid=83197&sc=uogfbloa. Last accessed Sep. 3, 2009, 29 pages.

Meriam Webster's Collegiate Dictionary, Tenth Edition, 1997, p. 732.

Meridex Introduces Advanced Features to its B2B Network, PR Newswire, May 25, 2000. Available online: http://www.canadait.com/cfm/index.cfm?It=106&Id=3421&Se=355&Sv=Company&Lo=441. Last accessed Apr. 30, 2009, 3 pages.

Mesaros. Innovation in Difficult Times : How US Manufacturers are Using Demand Aggregation to Increase Sales and Lower Costs. Jul. 26, 2001. Last accessed Mar. 19, 2008, 4 pages.

MobShop Launches New Rev of Selling App, Online Reporter, May 28, 2001. http://findarticles.com/p/articles/mi_hb5932/is_200105/ai_n23884526/. Last accessed Apr. 30, 2009, 2 pages.

MobShop Selected by WHN(TM) (WhatsHotNow.com (R), Inc.) to Power Demand Aggregation Within Its Licensed Merchandise Marketplace; Demand Aggregation Technology Enables Marketplaces to Improve Liquidity by Generating Volume Transactions, PR Newswire, San Francisco, Jan. 16, 2001. Alternative—http://www.allbusiness.com/retail-trade/4291613-1.html.

Moody. From E-Commerce to We-Commerce. Computer Weekly, 42, Jun. 3, 1999. Last accessed Apr. 9, 2009, 2 pages.

Mullich. Altrade Serves as a Natural Resource—A Head Start and Big Trading Volume Give the Natural Gas Marketplace a Competitive Edge. Can it Last? Information Week, 152, Jun. 12, 2000, 3 pages.

Myers. "E-Solutions for Surplus Inventory," Dsn Retailing Today, vol. 39, No. 21, p. 13, Nov. 6, 2000.

Nellore, et al. Factors Influencing Success in Integrated Product Development (IPD) Projects. IEEE Transactions on Engineering Management, vol. 48, issue 2, May 2001, pp. 164-174.

OA dated Feb. 23, 2010 for U.S. Appl. No. 09/426,063, 11 pages.
OA dated Mar. 19, 2008 for U.S. Appl. No. 11/152,462, 26 pages.
OA dated Apr. 29, 2009 for U.S. Appl. No. 10/464,585, 19 pages.
OA dated Jul. 2, 2009 for U.S. Appl. No. 09/426,063, 24 pages.
OA dated Sep. 9, 2009 for U.S. Appl. No. 11/556,604, 60 pages.
OA dated Oct. 6, 2009 for U.S. Appl. No. 12/042,051, 53 pages.
OA dated Oct. 28, 2009 for U.S. Appl. No. 10/464,585, 37 pages.
OA dated Nov. 27, 2009 for U.S. Appl. No. 11/680,431, 43 pages.
OA dated Apr. 16, 2010 for U.S. Appl. No. 12/042,051, 32 pages.
OA dated Apr. 29, 2010 for U.S. Appl. No. 10/464,585, 16 pages.
OA dated Apr. 10, 2009 for U.S. Appl. No. 10/351,069, 27 pages.
OA Dated Apr. 6, 2009 for U.S. Appl. No. 11/680,431, 33 pages.
OA Dated Feb. 6, 2009 for U.S. Appl. No. 09/626,296, 11 pages.
OA Dated Mar. 25, 2009 for U.S. Appl. No. 11/556,604, 59 pages.
OA Dated Nov. 3, 2008 for U.S. Appl. No. 11/150,920, 161 pages.
OA Dated Oct. 20, 2008 for U.S. Appl. No. 10/464,585, 11 pages.
OA Dated Oct. 27, 2008 for U.S. Appl. No. 11/464,376, 13 pages.
OA Dated Oct. 29, 2008 for U.S. Appl. No. 11/152,462, 27 pages.

O'Gorman, et al. Considerations for Connecting Renewable Generation into Bulk Supply Networks. Sixth International Conference on Advances in Power System Control, Operation and Management, ASDCOM 2003, vol. 2, Nov. 11-14, pp. 674-680. Last accessed Sep. 10, 2009, 7 pages.

Rahim, et al. Optimal Decision Rules for Determining the Length of Production Run, (Abstract Only), Computers and Industrial Engineering, vol. 9, No. 2, pp. 195-202, 1985.

Rahim, et al. "Optimal Production Run for a Process with Random Linear Drift," (Abstract only), Omega, vol. 16, No. 4, pp. 347-351, 1988.

Scott. Chains of Trust, Supply Chain Management, Manufacturing Engineer, vol. 75, issue 4, Aug. 1996, pp. 172-174.

Scott. Supply Partnerships in the Aerospace Industry. Transforming Your Material Flow: A Practical Insight Into World Class Logistics and Supply Chain Management IEE Colloquium on, Oct. 24, 1996, pp. 3/1-3/3.

Scott. Supply Partnerships and the Effective Management of Low Cost Components. Transforming Your Material Flow: A Practical Insight Into World Class Logistics and Supply Chain Management IEE Colloquium on, Mar. 19, 1996, pp. 2/1-2/4.

Sivakumar, et al. Price Match Guarantees: Rationale, Implementation, and Consumer Response. Pricing Strategy and Practice, Bradford, 1996, vol. 4, issue 4, 11 pgs. Recovered from ProQuest Database Aug. 25, 2006.

Sjostrom. Price Discrimination by Shipping Conferences. Logistics and Transportation Review, Jun. 1992, [from Dialog® File 15, acc. No. 00727777 93-76998].

Stacklin. "Bridgestone Printing Unit Teams with ewinwin", Mar. 25, 2002, Crain's Cleveland Business, vol. 23, issue 12, 3 pages.

Tanaka. "As Other Companies Crumble, Ecount Carves Out Niche in Online-Payment Services." Knight Rider Tribune News Service, Washington, Feb. 27, 2002. (Recovered from ProQuest Database Dec. 4, 2006.).

Thomas, et al. JIT: Strategies for Distant Suppliers (Abstract). Business, vol. 40, No. 4, pp. 36-39, Dec. 1990.

Watson. The Effects of Demand Forecast Fluctuations on Customer Service and Inventory Cost When Demand is Lumpy. Journal of the Operational Research Society, vol. 38, No. 1, pp. 75-82, Jan. 1987. http://www.palgrave-journals.com/jors/journal/v38/n1/abs/jors19879a.html. Last accessed Sep. 10, 2009, 8 pages.

Wayback Machine. "Searched for http://www.ewinwin.com/corp/ewinwinwhitepaper.pdf", Oct. 2, 2008, Archive.org.

Yeh, et al. "Optimal Production Run Length for Products Sold with Warranty," (Abstract only), European Journal of Operational Research, vol. 120, No. 3, pp. 575-582, Feb. 1, 2000.

"Supplier pricing and lot sizing when demand is price sensitive". Abad, P.L. Fac. of Bus., McMaster Univ., Hamilton, Ont., Canada. European Journal of Operational Research , vol. 78, No. 3, p. 334-54. Date: Nov. 10, 1994 [recovered from Dialog on Oct. 20, 2009]. 1 page.

Efficient bid pricing based on costing methods for Internet bid systems Sung Eun Park; Yong Kyu Lee. Dept. of Comput. Eng., Dongguk Univ., South Korea. Book Title: Web Information Systems—WISE 2006. 7th International Conference on Web Information Systems Engineering. Proceedings (Lecture Notes in Computer Science vol. 42) [recovered from Dialog on ]. 1 page.

Advisory Action Dated Apr. 29, 2010 for U.S. Appl. No. 11/680,431.
OA dated Sep. 17, 2010 for U.S. Appl. No. 11/618,412, 97 pages.
Mack, Going Local. © 2006 ProQuest Info&Learning. Last accessed Sep. 17, 2010, 2 pages.
De Gheest, Computer Implemented Electronic Bidding for Electronic Sales Application. Derwent Acc No. 2001-006585, © 2010 Derwent Information Ltd. Last accessed Sep. 17, 2010, 2 pages.
Swartz, Wireless Ads: Loved/Loathed. Wireless Review. © 2006 The Gale Group. Last accessed Sep. 17, 2010, 3 pages.
OA dated Sep. 30, 2010 for U.S. Appl. No. 11/618,418, 125 pages.
OA dated Aug. 4, 2010 for U.S. Appl. No. 11/680,415, 65 pages.
OA dated Oct. 21, 2010 for U.S. Appl. No. 12/788,513, 62 pages.
OA mailed Mar. 21, 2011 for U.S. Appl. No. 12/887,778, 38 pages.
OA mailed Feb. 18, 2011 for U.S. Appl. No. 11/680,431, 33 pages.
OA mailed Jan. 24, 2011 for U.S. Appl. No. 11/680,415, 24 pages.
OA mailed Feb. 23, 2011 for U.S. Appl. No. 11/618,412, 27 pages.
OA mailed Mar. 28, 2011 for U.S. Appl. No. 11/618,418, 22 pages.
OA mailed Jan. 21, 2011 for U.S. Appl. No. 12/881,923, 48 pages.
OA dated Apr. 6, 2011 for U.S. Appl. No. 12/788,513, 38 pages.
OA dated Aug. 18, 2011 for U.S. Appl. No. 12/881,923, 32 pages.
OA dated Aug. 2, 2011 for U.S. Appl. No. 11/680,415, 27 pages.
OA dated Jul. 28, 2011 for U.S. Appl. No. 12/704,280, 55 pages.
OA dated Sep. 12, 2011 for U.S. Appl. No. 09/922,884, 31 pages.
OA dated Sep. 2, 2011 for U.S. Appl. No. 11/680,431, 24 pages.

OA dated Sep. 21, 2011 for U.S. Appl. No. 13/106,622, 52 pages.

Accompany: How it Works: "Anatomy of a Buy-Cycle", Jun. 15, 1999, pp. 1-3.

Adam et al. "Strategic Directions in Electronic Commerce and Digital Libraries: Towards a Digital Agora". *ACM Computing Surveys* [Online] 1996, vol. 28, Issue 4, pp. 818-835.

Amazon.com, "Earths Biggest Selection," Jun. 30, 2001, archived by Archive.org: http://web.archive.org/web/20010630130618/http://www.amazon.com/exec/obidos/subst/home/home.html.

Boroshok, Jon, "Wireless, Location-Based, Shopping Portal being Tested in New York City and San Francisco by GeePS.com, Inc.," published Apr. 3, 2000, New York, NY and San Francisco, CA; as downloaded from http://www.techmarcom.com/geeps.html on Jan. 6, 2012.

Business/High Tech Editors "Mercata Launches Compelling Alternative to Online Auctions," Business Wire, Nov. 15, 2000.

ebay.com "eBay Services: The Feedback Forum," Aug. 1, 2001, archived by archive.org: "http://web.archive.org/web/20010801145144/http://pages.ebay.com/services/forum/feedback.html".

Ha, Sung Ho et al., "Matching Buyers and Suppliers: An Intelligent Dynamic-Exchange Model," IEEE Intelligent Systems, 2001.

Hinze, Annika et al., "Location- and Time-Based Information Delivery in Tourism," as downloaded Apr. 20, 2012 from http://page.mi.fu-berlin.de/voisard/Papers/sstd03.pdf.

IEEE Xplore Search Results, Aug. 12, 2007.

Mack, Going Local. Adweek, Jul. 10, 2000, pp. 38-.6, © 2006 ProQuest Info&Learning. Last accessed Sep. 17, 2010, 2 pages.

Mercata.com "How to Ship an Order" Oct. 22, 2000, archived by archive.org: http://web.archive.org/web/20001022035135/http://www.mercata.com/cgi-bin/mercata/mercata/v1/pages/editorial.jsp?name=Ship+an+Order.

Rajaraman, Rajesh et al., "The Effect of Demand Elasticity on Security Prices for the Poolco and Multi-Lateral Contract Models," IEEE Transactions on Power Systems, vol. 12, No. 3, Aug. 1997.

WHN Selects MobShop to Power Aggregated Buying for WHN Exchange. Jan. 23, 2001. http://www.allbusiness.com/retail-trade/4291613-1.html. Last accessed Sep. 11, 2009, 2 pages.

U.S. Appl. No. 09/922,884 Final Office Action mailed Jan. 4, 2012.
U.S. Appl. No. 13/104,723 Office Action mailed Mar. 22, 2012.
U.S. Appl. No. 13/106,622 Final Office Action mailed Jan. 3, 2012.
U.S. Appl. No. 13/270,133 Office Action mailed Jan. 3, 2012.
U.S. Appl. No. 12/710,095 Office Action mailed Apr. 6, 2012.
U.S. Appl. No. 13/161,192 Office Action mailed Apr. 5, 2012.
U.S. Appl. No. 13/251,668 Office Action mailed Feb. 9, 2012.
U.S. Appl. No. 13/251,668 Final Office Action mailed Apr. 17, 2012.
U.S. Appl. No. 13/160,128 Final Office Action mailed Feb. 22, 2012.
U.S. Appl. No. 13/105,387 Office Action mailed Jan. 3, 2012.
U.S. Appl. No. 13/272,147 Office Action mailed Jan. 10, 2012.

1400

REGISTRATION

NAME:

ADDRESS:

PRIMARY CONTACT:

TELEPHONE:

FAX:

E-MAIL:

DESCRIPTION OF COMPANY:

PREFERRED USER NAME:

PREFERRED PASSWORD:

PREFERRED PASSWORD (VERIFICATION):

BUYER REGISTRATION

BUYER NAME:

ADDRESS:

PRIMARY CONTACT:

TELEPHONE:

FAX:

E-MAIL:

DESCRIPTION OF COMPANY:

PREFERRED USER NAME:

PREFERRED PASSWORD:

PREFERRED PASSWORD (VERIFICATION):

SELLER REGISTRATION

SELLER NAME:

ADDRESS:

PRIMARY CONTACT:

TELEPHONE:

FAX:

E-MAIL:

DESCRIPTION OF COMPANY:

PREFERRED USER NAME:

PREFERRED PASSWORD:

PREFERRED PASSWORD (VERIFICATION):

Fig. 16

| DATA NAME, ADDRESS, CONTACT, ETC. | USER NAME | PASSWORD | CREDIT CARD NO. & EXP. |
|---|---|---|---|
| USER 1 | USER NAME (1) | PASSWORD (1) | XXXXXXXXX EXP. 05/03 |
| . . . | . . . | . . . | . . . |
| USER (N) | USER NAME (N) | PASSWORD (N) | CREDIT CARD (N) |

| BUYER DATA NAME, ADDRESS, CONTACT, ETC. | USER NAME | PASSWORD | CREDIT CARD NO. & EXP. |
|---|---|---|---|
| BUYER 1 | USER NAME (1) | PASSWORD (1) | XXXXXXXX EXP. 05/03 |
| . . . | . . . | . . . | . . . |
| BUYER (N) | USER NAME (N) | PASSWORD (N) | CREDIT CARD (N) |

| SELLER DATA NAME, ADDRESS, CONTACT, ETC. | USER NAME | PASSWORD | CREDIT CARD NO. & EXP. |
|---|---|---|---|
| SELLER 1 | USER NAME (1) | PASSWORD (1) | XXXXXXXXX EXP. 07/03 |
| ... | ... | ... | ... |
| SELLER (N) | USER NAME (N) | PASSWORD (N) | CREDIT CARD (N) |

DAS PREDICTIVE MODELING AND REPORTING FUNCTION

CROSS-REFERENCE TO RELATED APPLICATIONS

This application is a continuation of U.S. patent application Ser. No. 10/464,585, entitled DAS PREDICTIVE MODELING AND REPORTING FUNCTION filed on Jun. 18, 2003, which claims the benefit of U.S. Provisional Application Ser. No. 60/389,534 filed on Jun. 18, 2002, the entireties of which are incorporated herein by reference.

TECHNICAL FIELD

The present invention relates to an e-commerce multiple criteria buying and selling methodology and more particularly to a method and apparatus of using the e-commerce multiple criteria buying and selling methodology to conduct business electronically.

BACKGROUND OF THE INVENTION

The buying and selling of products and services has resulted in a vast array of buying schemes which are used to vary the price at which such products are sold.

One of the most common buying schemes which business encounter everyday is known as volume buying. According to this buying scheme, sellers set a fixed unit price for their products based on the volume of units that a buyer is willing to purchase. Buyers desiring to purchase products from the seller are each required to pay the same fixed price depending on the volume of units the buyer is purchasing. If a seller finds that the demand for a given product is greater or less than expected, the seller may later adjust the fixed price per unit of the product to account for such findings. Although the fixed price per unit system provides a simple way for a seller to conduct business with multiple buyers, one drawback of this buying scheme is that it fails to provide buyers with a choice between a variety of different buying criteria that may be just as important or more important to the buyer than price.

For example, a buyer that is in need of goods, such as raw materials to make products for an expedited order may be willing to pay a higher price for a faster delivery time. Another buyer may be concerned with the quality of the goods they are purchasing, such that the buyer would pay a higher price for goods having a minimum number of defects. Yet another buyer may be concerned with the warranty time allotted for the goods they are purchasing, and may want the warranty of the goods that they are purchasing to match or exceed the warranty the buyers are offering their own customers.

Yet another buying scheme which has been advanced in recent years is buyer-driven bidding. According to this buying scheme, a single buyer desiring to obtain a product communicates a price at which the buyer is willing to purchase the product to multiple sellers. Each of the sellers is provided an opportunity to review the buyers price. A sale is complete when one of the sellers agrees to sell the product to the buyer at the price suggested by the buyer. A buyer-driven bidding scheme is described in U.S. Pat. No. 5,794,207 assigned to Walker Asset Management Limited Partnership of Stamford, Conn. Another buyer-driven bidding scheme is described in U.S. Pat. No. 5,897,620 assigned to priceline.com Inc of Stamford, Conn. While the buyer-driven bidding scheme provides advantages for certain types of transactions when, for example, sellers may be willing to sell products at lower than normal prices, the uncertainties involved with whether a buyer's offer will be accepted is often problematic for high volume commercial transactions in which the reliability that a transaction will be complete is of paramount importance. Another problem with the present buying schemes is that the buyer=s have no control in determining the criteria of the product or services that they may receive, while the seller has no control of the type of purchase that the buyer=s request.

While the buying schemes described above have various advantages and disadvantages in different situations, a commonality among all of the buying schemes is that each buyer is not given the opportunity to choose amongst different buying criteria, which could be more important to the buyer than the price of the goods and/or services. Furthermore, each seller is not given a chance to offer their goods and/or services based on different selling criteria. In many instances sellers are not even aware of what buyer=s consider important buying criteria. Additionally, sellers are sometimes not aware of what other selling criteria that other seller=s might offer buyers.

Accordingly, there is a strong need in the art for a multiple criteria buying and selling scheme which provides both buyers and sellers more control in a commercial purchasing transaction, and overcomes the above mentioned drawbacks and others.

SUMMARY OF THE INVENTION

The following presents a simplified summary of the invention in order to provide a basis understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

According to one aspect of the present invention, a multiple criteria buying and selling methodology is provided. The multiple criteria buying and methodology is structured to provide buyers and sellers with a variety of information relating to criteria in the purchasing of products to complete a business transaction. By providing the buyers and sellers with a variety of information, the buyers are able to make an informed decision in the buying process relating to each buyer's particular needs, and the seller's are able to control the type of purchases for their goods and services. To facilitate buying and selling products using the multiple criteria buying and selling methodology, an electronic forum is provided whereby buyers and sellers are able to conveniently exchange information and order products.

In the multiple criteria buying and selling methodology, a seller initially establishes a deal structure for a product, which provides selling criteria information relating to the purchasing of the product, such as volume per unit price, quality, delivery time and warranty information that a buyer will be able to review if the selling criteria matches a buyer inputted buying criteria. The deal structure is preferably set up so as to provide buyers with both price and non-price criteria information that the buyer's would consider important in a purchase of the type of product being offered by the seller. The deal structure is electronically made available to potential buyers of the product. For example, the deal structure may be displayed on an Internet site.

Accordingly, the multiple criteria buying and selling methodology provides more control for both buyers and sellers in the purchasing process. Buyers define the buying criteria which they feel is important in purchasing a particular good or service. Sellers define the selling criteria which the seller feels is important to both the buyer and the seller. The buyer is provided with a list of deals in which the buyer's buying criteria falls within the seller's selling criteria. Furthermore, the multiple criteria buying methodology encourages the completion of deals. The multiple criteria buying and selling methodology allows a buyer to complete a deal in an expedited manner. The buyer can control their criteria and the seller can control their criteria allowing a more efficient manner of conducting business.

In one aspect in accordance to the present invention, a lead generator component provides management and generation of current and prospective customers. In another aspect in accordance to the present invention, the lead generator component can import prospective leads into an integrated DAS system.

In another aspect of the present invention, an account management component provides management of current and prospective customer information. In one aspect of the present invention, prospective companies that have registered will have such information available in an account management component.

Yet another aspect of the present invention is a marketing component which researches market information and can generate advertisements. In one aspect of the present invention, the market component searches for a number of relationships based on, but not limited to, lead generation, customer registration, account management, price administration, e-marketing campaign, and/or demand aggregation management.

In another aspect in accordance to the present invention, a printstream methodology is provided in which the printing of print orders is mitigated. The print orders of a first customer can be aggregated with the print orders of a second customer, in which the print orders can be forwarded and printed directly.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

BRIEF DESCRIPTION OF THE DRAWINGS

FIG. 14 illustrates a generic registration in accordance to one aspect of the present invention.

FIG. 15 illustrates an on-line registration form for a buyer in accordance with an aspect of the present invention.

FIG. 16 illustrates an on-line registration form for a seller in accordance with an aspect of the present invention.

FIG. 17 illustrates a generic information table in accordance to one aspect of the present invention.

FIG. 18 illustrates a buyer information table stored in accordance with an aspect of the present invention.

FIG. 19 illustrates a seller information table stored in accordance with an aspect of the present invention.

DETAILED DESCRIPTION OF THE INVENTION

Figure 1:
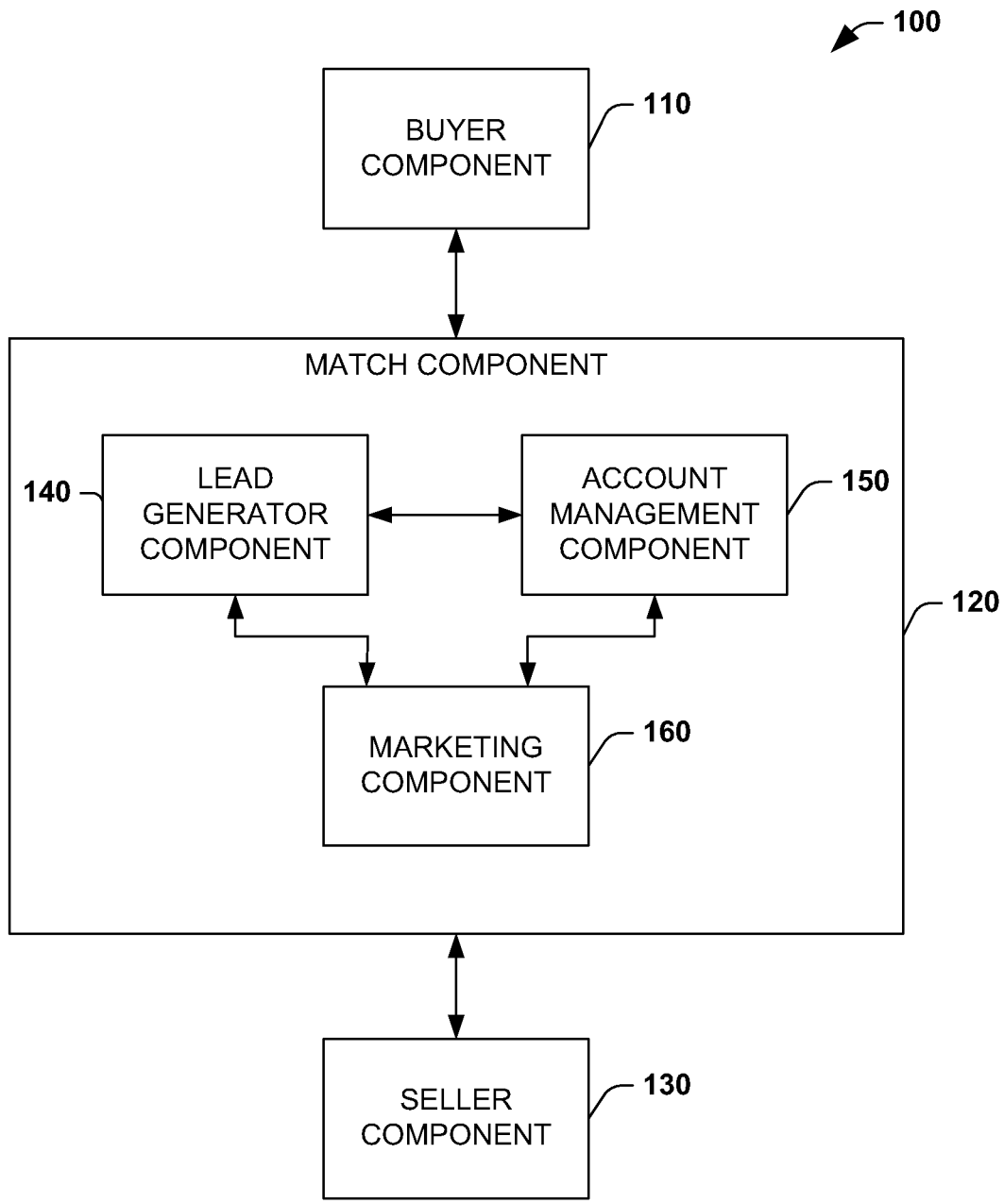
FIG. 1 is a block diagram depicting a system in accordance to one aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Referring to FIG. 1, a system 100 comprises a buyer component 110, a match component 120 (e.g., a central server, and/or an aggregation system), and a seller component 130. The buyer component 110 provides for collecting a buyer's criteria for a purchase and/or potential purchase. The seller component 130 provides for collecting a seller's criteria for a sale and/or potential sale. The match component 120 (e.g., a central server, and/or an aggregation system) provides for matching a seller and a buyer based at least upon the buyer and/or seller criteria collected. For example, if buyer A has criteria such as warranty, and quality for a product and/or service collected from a buyer component, the system of 100 provides for a seller with the same and/or similar criteria for a deal. However, buyer B may have criteria such as price, and delivery time for a product and/or service collected from a buyer component, in which case system 100 provides for a seller with the same and/or similar criteria for that deal. The present invention is not limited to basing the deal upon matching one buyer to one seller or one seller to one buyer. In one aspect in accordance of the present invention, the system 100 provides matching multiple buyers to multiple sellers and/or multiple sellers to multiple buyers. The system 100 provides matching at least one buyer and at least one seller based at least in part upon the buyer and/or criteria.

In another example, buyer A and buyer B need to purchase a car. Seller C and seller D have cars to sell. The present invention provides buyer A and buyer B to communicate buying criteria (e.g., warranty, type, mileage, quality, etc.) and match a seller (in this case seller C or seller D) to the buyer based at least upon the collected buyer's and/or seller's criteria.

In yet another aspect in accordance to the present invention, the system 100 can utilize a printstream methodology in which print orders from a first customer and a second customer are aggregated and forwarded directly to a printer.

The match component 120 consists of a lead generator component 140, an account management component 150, and a marketing component 160. The lead generator component 140 provides management and generation of current and prospective customers. In one aspect in accordance to the present invention, the lead generator component 140 can import prospective leads into an integrated DAS system. For example, the prospective leads can include, but are not limited to include, names, titles, phone numbers, company names, background contact if any, etc. for the generation of a name and password protected call list. The lead generator component 140 also provides for removal of records. For example, the lead generator component 140 can remove a record if there are duplicates and/or if an account is already registered under another agent. In another example, the lead generator component 140 provides a list of fields with pertinent information in which a link allows the user to connect to the party in question via phone, email, and/or mail. In another aspect of the present invention, the lead generator component 140 provides a field note in which a user can input notes regarding pertinent information.

In another aspect of the present invention, the lead generator component 140 can provide help documents, such as, but not limited to, scripts for telemarketing the product and/or service in question, video-conferencing ability, streaming video to present solutions to common objections, a "help" link providing the agent with a help desk via phone, and/or email, commonly asked question of users, and attachments on the product and/or service in question.

In yet another aspect of the present invention, the lead generator component 140 utilizes artificial intelligent techniques to facilitate processing a response to a caller objection. For example, if a caller objection states the price as being too high, the lead generator component 140 can utilize artificial intelligent techniques to process a response to the stated objection. In another aspect in accordance to the present invention can utilize a voice recognition component in order to facilitate processing a response to a caller objection. For example, the caller could state key words in which the lead generator can provide a response to the stated objection via key word(s).

In another aspect in accordance to the present invention, the lead generator component 140 can fill in a notes section automatically and/or the user can enter only the salient information. The lead generator component 140 can also provide any follow up to a caller such as, but not limited to, sending a fax with information, email, calling on a certain date, etc. In one aspect of the present invention, appropriate links are provided in which a user can enter a fax number and an attachment via email is sent automatically on the product and/or service. For example, the attachment can contain the first name of the person contacted.

In yet another aspect of the present invention, the lead generator component 140 provides an appropriate response and follow-up sequence based at least upon an interest of the product and/or services. For example, the lead generator component 140 can automatically respond within X days based upon a mild interest in the product and/or service (where X is an integer greater than 0).

Another aspect of the present invention is the lead generator component 140 allows the programming of strategies and/or techniques to increase efficiency. For example, if response A is best for objection B, the lead generator component 140 can associate response A for all objections B.

In yet another aspect of the present invention, the lead generator component 140 provides utilization of registration (as discussed below), price administrator (as discussed below), e-market campaign (as discussed below), demand aggregation tool (as discussed below), auto-price curve feature (as discussed below), price curves generated from telemarketing activities and online registrations (as discussed below), automatic and semi-automatic price curves tied to registration page information (as discussed below), a master screen view (as discussed below), real-time updating of price curves (as discussed below), volume tracker for recording price breaks of customers (as discussed below), tracking sales funnel (as discussed below), and/or predictive closing of a new customer (as discussed below).

The account management component 150 provides management of current and prospective customer information. In one aspect of the present invention, prospective companies that have registered will have such information available in an account management component 150. The account management component 150 can provide a call component which can work from a customer file. For example, a company link can be on a calendar for a specified date and time. The account management component 150 provides information during the call and provides tips regarding any objections. In addition, the account management component 150 can include attachments for responding to the customer via email, fax, PDA component, etc.

In another aspect in accordance with the present invention, the account management component 150 provides a customer profile based at least upon a history of transactions including correlation between certain criteria and probability to close. For example, if customer states cost savings as a criteria associated to close, the account management component 150 provides for marking such customer as probable for closing regarding a product and/or service with low cost. Another aspect of the present invention is the account management component 150 allows registration to change based at least in part upon new information and/or track new correlations to expedite the closing process.

In yet another aspect in accordance to the present invention, the account management component 150 provides terms of aggregation and a price for the customer. The account management component 150 can contemplate variables associated with a contract. For example, such variables can be, but are not limited to, aggregation outside the industry, price curve calculation, breaks included, length of curve being open, contract signing to bring curve down by a percentage, discounts based upon other product usage, etc. In one aspect of the present invention, the variables are pre-set by management for the account management component 150. For example, the variables can be stored in a data store component in which the variables can be changed only with a username and password. Still in another aspect of the present invention, the account management component 150 provides automatic pricing based on a plurality of factors. For example, the factors can be pre-set by the company such as, but not limited to, current price, competitor price, product and/or service volume, warehouse capacity, etc.

In yet another aspect of the present invention, the account management component 150 provides utilization of registration (as discussed below), price administrator (as discussed below), e-market campaign (as discussed below), demand aggregation tool (as discussed below), auto-price curve feature (as discussed below), price curves generated from telemarketing activities and online registrations (as discussed below), automatic and semi-automatic price curves tied to registration page information (as discussed below), a master screen view (as discussed below), real-time updating of price curves (as discussed below), volume tracker for recording price breaks of customers (as discussed below), tracking sales funnel (as discussed below), and/or predictive closing of a new customer (as discussed below).

The marketing component 160 researches market information and can generate advertisements. In one aspect of the present invention, the market component 160 searches for a number of relationships based on, but not limited to, lead generation (e.g., via the lead generator component 140), customer registration, account management (e.g., via the account management component 150), price administration, e-marketing campaign, and/or demand aggregation management.

In one aspect of the present invention, the marketing component 160 provides a turnover rate of a portfolio of users expressed as a percentage, charted by, inter alia, initial price, number of price breaks, and length of breaks. For example, the marketing component 160 can determine a company start price which is below the company's current price in which two price breaks occur within X months. Thus, the company has a high probability of staying within the program and the marketing component 160 provides an assignment of, for example, a low turnover risk to the company. In another example, the marketing component 160 can determine that a company has a high-risk ratio in which case a pre-determined length extension and/or contract extension can be recommended.

In another aspect of the present invention, the marketing component 160 can determine a follow-up program for companies that were not closed. For example, the marketing component 160 can compile objections which were not adequately answered, from which new responses can be generated for the lead generator component 140 and/or the account management component 150.

In yet another aspect of the present invention, the marketing component 160 can track information such as, but not limited to, online surveys filled out by individuals regarding quality, service, and level of satisfaction. For instance, the marketing component 160 can determine a risk profile in which potential customer defections are monitored and/or established.

In still another aspect of the present invention, the marketing component 160 can track and/or provide in real-time information including but not limited to number of leads generated per day (e.g., extrapolated annually with current close rate and volume to protect annual sales), number of leads closed on a regular basis (e.g., as completed by the account management component 150), percentage of all registered deals that result in a close, daily profiles (e.g., current revenue, new revenue, less attrition, less discount on curve=net profit (after commissions)), commissions paid to resellers to date, and percentage of all registered leads (by an individual agent) that result in a close (e.g., tracking of agents success, alerts to under performing agents).

In still another aspect of the present invention, the marketing component 160 can track and/or provide in real-time information including but not limited to average sales cycle time (e.g., by industry, size of registrant, response to a particular question, etc.), growth in volume by a predetermined time period (e.g., quarter and/or what a customer uses per month), projected growth by the end of a predetermined time period; price curve discounts given to date across different customers, subgroups, total customer base, annual savings to date for all customers (e.g., used in promotional items), pricing trends and the impact on revenues and/or commission schedules, and percentage of customers no longer on an active price curve (e.g., static pricing).

According to another aspect of the present invention, the marketing component 160 may provide recording, grouping, and/or forwarding of other products of interest. For example, the marketing component 160 can contact suppliers for a product with ready-made leads based at least in part upon other products of interest marked by a customer. For instance, a customer A can mark an interest for clothing, in which the marketing component 160 can contact clothing suppliers with customer A associated leads from a lead generator component 140.

In yet another aspect of the present invention, the marketing component 160 provides utilization of registration (as discussed below), price administrator (as discussed below), e-market campaign (as discussed below), demand aggregation tool (as discussed below), auto-price curve feature (as discussed below), price curves generated from telemarketing activities and online registrations (as discussed below), automatic and semi-automatic price curves tied to registration page information (as discussed below), a master screen view (as discussed below), real-time updating of price curves (as discussed below), volume tracker for recording price breaks of customers (as discussed below), tracking sales funnel (as discussed below), and/or predictive closing of a new customer (as discussed below).

Furthermore, in one aspect of the present invention, the system 100 can be stored on computer readable media including, but not limited to, an ASIC (application specific integrated circuit), CD (compact disc), DVD (digital versatile disk), ROM (read only memory), floppy disk, hard disk, EEPROM (electrically erasable programmable read only memory) and memory stick.

In yet another aspect of the present invention, system 100 provides a data store to store, inter alia, history of records for the buyer component, the seller component and/or the match component. Consequently, the data store allows a buyer and/or seller to view history records for bookkeeping and other accounting services.

In another aspect of the present invention, an artificial intelligence technique (e.g., Bayesian learning methods that perform analysis over alternative dependent structures and apply a score, Bayesian classifiers and other statistical classifiers, including decision tree learning methods, support vector machines, linear and non-linear regression and/or neural network representation) is employed to infer a match between a seller and a buyer or vice versa. The system 100 can utilize artificial intelligence (e.g., Bayesian learning methods that perform analysis over alternative dependent structures and apply a score, Bayesian classifiers and other statistical classifiers, including decision tree learning methods, support vector machines, linear and non-linear regression and/or neural network representation) to facilitate the matching of buyer(s) and seller(s). The system 100 can employ various inference schemes and/or techniques in connection with filtering desired or undesired matches between a buyer and a seller. Inference(s) can also be employed to identify a specific context or action, or can generate a probability distribution over states, for example. The inference can be probabilistic which is to say the computation of a probability distribution over states of interest based on a consideration of data and events. Inference(s) can also refer to techniques employed for composing higher-level events from a set of events and/or data. Such inference(s) result in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

In yet another aspect in accordance to the present invention, the system 100 provides for a display to the user (e.g., buyer and/or seller) to display results. For example, the display can be, but is not limited to, a computer monitor, a television screen, a personal digital assistant (PDA) and/or a touch screen.

Figure 2:
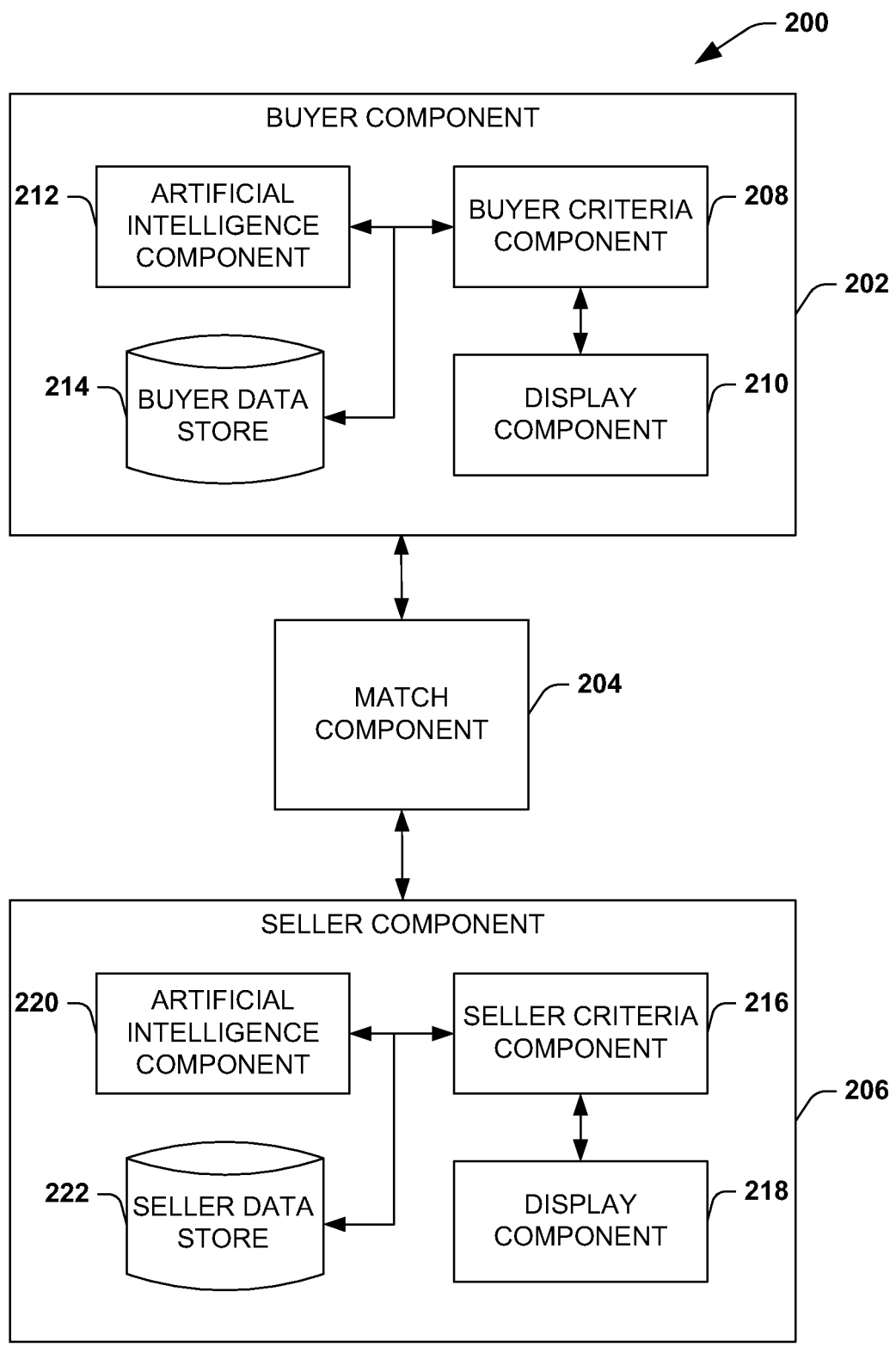
FIG. 2 is a block diagram depicting a system in accordance to one aspect of the present invention.

Turning to FIG. 2, a system 200 comprises a buyer component 202, a match component 204 (e.g., central server, and/or an aggregation system), and a seller component 206. The match component 204 (e.g., a central server, and/or an aggregation system) provides for matching a seller and a buyer based at least upon the buyer and/or seller criteria collected. In one aspect of the present invention, the match component 204 can consist of a lead generator component, an account management component, and a marketing component, as described supra. Furthermore, it should be noted that match component 204 can be configured to provide buyers and sellers with a convenient forum in which to buy and sell goods in accordance with a multiple criteria buying and selling methodology.

The buyer component 202 includes a buyer criteria component 208, a display component 210, an artificial intelligence component 212, and a buyer data store 214. The buyer criteria component 208 analyzes a buyer's criteria for a purchase and/or potential purchase. According to one aspect of the present invention, the buyer criteria component 208 can allow a user to specify the criteria of interest for a purchase. For example, if the buyer is looking to purchase a hat, the buyer criteria analyzer 208 could determine criteria of importance such as price and brand. However, a separate purchase could invoke the buyer criteria component to determine different criteria of importance. In other words, the criteria based on matching a buyer and seller can differ based upon the type of purchase being made.

The display component 210 allows information to be presented to a user on the buyer side of the system 200. The display component 210 can be coupled to the buyer criteria component 208, for example, via a parallel electrical connection, a serial electrical connection, a computer network connection (e.g., utilizing the Internet), a Digital Subscriber Line ("DSL"), a telephone line, a cable modem, a wireless data communications link and/or integrated services digital network ("ISDN"). Additionally and/or alternatively, the display component 210 can connected to the buyer criteria component 208 via a USB bus and/or a wireless connection.

The artificial intelligence component 212 is capable of utilizing artificial intelligence (e.g., Bayesian learning methods that perform analysis over alternative dependent structures and apply a score, Bayesian classifiers and other statistical classifiers, including decision tree learning methods, support vector machines, linear and non-linear regression and/or neural network representation) to facilitate matching a buyer(s) and a seller(s) based at least in part upon one buyer criteria. The artificial intelligence component 212 can employ various inference schemes and/or techniques in connection with filtering desired or undesired buyer and seller matches. Furthermore, inferences can be employed to identify a specific context or action, or can generate a probability distribution over states, for example. Inferences can be probabilistic, that is, the computation of a probability distribution over states of interest based on a consideration of data and events. Inferences can also refer to techniques employed for composing higher-level events from a set of events and/or data. Such an inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can also be employed in connection with performing automatic and/or inferred action in connection with the subject invention.

According to an aspect of the present invention, the system 200 provides for inferring criteria of each buyer and/or seller based on, for example, a user history profile. For instance, if a buyer and/or seller is consistently interested in brand as a buying and/or selling criteria, the artificial intelligence component 212 could infer this criteria for future deals.

The buyer data store 214 stores buyer information. For example, the buyer data store 214 can be computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention. In one aspect of the present invention, the buyer data store 214 stores buyer information such as, but not limited to, name, address, phone number, history of purchases, buyer criteria, user name and/or password.

The seller component 206 includes a seller criteria component 216, a display component 218, an artificial intelligence component 220, and a seller data store 222. The seller criteria component 216 analyzes a seller's criteria for a sale and/or potential sale. According to one aspect of the present invention, the seller criteria component 216 can allow a user to specify the criteria of interest for a sale. For example, seller A can have a large quantity of watches that do not include a lengthy warranty. Thus, the seller criteria component may utilize quantity and length of warranty as criteria to match with one or more buyers.

The display component 218 permits information to be presented to a user on the seller side of the system 200. The display component 218 can be coupled to the seller criteria component 216, for example, via a parallel electrical connection, a serial electrical connection, a computer network connection (e.g., utilizing the Internet), a Digital Subscriber Line ("DSL"), a telephone line, a cable modem, a wireless data communications link and/or integrated services digital network ("ISDN"). Additionally or alternatively, the display component 218 can be connected to the seller criteria component 216 via a USB bus and/or a wireless connection.

The artificial intelligence component 220 can utilize artificial intelligence (e.g., Bayesian learning methods that perform analysis over alternative dependent structures and apply a score, Bayesian classifiers and other statistical classifiers, including decision tree learning methods, support vector machines, linear and non-linear regression and/or neural network representation) to facilitate matching a seller and a buyer based at least in part upon one seller criteria. The artificial intelligence component 220 can employ various inference schemes and/or techniques in connection with filtering desired or undesired seller and buyer matches. Furthermore, Inferences can be employed to identify a specific context or action, or can generate a probability distribution over states, for example. Inferences can be probabilistic, that is, the computation of a probability distribution over states of interest based on a consideration of data and events. Inferences can also refer to techniques employed for composing higher-level events from a set of events and/or data. Such an inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can also be employed in connection with performing automatic and/or inferred action in connection with the subject invention.

The seller data store 222 stores seller information. For example, the seller data store 222 can be computer readable media including, but not limited to, an ASIC (application specific integrated circuit), CD (compact disc), DVD (digital versatile disk), ROM (read only memory), floppy disk, hard disk, EEPROM (electrically erasable programmable read only memory) and memory stick in accordance with the present invention. In one aspect of the present invention, the seller data store 222 stores seller information such as, but not limited to, name, address, phone number, history of purchases, seller criteria, user name and/or password.

Figure 3:
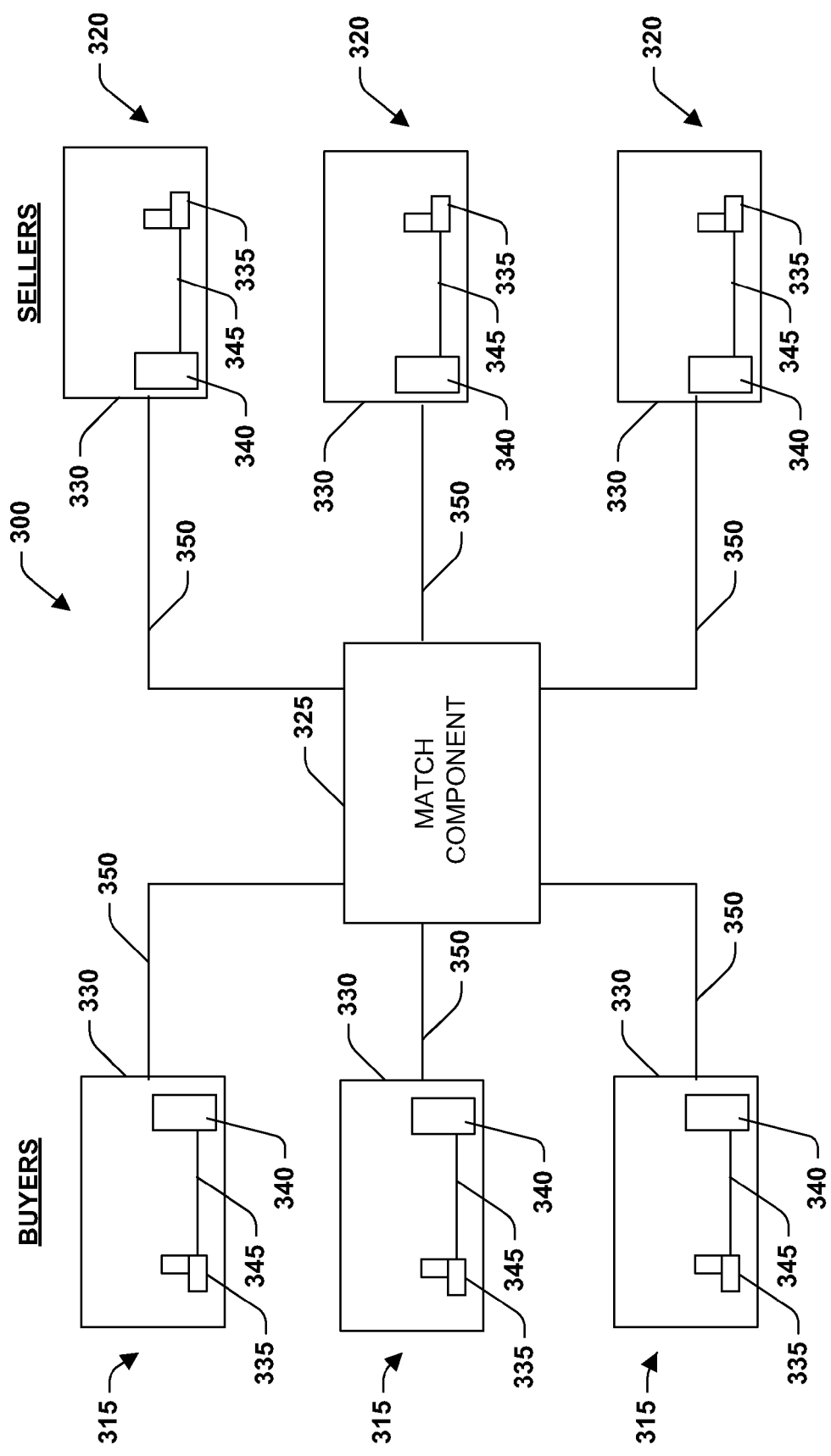
FIG. 3 illustrates a diagrammatic view of a system for electronically conducting business in accordance with an aspect of the present invention.

FIG. 3 is a system 300 in which a plurality of buyers 315 and sellers 320 are electronically linked via match component 325. In one aspect of the present invention, the match component 325 can be comprised of a lead generator component, an account management component, and a marketing component. In another aspect of the present invention, the match component 325 is a central server. The central server provides buyers 315 and sellers 320 with a forum in which to buy and sell goods in accordance with multiple buying and selling criteria. For example, the forum can be an Internet web page where sellers 320 are able to post product information and the buyers 315 are able to order products. The system 300 allows a seller 320 to post a number of deals for a given product and/or service, which vary according selling criteria. Selling criteria can be, but not limited to, price, volume, quality, and delivery time. Each buyer 315 can enter criteria that the buyer requires for the completion of a deal. A list of sellers 320 and prospective deals offered by these sellers 320 is generated for the buyers 315. The list of sellers and prospective deals is a matching of sellers 320 and buyers 315 based upon the user criteria. Buyer 315 can then review the list of deals and choose a deal based at least in part upon the buyer criteria. In this manner, each of the buyers 315 can be certain that particular criteria (e.g., thresholds) have been met allowing the completion of a deal.

It is to be appreciated the present invention can be used for the purchasing and/or selling of a variety of different products and/or services. For example, the present invention may be applied within the context of purchasing and/or selling airline tickets wherein buyers' criteria may include, for instance: (1) reputation of airline; (2) reliability; (3) timeliness; (4) price; (5) number of alternative flights; (6) comfort; (7) quality of service; and (8) quality of foods. The sellers' criteria may include, for example: (1) volume of tickets; (2) buyers' versatility in time schedule; (3) buyer=s method of payment, etc.

In another example, the present invention can be applied in the context of purchasing and/or selling an automobile wherein buyers' criteria may include, for example: (1) reputation of automobile manufacturer; (2) reputation of dealer; (3) price of automobile; (4) delivery options; (5) automobile availability; (6) safety; and (7) financing terms; etc. While, the seller's criteria can include, for example: (1) buyer's creditworthiness; (2) desired finance terms; (3) delivery requests of buyer; (4) delivery dates; etc.

The system 300 allows buyers and/or sellers of products and/or services to pre-select a plurality of criteria to base a purchase and/or sale prior to negotiating a deal for the purchase and/or sale. In another aspect of the present invention, the criteria can vary depending on the particular product and/or service. For example, the criteria for the purchase and/or sale of clothing can differ from the criteria for the purchase and or sale of computer products. The scope of the present invention as defined in the hereto appended claims intends to include any product and/or service (and plurality of pre-selected criteria associated therewith) suitable for deal-making.

Each of the buyers 315 and sellers 320 can access the match component 325 (e.g., central server, and/or an aggregation system) in any of a plurality of ways. For example, in one aspect, each buyer 315 and seller 320 can be part of separate establishments 330 which include one or more respective computer systems 335 and local servers 340. For example, the computer systems 335 can be a desktop or laptop computer with a local area network (LAN) interface for communicating over a network backbone 345 to the local server 340. The local servers 340 can interface with the match component (e.g., the central server, and/or an aggregation system) via network 350. For example, network 350 can be, but is not limited to being implemented by a wired (e.g., electrically conductive or optical) or wireless (e.g., Bluetooth, cellular, etc.) data communications protocol. Those skilled in the art will understand and appreciate various data communications protocols (e.g., TCP/IP, Ethernet, Asynchronous Transfer Mode (ATM), Fiber Distributed Data Interface (FDDI), Fiber Channel, etc.) that could be utilized to implement suitable data communications over the network in accordance with an aspect of the present invention. In another aspect of the present invention, the computer system 335 can interface with the match component 325 (e.g., the central server, and/or an aggregation system) using a modem, wireless local area and/or wide area networks, etc. Furthermore, while the buyers 315 and sellers 320 are shown to communicate with the match component 325 (e.g., the central server, and/or an aggregation system) via different computer systems 335, it will be appreciated that the buyers 315 and/or sellers 320 can access the match component 325 (e.g., the central server, and/or an aggregation system) from the same computer system 335.

Figure 4:
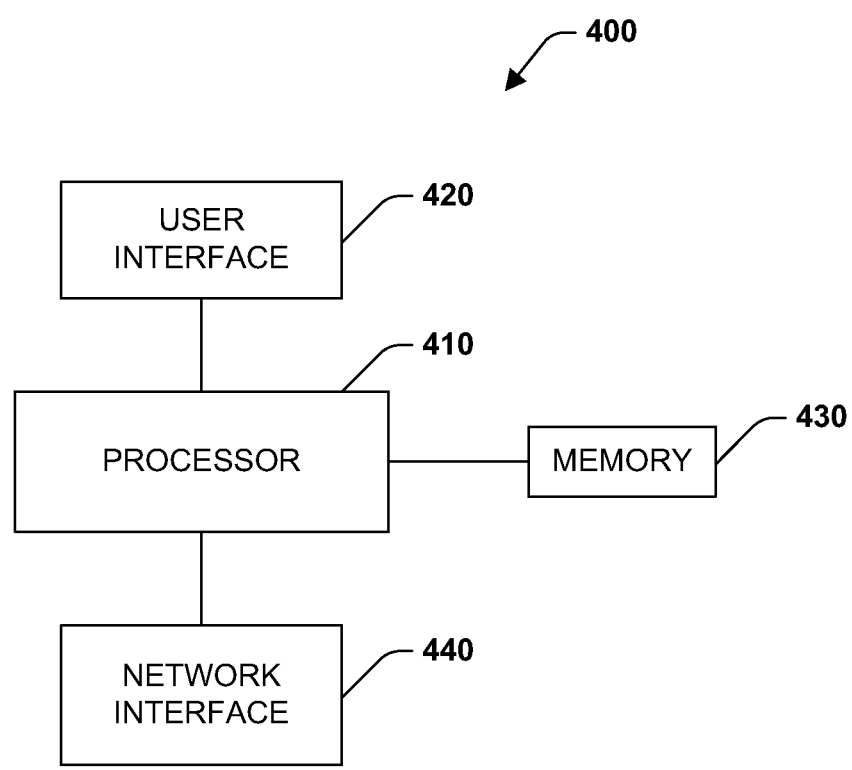
FIG. 4 illustrates a block diagram of a match component in accordance with an aspect of the present invention.

Referring to FIG. 4, a system 400 depicts an example match component 325 (e.g., a central server, and/or an aggregation system) in a block diagram. In particular, the match component 325 (e.g., a central server, and/or an aggregation system) includes a central processor 410. The central processor 410 provides for performing the various functions described herein. A memory 105 is coupled to the processor 410 and stores operating code and other data associated with the operations of the match component 325 (e.g., a central server, and/or an aggregation system). A user interface 420 provides an interface in which the match component 325 (e.g., a central server, and/or an aggregation system) can be directly programmed and/or accessed. In accordance with one aspect of the invention, the user interface 420 is coupled to the processor 410. The user interface 420 can be coupled to the match component via, for example, a parallel electrical connection, a serial electrical connection, a computer network connection (e.g., utilizing the Internet), a Digital Subscriber Line ("DSL"), a telephone line, a cable modem, a wireless data communications link and/or integrated services digital network ("ISDN"). In yet another example, the user interface 420 can be a monitor, keyboard and mouse. A network interface 440 provides multiple connections for transmitting and receiving information relating to buyers 315 and sellers 320.

Figure 5:
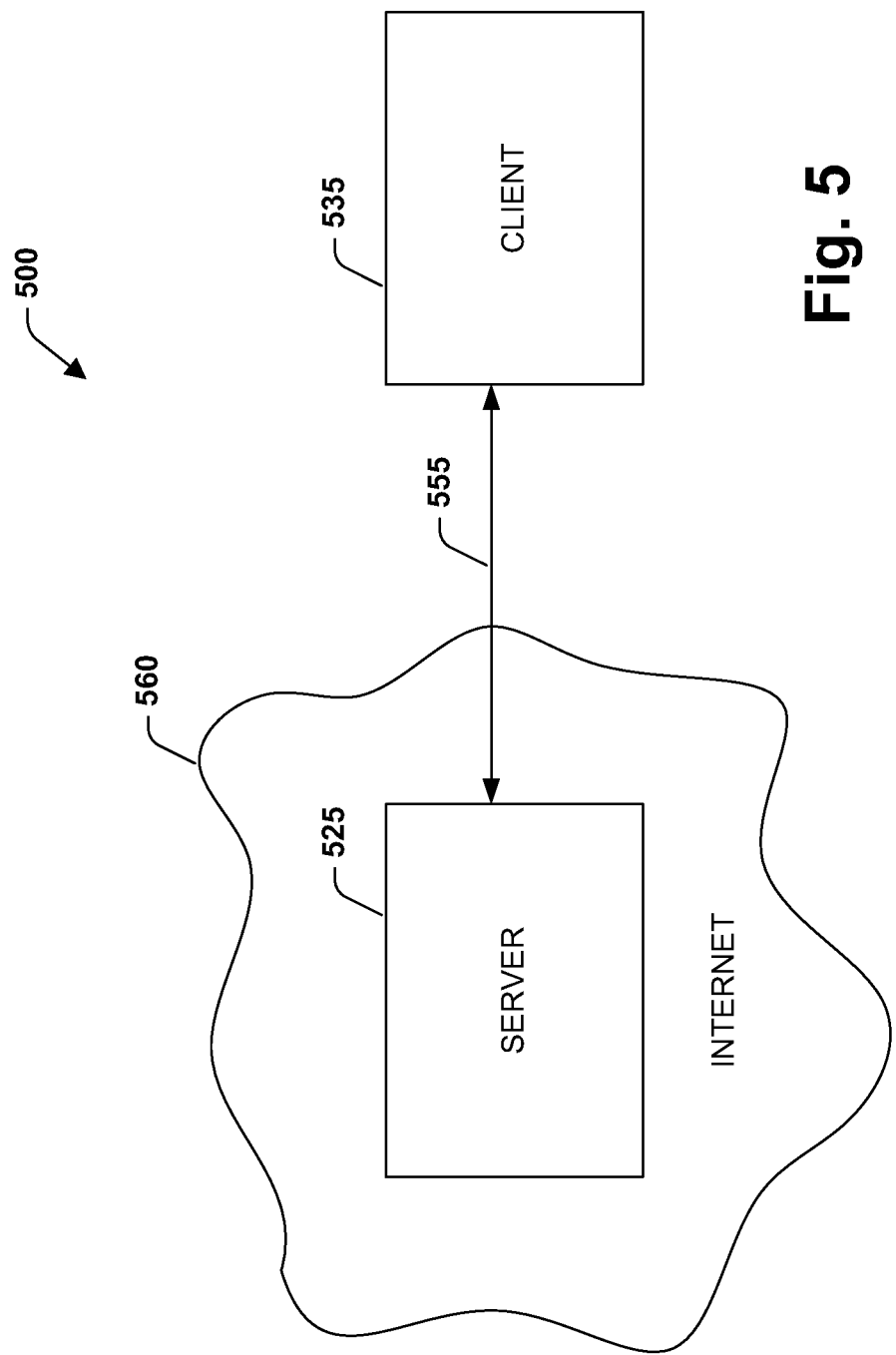
FIG. 5 is a schematic illustration of a client computer operatively coupled to a server computer system in accordance with an aspect of the present invention.

Now turning to FIG. 5, a schematic block diagram 500 depicting an exemplary environment according to one aspect of the present invention is presented. As illustrated, client computer system 535 is connected to a server 525, which is part of the Internet 560. The client 535 and server 525 can be connected via an Internet connection 555 using a public switched phone network, for example, such as those provided by a local or regional telephone operating company. The Internet connection 55 can also be provided by dedicated data lines, Personal Communication Systems ("PCS"), microwave, or satellite networks, for example, or any suitable means. In another example, the connection can be a wired (e.g., electrically conductive or optical) or wireless (e.g., Bluetooth, cellular, etc.) data communications protocol. Those skilled in the art will understand and appreciate various data communications protocols (e.g., TCP/IP, Ethernet, Asynchronous Transfer Mode (ATM), Fiber Distributed Data Interface (FDDI), Fiber Channel, etc.) that could be utilized to implement suitable data communications over the network in accordance with an aspect of the present invention. It is to be understood that the terms client and server are to be construed in the broadest sense, and that all such constructions of the terms are intended to fall within the scope of the hereto appended claims.

Figure 6:
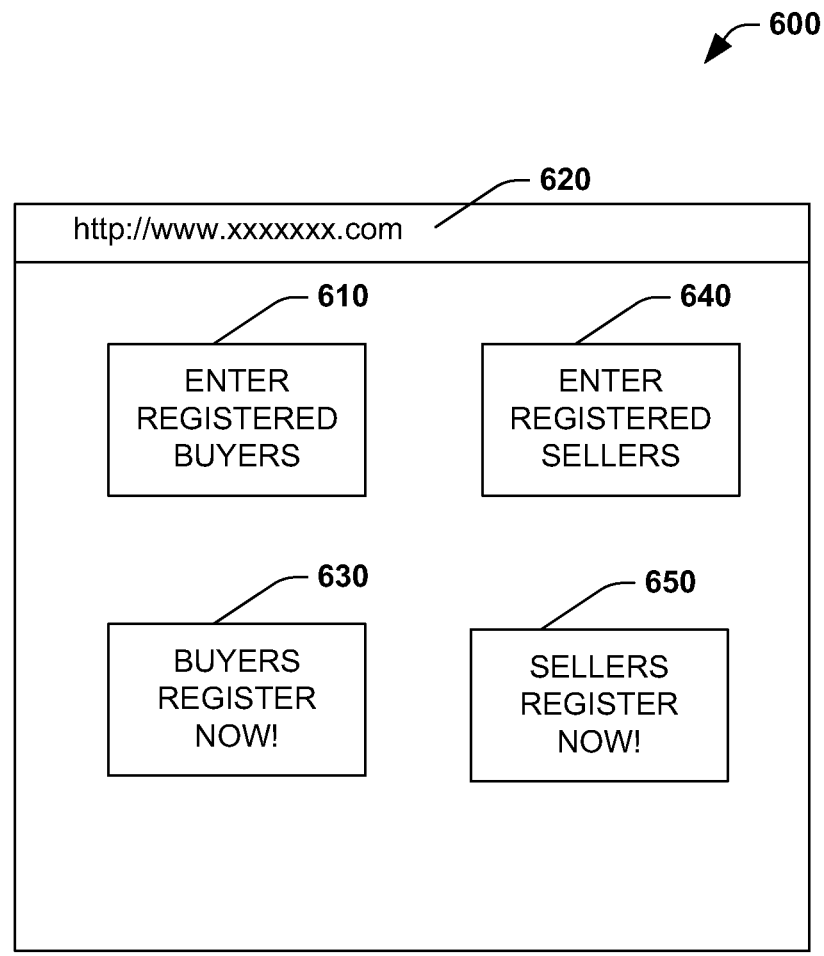
FIG. 6 illustrates a web page providing options to buyers and sellers desiring to conduct business electronically in accordance with an aspect of the present invention.

Turning now to FIG. 6, an exemplary Internet web page 600 provides buyers and sellers with access to a forum for conducting business using the multiple criteria buying methodology, is shown. The web page 600 includes hyperlinks for handling both registered and un-registered buyers and sellers of products and/or services. The Internet web page 600 can be in a hypertext transfer protocol address located at 620. In one example, registered buyers can select a hyperlink to a registered buyer login screen via hyperlink 610 while non-registered buyers can select a hyperlink to a non-registered buyer registration screen via hyperlink 630. In the same example, registered sellers can select a hyperlink to a registered seller login screen via hyperlink 640, while non-registered sellers can select a hyperlink to a non-registered seller registration screen via hyperlink 650. While the present aspect illustrates separate hyperlinks for buyers and sellers, it will be appreciated that such hyperlinks can alternatively be combined and the status of buyer or seller could be determined during a later stage in the login procedure. FIG. 6 is only one aspect in accordance to the present invention and is only to be construed as an example of an exemplary Internet web page.

Figure 7:
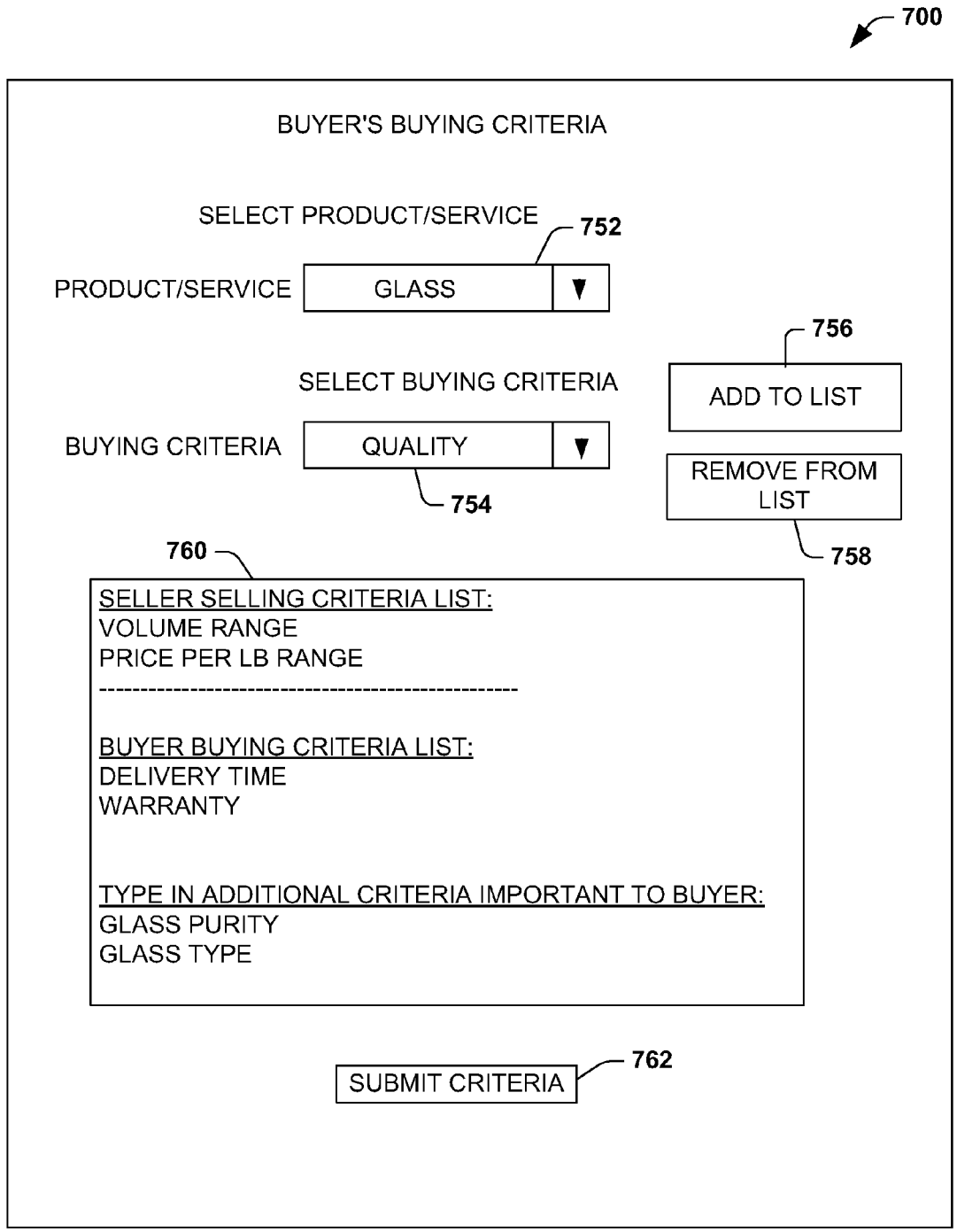
FIG. 7 illustrates a buyer's web page in accordance with an aspect of the present invention.

Now turning to FIG. 7, a buyer buying criteria exemplary web page 700 is shown in accordance with one aspect of the present invention. The web page 700 allows registered buyers enter several product buying criteria. For example, the buyer selects a product and/or service from a menu 752. It should be appreciated menu 752 can include any number of related or non-related goods and/or services. Upon selecting a product and/or service (e.g., glass) from the menu 752, a list of seller criteria can appears in a window 760. In one aspect of the present invention, the list of seller criteria appearing in the window 760 is the minimum inputs to be provided by the buyer to obtain a deal listing. These minimum inputs are decided by the sellers selling the individual product and/or service. The buyer can then add buyer buying criteria by selecting the criteria from a list 754, and selecting an "Add to List" link 756 with, for example, a computer mouse (not shown). If the buyer desires to remove a buyer buying criteria, the buyer can select the criteria in the window 760 and select a "Remove from List" button 758. Once the list is completed, the buyer can add additional criteria thought to be important to the buyer not in criteria from list 754. In one example, these added criteria will not be used by the present invention with the particular deal search, but will be provided to the sellers in order to be alerted of possible additional criteria important to the buyer. For example, the seller can opt to add to the selectable choices to the buyer's buying criteria upon realization of buyers choosing other criteria. Once the buyer buying criteria list is completed, the buyer can select the "Submit Criteria" button 762 for submission of the buyer=s buying criteria to build a "Buyer=s Product Ordering Criteria" model.

Figure 8:
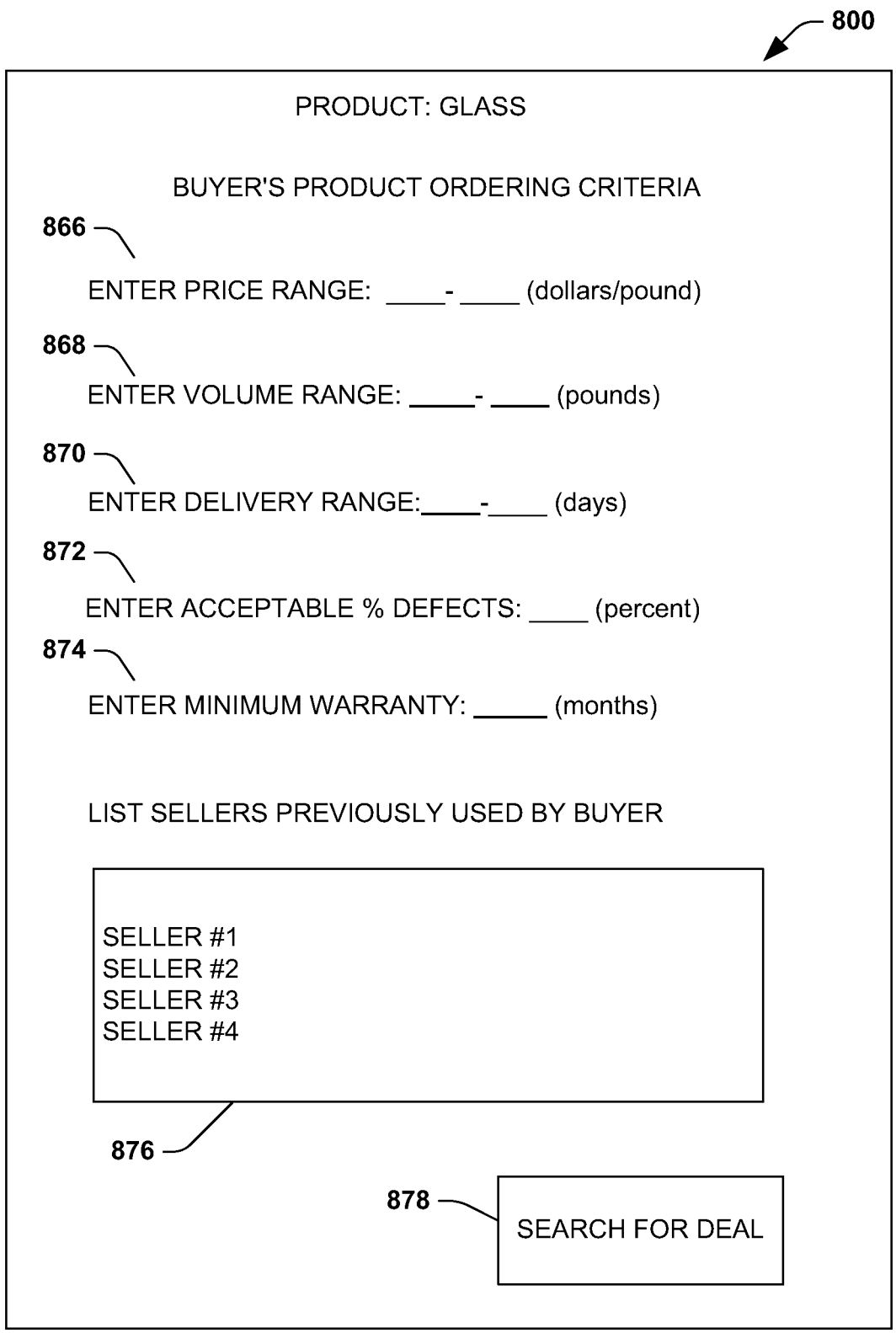
FIG. 8 illustrates a buyer's web page in accordance with an aspect of the present invention.

FIG. 8 is an exemplary Internet web page 800 in accordance to one aspect of the present invention in which registered buyers enter several product ordering criteria that are acceptable to the buyer. In this particular example, the buyer is looking to purchase raw glass by the pound. However, it will be realized that many different types of products and/or services can be bought and/or sold using the present invention. In the present exemplary example, the buyer's ordering criteria includes: price range 866 (e.g., in dollars per pound); volume range 868 (e.g., in number of pounds); delivery range 870 (e.g., in days); the acceptable amount of defects 872 (e.g., in percent); and the minimum required warranty 874 (e.g., in months). The web page 800 allows a buyer to list the names of the sellers in the window 876 that the buyer has bought products from previously. For example, by listing previous sellers, the seller can be notified of a repeat customer to whom a discount can be provided. The buyer can search for deals based on the collected criteria by selecting on a "Search for Deal" component 878. In one aspect of the present invention, a search engine can be utilized to search deals offered by various sellers of a product and/or service. The search engine can provide an output of deals to the buyer in which the buyer's ordering criteria are matched based at least upon the seller criteria.

Figure 9:
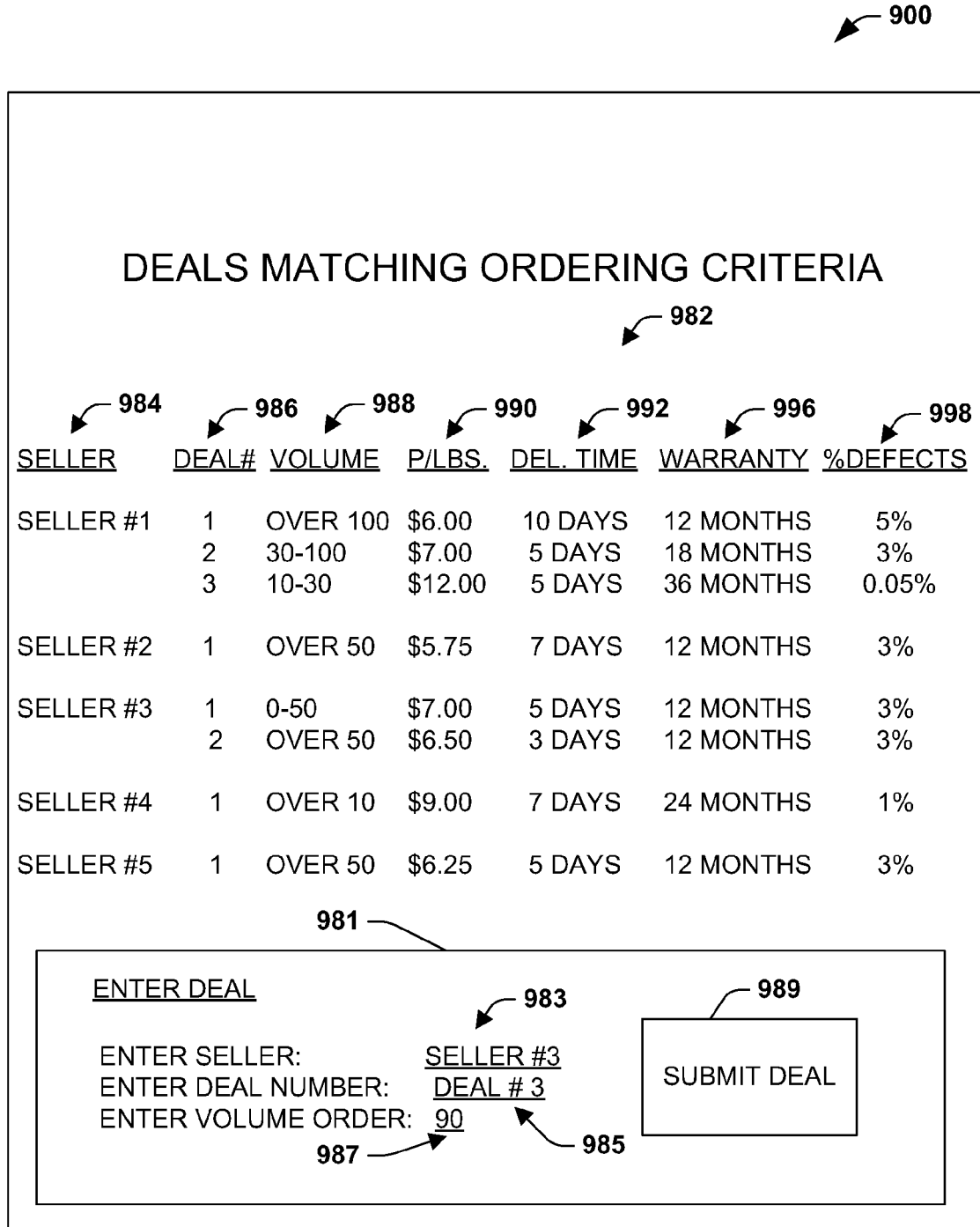
FIG. 9 illustrates a buyer's web page in accordance with an aspect of the present invention.

Referring to FIG. 9, an exemplary Internet web page 900 is shown in accordance with one aspect of the present invention. The web page 900 allows registered buyers to view deals 982 by which registered sellers have created and are able to order. For example, the deals 982 of the present invention can be set up based upon criteria such as, but not limited to, a seller name 984; a deal number 986; a volume ordering range required 988 to obtain a current price/pound level 990; an expected delivery time 992; a warranty period 996; and a percentage of defects 998 of the product and/or service the buyer can expect to receive in a given order. By utilizing such criteria in the example above, the present invention allows buyers to make an informed decision to order a deal based on criteria that are important to the particular buyer. For example, the deals 982 can be provided to the buyer based at least upon a match with corresponding seller criteria. The listing in web page 900 can list matching sellers and/or buyers based at least upon a buyer and/or seller criteria. Enter deal window 981 allows a buyer to select a particular deal that appeals to the user. For example, the buyer can enter the seller name in field 983, the deal number in field 985, and additional information for completion in field 987. Once the buyer has completed the enter deal window 981, the buyer can continue the order by selecting the submit deal link 989.

Figure 10:
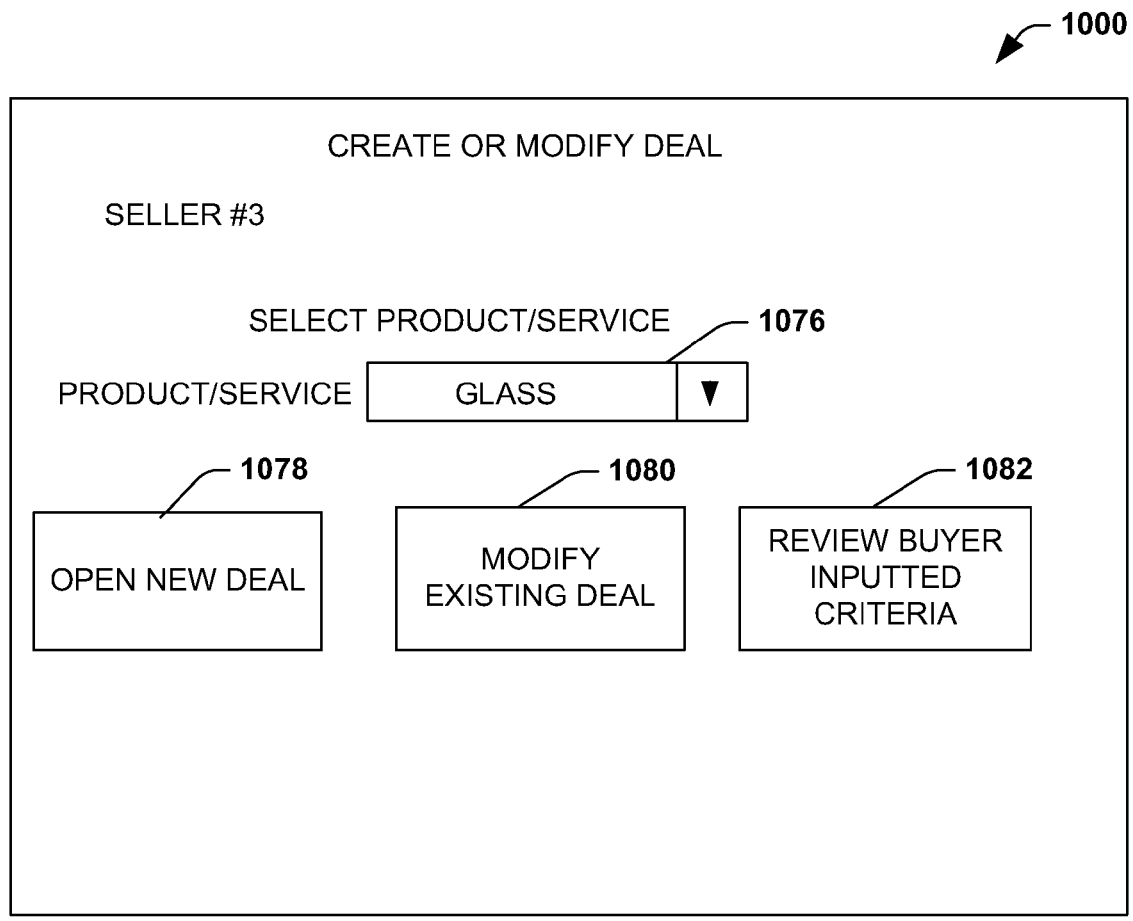
FIG. 10 illustrates a web page for a buyer to create or modify a deal in accordance with an aspect of the present invention.

Turning now to FIG. 10, an exemplary Internet web page 1000 allows registered sellers to create or modify deal(s). For example, the seller can choose a product and/or service from the product and/or service menu 1076 and choose to either select on an "Open New Deal" link 1078, a "Modify Existing Deal" link 1080 or a "Review Buyer Inputted Criteria" link 1082. The product and/or service menu 1076 allows a seller to view all current deals associated with the selected product and/or service. If the buyer selects the "Review Buyer Inputted Criteria" link 1082, the seller will be provided with a list of buyer buying criteria that the buyers manually inputted into the window 760 of FIG. 7. This allows sellers to review criteria that are important to buyers, in which the seller was not aware. If a seller chooses to select on the "Open New Deal" link 1078, the seller can access an area in which a new deal can be entered for buyer(s). If the seller chooses to select the "Modify Existing Deal" link 1080, the seller can access an area in which an existing deal can be modified. The exemplary web page 1000 provides a gateway for a seller to navigate through the present invention.

Figure 11:
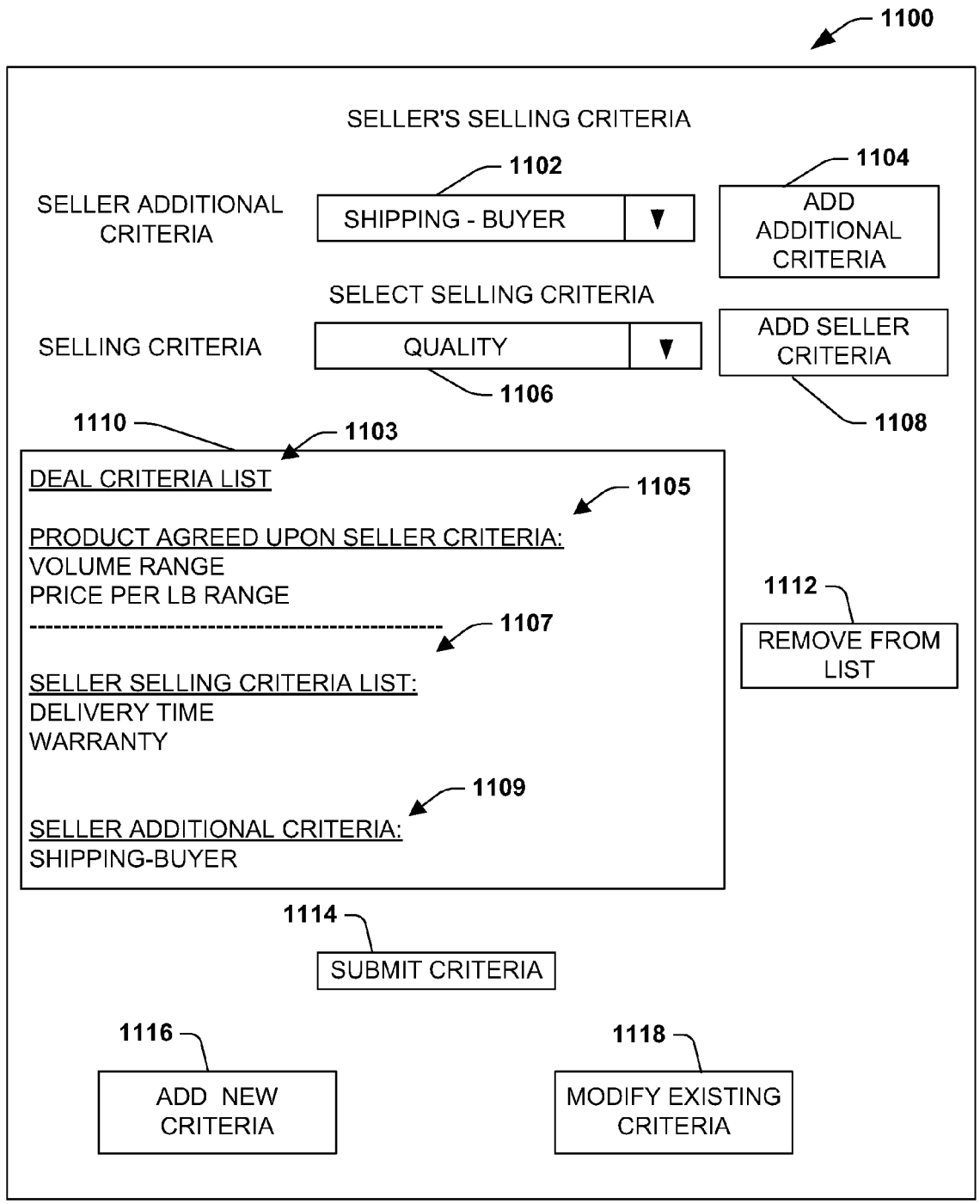
FIG. 11 illustrates a seller's web page in accordance with an aspect of the present invention.

Referring to FIG. 11, an exemplary Internet web page 1100 illustrates an area in which the seller can begin building a new deal. For example, the seller can select a number of seller additional criteria in field 1102, and seller criteria in field 1106. The seller can add seller criteria by selecting the criteria from the field 1106 and selecting the "Add Seller Criteria" link 1108 in which the added seller criteria is shown in deal criteria list 1110. The seller can select the "Add Seller Additional Criteria" link 1104 for adding seller additional criteria from field 1102 into a window 1110 containing a deal criteria list 1103. The deal criteria list 1103 can include, for example, a listing of the "Product Agreed upon Seller Criteria" 1105, which can be decided by a group of sellers for a particular product and/or service. In the same example, the deal criteria list 1103 can include a seller criteria list 1107 and a seller additional criteria list 1109. It should be noted that the criteria in the seller additional criteria list 1109 is not a mandatory criteria for the buyer when the buyer is inputting the buyer's buying criteria. For example, some buyer criteria can be listed, yet a seller can have additional criteria listed. Thus, if the matching between a buyer and seller (including a match between a seller and buyer) is close but not exact, the buyer and/or seller must agree to the additional and/or lacking criteria. Furthermore, the seller can remove criteria from the deal criteria list 1110 (e.g., the overall criteria list) by selecting the "Remove from List" link 1112. The seller can add new selling criteria by selecting on a link 1116 labeled AAdd New Criteria@ sending the seller to area in which a seller can add and/or modify deal criteria. Still referring to the same example, the seller can modify a current criteria by selecting the criteria in deal criteria 1110 and selecting a link 1118 labeled AModify Existing Criteria@ sending the seller to area in which a seller can add and/or modify deal criteria.

Figure 12:
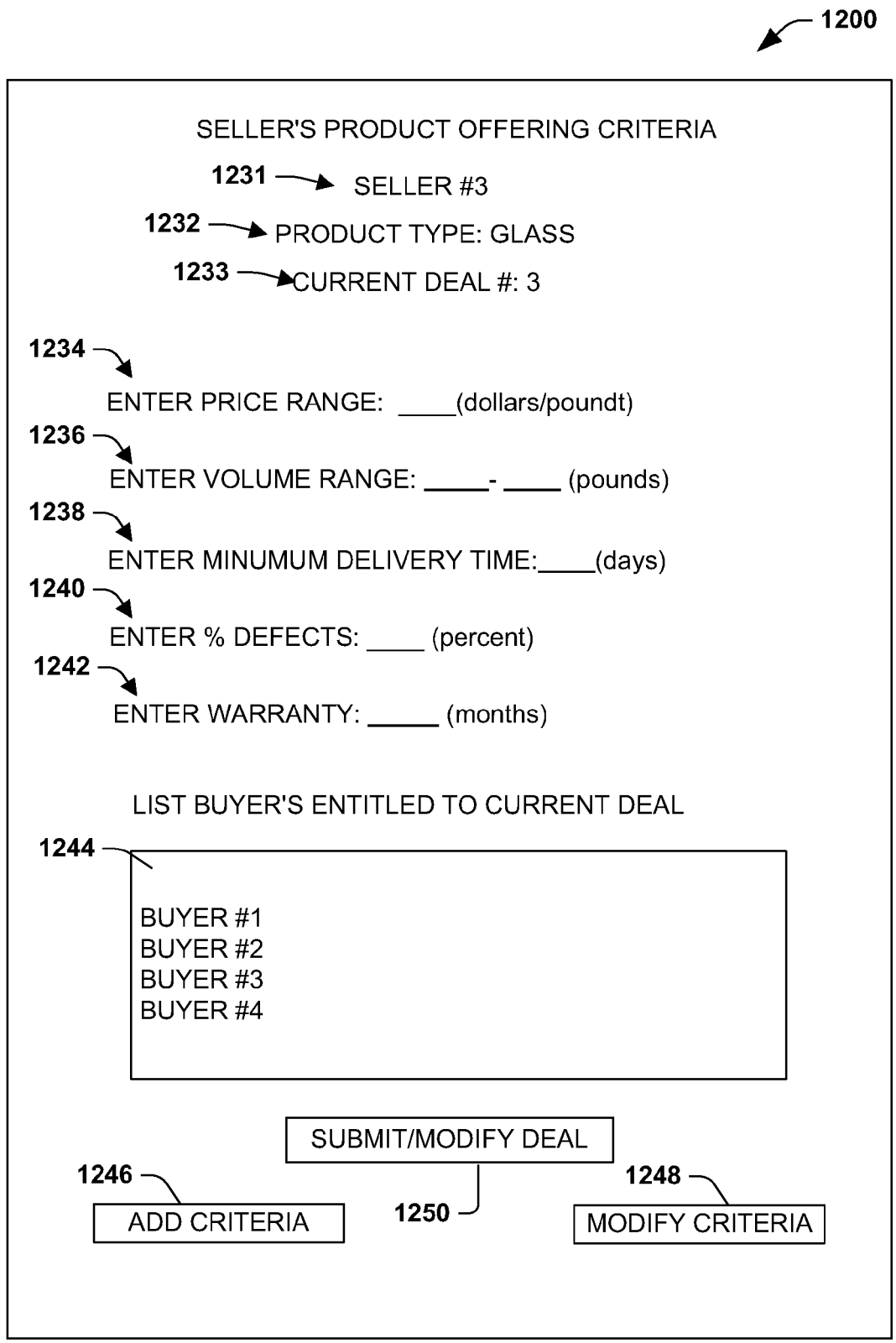
FIG. 12 illustrates a seller's web page in accordance with an aspect of the present invention.

Referring now to FIG. 12, an exemplary Internet web page 1200 is shown. For example, the web page 1200 can show a seller number 1231, a product type 1232 and a current deal number 1233. The information can be automatically generated to the top of web page 1200. The web page 1200 allows the seller to enter offering limits relating to the selling criteria of the seller's product and/or service for a particular deal. In the following example, the seller's offering criteria can be, but not limited to, price 1234 (e.g., in dollars per pound); volume range 1236 (e.g., in the number of pounds); delivery time 1238 (e.g., in days); the amount of defects 1240 (e.g., in percent); and the warranty 1242 (e.g., in months). The seller can list names of buyers in a window 1244 to whom the deal is being offered. In another aspect of the present invention, the seller can, for example, type in the term "All" to view all the buyers for a selected deal. Once the seller offering criteria is entered, the seller can submit the deal by selecting a "Submit/Modify Deal" link 1250. The web page 1200 also provides a modify criteria link 1248 and an add criteria link 1246. In one example, the links allow a buyer and/or seller to access an area in which criteria can be added and/or modified. In another aspect of the present invention, a record of the deal in a database of deals offered by various sellers of the product, so that deals which seller's offering criteria match the buyer's ordering criteria can be outputted to the buyer in a list of deals as shown in FIG. 7.

Figure 13:
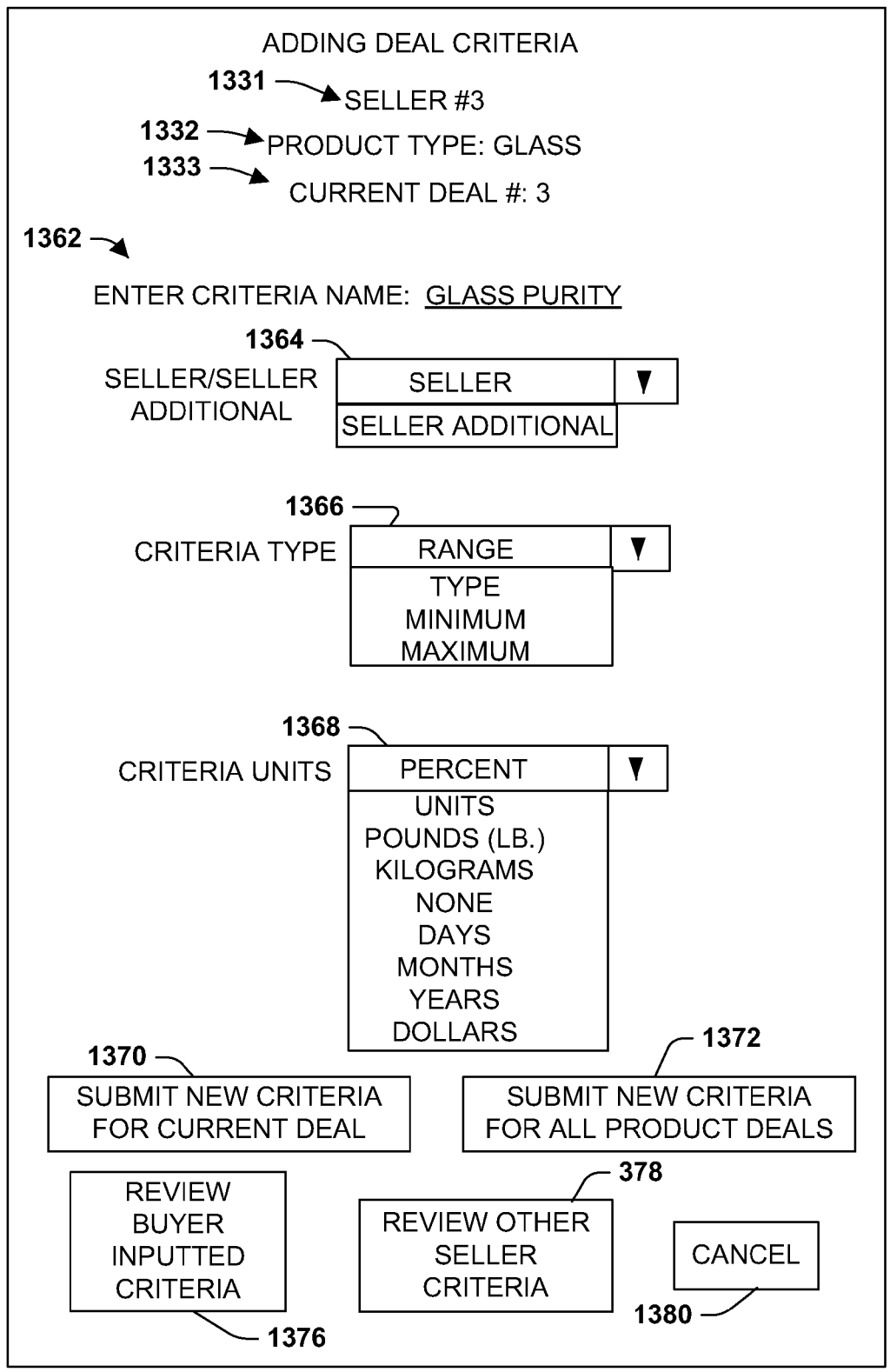
FIG. 13 illustrates a web page for adding buying and selling criteria to the deal in accordance with an aspect of the present invention.

Now referring to FIG. 13, an exemplary Internet web page 1300 is depicted in which a seller can add and/or modify deal criteria. The following is only a depiction of the various embodiments of the present invention and is not so limited to such example. The seller number 1331, the product type 1332 and the current deal number 1333 can be automatically generated. The seller can enter a criteria name in the "Enter Criteria Name" field 1362. For example, the seller can choose the criteria as a seller type and/or a seller additional criteria type from a menu 1364. The seller can choose a criteria type from another menu 1366 and the criteria units in another menu 1368. The seller can submit the new criteria for the deal by selecting on the "Submit New Criteria for Current Deal" link 1370. In another aspect of the present invention the new criteria can be given for all the product and/or service deals by selecting the "Submit New Criteria for All Product Deals" link 1372. In yet another aspect of the present invention, the seller can review the buyer inputted criteria submitted by the buyer that is not in the seller's deals. For example, the seller can view the buyer inputted criteria by selecting a "Review Buyer Inputted Criteria" link 1376. For example, the seller can review buyer inputted criteria to determine whether or not the seller would like to add this criteria to the present deal or all deals mitigate buyer needs. In another aspect of the present invention, the seller can review the criteria offered by other sellers, but not the current seller, by selecting a "Review Other Seller Criteria" link 1378. This facilitates a seller's need to keep current on other seller's selling criteria in order to satisfy the current market demands.

The seller can also select the "Cancel" link 1380 at any time to cancel any added and/or modified selling criteria. Furthermore, if the seller simply desires to re-perform the search, the seller can return to a previous screen by selecting the "back" function available using an Internet browser such as, for example, Microsoft Internet Explorer, Netscape, etc. In another aspect of the present invention, a hyperlink to various web pages, such as, but not limited to, a search screen, links associated with sponsors, and links allowing user access to aspects of the present invention.

Turning to FIG. 14, an exemplary generic registration 1400 is shown. The generic registration provides the present invention with the registration information of a buyer and/or a seller. For example, the user is requested to fill out a registration which can contain, but is not limited to containing, name; address; primary contact person; phone; fax; e-mail; short description of company; preferred login user name; and preferred password. With respect to the user name and password, the processor 410 (See FIG. 4) is configured to determine whether the selected user name and password combination are available. If the combination is not available, the processor is configured to prompt the buyer to enter a new user name and password until an available combination is selected. In one aspect of the present invention, registrations are different based upon being a buyer or seller. For example, FIG. 15 and FIG. 16 are exemplary buyer and seller registrations 1500 and 1600, respectively.

FIG. 17 is an exemplary generic information table 1700 in which buyer and/or seller information can be stored. In one aspect of the present invention, the generic information table 1700 can be a data store as depicted in FIG. 2. The user information from a registration 1400 can be stored in an information table 1700 in the memory 430 of the processor 410 (FIG. 4). In one aspect of the present invention, information tables are different based upon being the user being a buyer or seller. For example, FIG. 18 and FIG. 19 are exemplary buyer and seller registrations 1800 and 1900, respectively.

Figure 20:
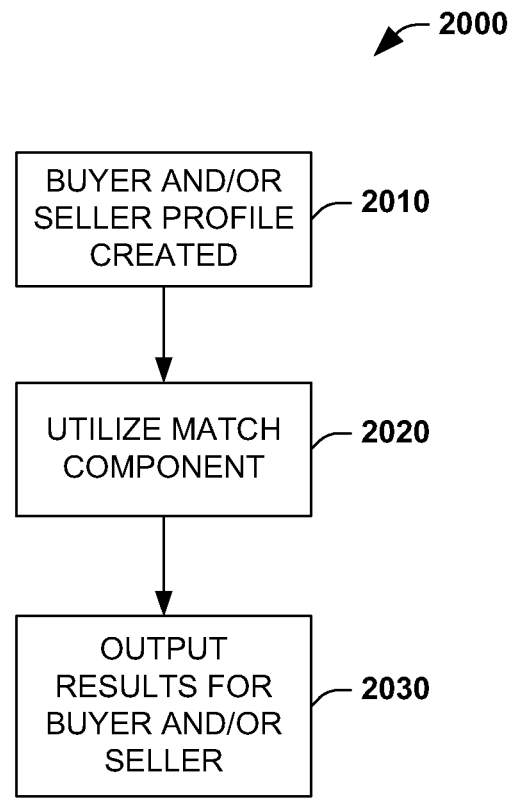
FIG. 20 is a flow chart illustrating a methodology for matching at least one buyer and/or at least on seller in accordance to an aspect of the present invention.

Turning to FIG. 20, a methodology 2000 for matching at least one buyer and at least one seller based at least in part upon collected criteria is shown. At 2010, a buyer and/or seller profile is created. For example, the buyer and/or seller profile can contain, but not limited to containing, name, address, and collected criteria for the purchase (e.g., delivery time, warranty, price, quantity, location, model, etc.). At 2020, the buyer and/or seller profile is utilized to facilitate matching a buyer with a seller and/or a seller with a buyer based at least in part upon collected criteria. For example, if a buyer criteria is amount of defect, the matching method can match a seller with similar and/or the same criteria for the product and/or service. At 2030, results for the buyer and/or seller are output to the user. Thus, the buyer and/or seller are able to select the product and/or service based upon the results from the present invention.

Figure 21:
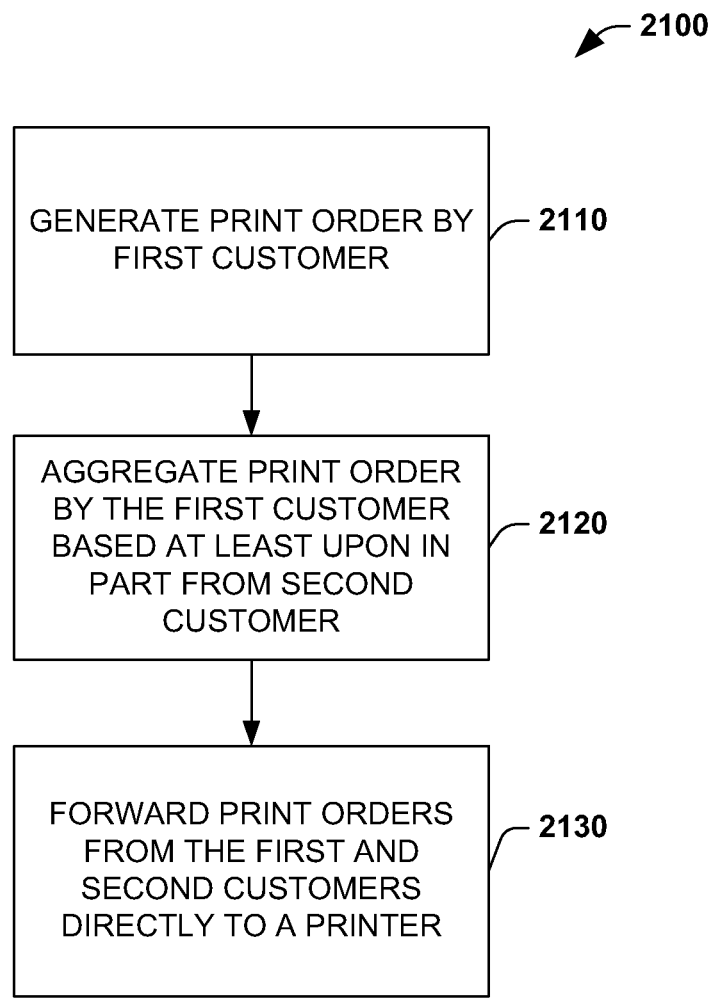
FIG. 21 is a flow chart illustrating a methodology for print stream aggregation in accordance with an aspect of the present invention.

FIG. 21 is a printstream methodology 2100 in which the printing of printing orders is mitigated. At 2110, a printing order is generated by a first customer. The printing order can be a plurality of print jobs for the first customer. At 2120, the first customer printing order is aggregated with a printing order from a second customer. For example, the first customer printing order can be collected together with a second customer printing order in order to increase efficiency of printing print orders. At 2130, the printing orders from the first and second customers are forwarded directly to a printer. By aggregating the printing orders from the first and second customers and then forwarding the orders directly to a printer, the printstream methodology can increase efficiency and the customer need for timely print orders at a low cost.

In one aspect of the present invention, the printstream methodology 2100 provides a web page interaction including, but not limited to, registration page, section to transfer a file sample, an email notification system of the sample and price curve, a sign-off page for the customer to approve the sample submitted, a credit processor to arrange payment in advance, a confirmation email automatically sent to a customer when a job is printed and/or mailed.

In another aspect in accordance to the present invention, the printstream methodology 2100 can automatically register into print queue to be printed. For example, a web page can include a status bar to provide a printstream progress, anticipated run time, postage costs, and/or delivery arrival. In another aspect of the present invention, the printstream methodology 2100 provides for interaction with production scheduling software products within the printing industry.

In yet another aspect in accordance with the present invention, the printstream methodology 2100 provides for a company to submit printing order(s) and accept a print date with the lowest variable costs. For example, a customer can submit an FTP, in which the company can submit the printstream with a variable data range. In one example, a customer can submit a print order of X letters to be printed within a range of Y months (where X is an integer greater than 0, and Y is real number greater than 0). The printstream methodology 2100 can aggregate all the printing orders from all of the customer locations and provide, for example, the postage rate, print rate, optimal date to print (e.g., lowest postage rate). Furthermore, the printstream methodology can update cost (e.g., price and optimal dates) of the printing order as more customers submit printing orders within the stated range Y months. In another aspect of the present invention, the printstream methodology 2100 provides configuring a printer (e.g., BFIS) with variable costs. For example, a printer can configure variable costs to encourage companies to accept early print dates to avoid a print rush.

In another aspect of the present invention, the printstream methodology 2100 can provide calculating a price curve. For example, the price curve can show, for example, terms of the price curve (e.g., last day to place order), and/or volume discounts available as more companies join their volume.

In yet another aspect of the present invention, the printstream methodology 2100 provides a calendar. For example, the calendar can be posted with posted rates for dates based on existing zip codes. The calendar allows a company to see print volume committed for that date along with the associated postage rate. In another aspect of the present invention, a map of the United States can be used to show, for example, where mail will be sent, and/or where opportunities for aggregation exist. For example, the user can click a view in which zip codes can take on a color sequence to determine the days on and what areas will receive scheduled mail.

In another aspect in accordance to the present invention, the printstream methodology 2100 allows a company to submit an address and zip code elements to their file. For example, the printstream methodology 2100 can automatically process the delivery time and the associated postage rates. In one aspect of the present invention, the delivery times, postage rates, and other company submitted information can be sortable based upon a plurality of criteria (e.g., ascending order, price, distance, etc.). For example, the printstream methodology 2100 can provide a menu in which a user confirms and/or holds the printing order. In yet another example, a company can insert a zip code in which the printstream methodology determines the days with optimal postage rates. Furthermore, the total price can then be determined for a company with at least one printing order. In another aspect of the present invention, the printstream methodology 2100 allows a user to accept a print schedule or reject parts and/or the entire schedule. Upon acceptance, the files can be printed and a confirmation including, for example, price, time and information printed can be sent.

In yet another aspect in accordance with the present invention, the printstream methodology 2100 can utilize a print optimizer using intelligent print signals (a discussed below), additional print stream options (as discussed below), a print wizard (as discussed below), .NET option for the universal printer (as discussed below), and/or prebuilt print stream components (as discussed below).

Figure 22:
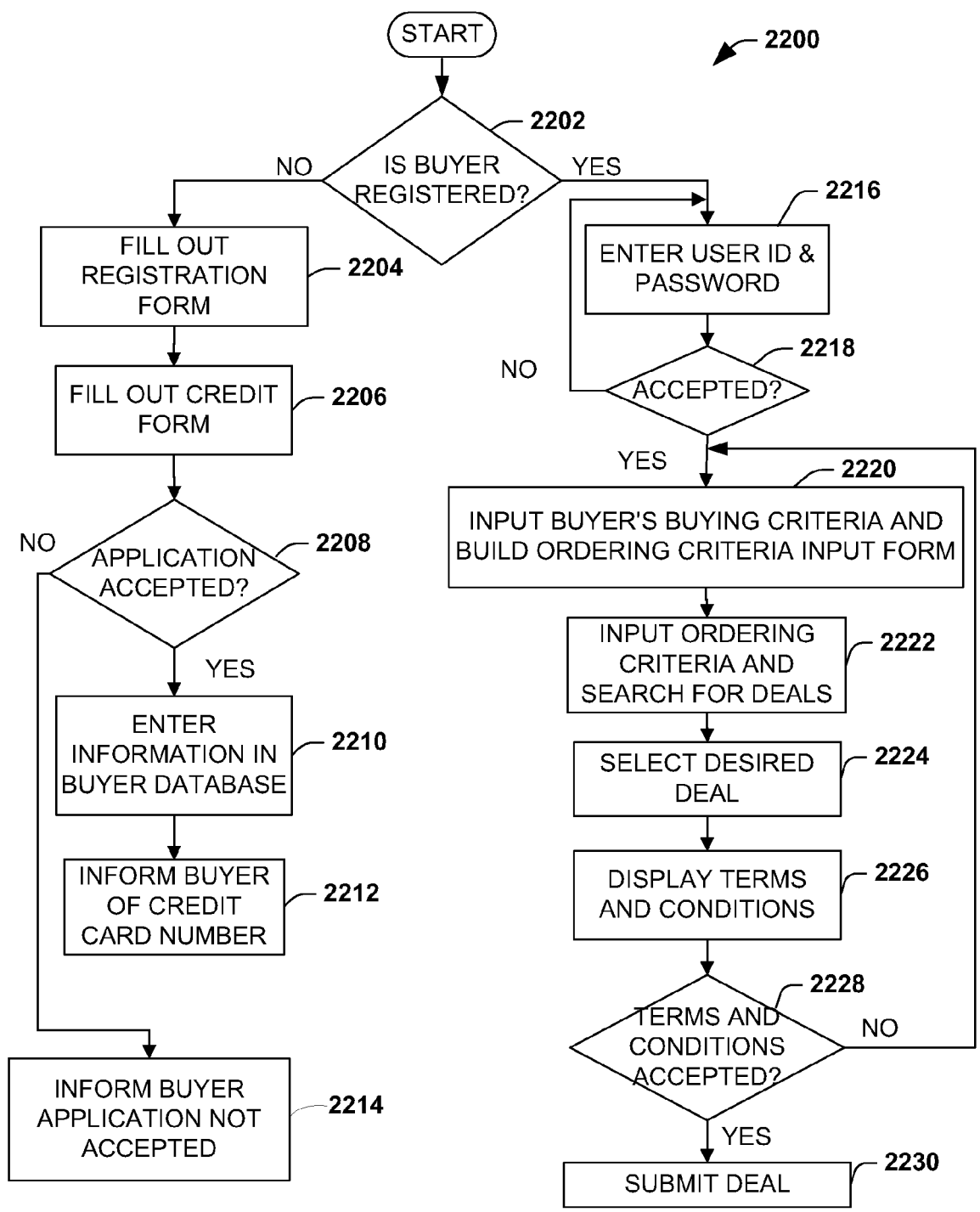
FIG. 22 illustrates a flow chart for a buyer desiring to conduct business electronically in accordance with an aspect of the present invention.

Turning to FIG. 22, a methodology 2200 is shown in accordance to one aspect of the present invention. The methodology 2200 demonstrates the general steps taken by a buyer entering a web page implementing the present invention. More particularly, in step 2202 it is initially determined whether a buyer is registered or not. If the buyer is not registered, proceeds to step 2204. At 2204, the buyer can fill out a registration form. For example, the buyer is requested to fill out a registration 1500 such as that shown in FIG. 15. In the present example, the registration 1500 requests that the buyer enter the following information: buyer name; address; primary contact person; phone; fax; e-mail; short description of company; preferred login user name; and preferred password. With respect to the user name and password, the present invention is configured to determine whether the selected user name and password combination are available and, if not, to prompt the buyer to enter a new user name and password until an available combination is selected.

At 2206, the method can require a buyer to fill out a credit application to facilitate purchases made via web site. The credit card registration and approval process may be accomplished via a hyperlink to one of various electronic credit card approval agencies which check the buyer's credit rating. The registration can also set up a merchant account with a line of credit. For example, an electronic credit card approval agency which may be used in conjunction with the present invention can be found on the Internet at http://www.interent-ecommerce.com. Next, at 2208, the methodology 2200 can determine if the credit card application has been approved by, for example, the electronic credit card approval agency. If the credit card application has not been approved, the method proceeds to step 2214 in which the buyer is informed they have not been approved for a line of credit, and have not successfully completed the registration. For example, at 2214, a customer service telephone number can be provided to the buyer for questions and/or desires to pursue registration. If the buyer is accepted for credit, the buyer proceeds to 2210 to enter information into a buyer database. For example, the buyer information from the registration 1500 (See FIG. 15) and the newly issued credit card number can be stored in a buyer information table 1800 (See FIG. 18). At 2212, the buyer is informed with the credit information which will facilitate purchases of products and/or services. Furthermore, the method can provide a mailed confirmation copy of the buyer's registration.

Still referring to FIG. 22, if the buyer is registered the method proceeds to 2216 at which the buyer enters a username and password. Upon entry of username and password, the method 2200 verifies the username (e.g., user ID) and password, for example by comparison with those stored in the buyer data store 214 (FIG. 2). If the username (e.g., user ID) and password entered by the buyer is not verified at 2218 (e.g., accepted), the method 2200 returns to step 2216 for re-entry of such information. However, at step 2218, if a username and password are verified, the method continues to 2220.

At 2220, the method collects buyer's buying criteria. In one example, the processor 410 (FIG. 4) provides the buyer with a web page that allows buyers to input buying criteria (e.g., web page 700 in FIG. 7). Such an exemplary web page can be where the buyer is able to enter a variety of buying criteria that is important to that particular buyer. The buyer selects a plurality of buying criteria and submits the criteria, in which the method builds an input ordering criteria form (e.g., web page 800 in FIG. 8). At 2222, the ordering criteria are collected and the method matches a seller and/or a buyer (e.g., searches for deals). For example, the buyer at 2222 can enter the range of ordering criteria that is acceptable to the buyer and then submits these criteria in which the method matches a buyer to a seller. The method lists the seller deals matching based at least in part upon the buyer's buying and/or ordering criteria. In another aspect of the present invention, the method allows a buyer to quickly find deals by providing the buyer with the access to an area in which buyer criteria can be collected (e.g., web page 700 and 800 in FIG. 7 and FIG. 8, respectively).

Upon completion of a matching sequence (e.g., a search) the buyer can select a desired deal at 2224. For example, the buyer can choose a desired deal because it has a faster delivery time than the other deals. In another example, the buyer can choose a deal because it has a low percentage of defects in the goods, or has a longer warranty than other goods. Regardless of the deal, the buyer can make an informed decision based on a variety of buying criteria. If the buyer is unsatisfied with the search results and/or simply desires to re-perform the search, the buyer can return back to start the matching sequence over. For example, the buyer can go to a previous screen selecting the "back" function available using an Internet browser such as, for example, Microsoft Internet Explorer, Netscape, etc.

At 2226, the terms and conditions of the deal can be provided to the buyer. For example, the method can display a page of standard terms and conditions which the buyer must agree to prior to completing the deal. The terms and conditions relate to the terms governing the sale of the product and/or service according to which both the buyer and/or seller are willing to conduct business. At 2228, if the terms and conditions are not accepted, the method proceeds to 2220 in which another deal can be selected and/or another search can be performed. If in step 2228, the terms and conditions are accepted, the buyer proceeds through the methodology 2200. At 2230, the buyer selected, criteria-based deal is submitted to complete the deal (e.g., confirmation, exchange of money).

Figure 23:
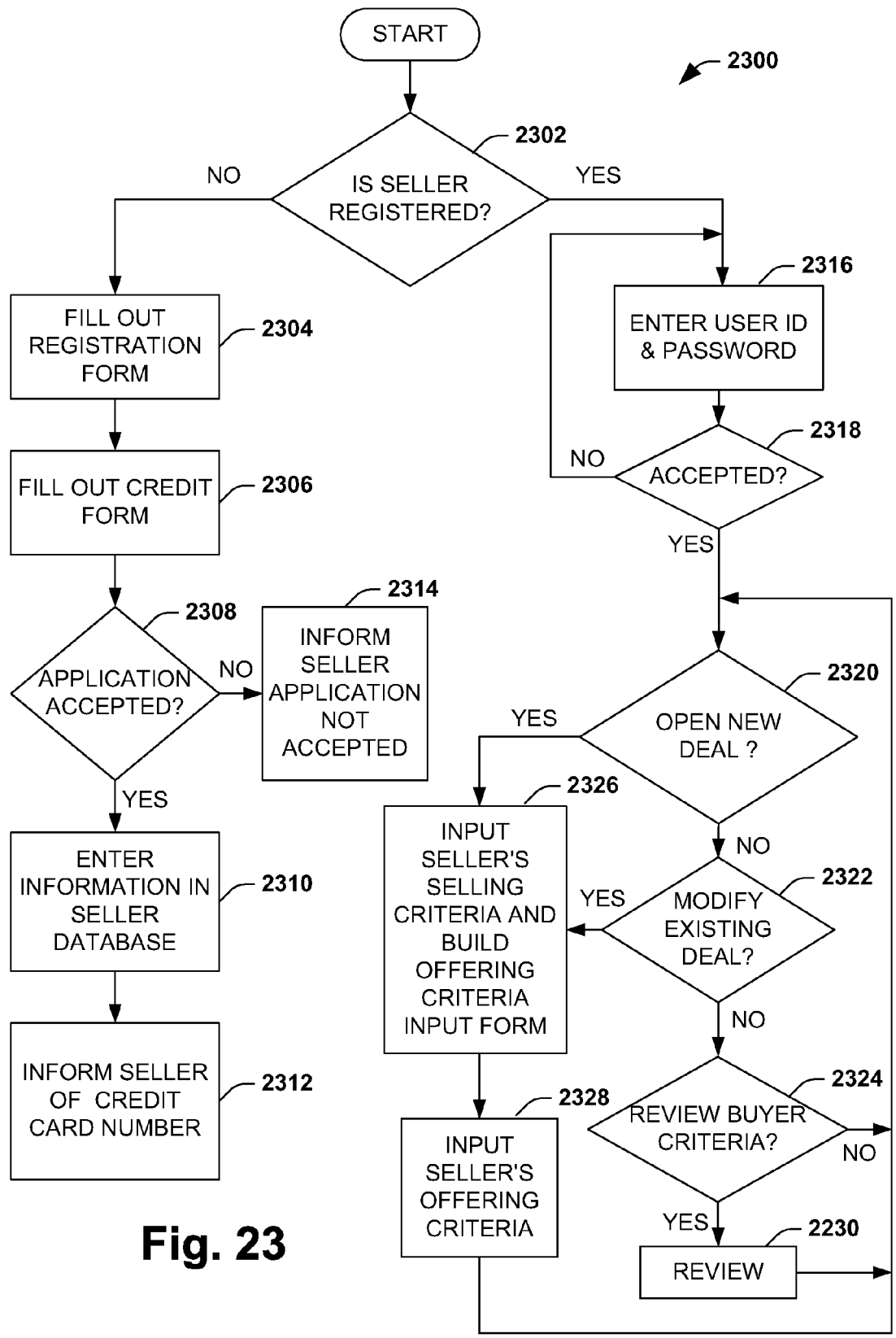
FIG. 23 illustrates a flow chart for a seller desiring to conduct business electronically in accordance with an aspect of the present invention.

Proceeding now to FIG. 23, a methodology 2300 is shown for a seller utilizing one aspect of the present invention (e.g., a web page(s)). More particularly, in step 2302 it is initially determined whether a seller is registered or not. If the seller is not registered, proceeds to step 2304. At 2304, the seller can fill out a registration form. For example, the seller is requested to fill out a registration 1600 such as that shown in FIG. 16. In the present example, the registration 1600 requests that the seller enter the following information: seller name; address; primary contact person; phone; fax; e-mail; short description of company; preferred login user name; and preferred password. With respect to the user name and password, the present invention is configured to determine whether the selected user name and password combination are available and, if not, to prompt the seller to enter a new user name and password until an available combination is selected.

At 2306, the method can require a seller to fill out a credit application to facilitate purchases made via web site. The credit card registration and approval process may be accomplished via a hyperlink to one of various electronic credit card approval agencies which check the seller's credit rating. The registration can also set up a merchant account with a line of credit. For example, an electronic credit card approval agency which may be used in conjunction with the present invention can be found on the Internet at http://www.interent-ecommerce.com. In one aspect of the present invention, a credit application is requested so costs and fees associated with conducting business can be directly billed to the seller's credit card. Next, at 2308, the methodology 2300 can determine if the credit card application has been approved by, for example, the electronic credit card approval agency. If the credit card application has not been approved, the method proceeds to step 2314 in which the seller is informed they have not been approved for a line of credit, and have not successfully completed the registration. For example, at 2314, a customer service telephone number can be provided to the seller for questions and/or desires to pursue registration. If the seller is accepted for credit, the seller proceeds to 2310 to enter information into a seller database. For example, the seller information from the registration 1600 (See FIG. 16) and the newly issued credit card number can be stored in a seller information table 1900 (See FIG. 19). At 2312, the seller is informed with the credit information which will facilitate selling of products and/or services. Furthermore, the method can provide a mailed confirmation copy of the seller's registration.

Still referring to FIG. 23, an already registered seller proceeds to 2316. At 2316, a seller can enter a username and password. Upon entry of username and password, the method 2300 verifies the username (e.g., user ID) and password, for example by comparison with those stored in the seller data store 222 (FIG. 2). If the username (e.g., user ID) and password entered by the buyer is not verified at 2318 (e.g., accepted), the method 2300 returns to step 2316 for re-entry of such information. However, at step 2318, if a username and password are verified, the method continues to 2320.

After a username and password are verified, the seller can be provided with a web page 1000 as in FIG. 10. For example, the seller can decide to open a new deal 2320, modify an existing deal 2322, or review buyer inputted criteria 2324. If the seller selects to open new deal at 2320 for a selected product and/or service, the method proceeds to 2326. At 2326, the seller enters the seller=s selling criteria via, for example, web page 1100 in FIG. 11. In another aspect of the present invention, the method utilizes a seller's product offering criteria web page, for example web page 1200 in FIG. 12. At 2328, the seller's offering criteria is collected. The information is entered and/or submitted to form a deal. The method 2300 uses, for example, this information to match buyer criteria (e.g., buying and/or ordering) with seller criteria (e.g., selling and/or offering) in order to facilitate the completion of deals.

Still referring to FIG. 23, the seller can select to modify an existing deal at 2322. If the seller chooses to modify an existing deal, the seller goes to 2326 in which a seller's criteria and offering criteria can be collected. The method from 2326 and 2328 allow a deal to be modified based at least in part upon a seller. In one aspect of the present invention, the seller is limited to modify the deals that they have opened. After the modification of a deal, the method returns to 2320.

The seller can also select to review a buyer inputted criteria at 2324. If the seller selects to review a buyer inputted criteria, the seller proceeds to 2330 in which the buyer criteria can be viewed. Upon completion of viewing and/or a seller selects to not view the buyer criteria, the method returns to 2320.

The present invention can be implemented via object oriented programming techniques. In this case each component of the system could be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors which the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) can be derived from another class (called a base class, parent class, etc.), where the subclass inherits the data attributes and methods of the base class. The subclass can specialize the base class by adding code which overrides the data and/or methods of the base class, or which adds new data attributes and methods. Thus, inheritance represents a mechanism by which abstractions are made increasingly concrete as subclasses are created for greater levels of specialization.

The present invention can employ abstract classes, which are designs of sets of objects that collaborate to carry out a set of responsibilities. Frameworks are essentially groups of interconnected objects and classes that provide a prefabricated structure for a working application. It should also be appreciated that the PCM and the shared memory components could be implemented utilizing hardware and/or software, and all such variations are intended to fall within the appended claims included herein.

According to an exemplary aspect of the present invention, Java and CORBA (Common Object Request Broker Architecture) are employed to carry out the present invention. Java is an object-oriented, distributed, secure, architecture neutral language. Java provides for object-oriented design which facilitates the clean definition of interfaces and makes it possible to provide reusable "software ICs." Java has an extensive library of routines for copying easily with TCP/IP protocols like HTTP and FTP. Java applications can open and access objects across a network via URLs with the same ease to which programmers are accustomed to accessing a local file system.

Furthermore, Java utilizes Areferences@ in place of a pointer model and so eliminates the possibility of overwriting memory and corrupting data. Instead of pointer arithmetic that is employed in many conventional systems, the Java Avirtual machine@ mediates access to Java objects (attributes and methods) in a type-safe way. In addition, it is not possible to turn an arbitrary integer into a reference by casting (as would be the case in C and C++ programs). In so doing, Java enables the construction of virus-free, tamper-free systems. The changes to the semantics of references make it virtually impossible for applications to forge access to data structures or to access private data in objects that they do not have access to. As a result, most activities of viruses are precluded from corrupting a Java system.

Java affords for the support of applications on networks. Networks are composed of a variety of systems with a variety of CPU and operating system architectures. To enable a Java application to execute anywhere on the network, a compiler generates an architecture neutral object file format—the compiled code is executable on many processors, given the presence of the Java runtime system. Thus, Java is useful not only for networks but also for single system software distribution. In the present personal computer market, application writers have to produce versions of their applications that are compatible with the IBM PC and with the Apple Macintosh. However, with Java, the same version of the application runs on all platforms. The Java compiler accomplishes this by generating byte code instructions which have nothing to do with a particular computer architecture. Rather, they are designed to be both easy to interpret on any machine and easily translated into native machine code on the fly.

Being architecture neutral, the "implementation dependent" aspects of the system are reduced or eliminated. The Java virtual machine (VM) can execute Java byte codes directly on any machine to which the VM has been ported. Since linking is a more incremental and lightweight process, the development process can be much more rapid and exploratory. As part of the byte code stream, more compile-time information is carried over and available at runtime.

Thus, the use of Java in the present invention provides a server to send programs over the network as easily as traditional servers send data. These programs can display and manipulate data on a client computer. The present invention through the use of Java supports execution on multiple platforms. That is the same programs can be run on substantially all computers—the same Java program can work on a Macintosh, a Windows 95 machine, a Sun workstation, etc. To effect such multi-platform support, a network interface and a network browser (not shown) such as Netscape Navigator or Microsoft Internet Explorer can be used in at least one aspect of the present invention. It should be appreciated, however, that a Java stand-alone application can be constructed to achieve a substantially equivalent result. Although the present invention is described with respect to employing Java, it will be appreciated that any suitable programming language can be employed to carry out the present invention.

An Internet explorer (e.g., Netscape, Microsoft Internet Explorer) is held within the memory of the client computer. The Internet Explorer enables a user to explore the Internet and view documents from the Internet. The Internet Explorer can include client programs for protocol handlers for different Internet protocols (e.g., HTTP, FTP and Gopher) to facilitate browsing using different protocols.

It is to be appreciated that any programming methodology and/or computer architecture suitable for carrying out the present invention can be employed and are intended to fall within the scope of the hereto appended claims.

Registration

Once an agent has confirmed the prospect would like information on a new sales program, the prospect is registered. The agent can click a register icon and immediately have all common fields automatically displayed (e.g., company name is filled in where it says company name). The agent completes all missing fields (which may be customized by the licensee) with the prospect and is prompted with a relevant remark regarding follow-up (e.g., a representative will contact you on Friday $14^{th}$, at 2:00 p.m. to provide a quote . . . ). The lead is then registered with the agent's name.

Initially, the agent completed a registration form as well to receive a name and password. In the form, there may have been fields to record if there is a "Reseller" that will be receiving commissions. Other contracts and registration forms are available as well for individuals to complete if they are interested in becoming an agent and/or reseller. Different forms will be used for each with the goal being to record if a Reseller has agents working for him/her, and if so, that payment will be made to the Reseller for distribution. Additionally, multiple tiers may exist in this structure and be searchable by the Reseller and as well as a licensing company.

Price Administrator

Once a price curve is sent, it is automatically saved under the profile for the buyer and accessible only to certain individuals. These curves are searchable by customer as well as sub-groups (e.g., collection agencies, agents . . . ) with the ability to chart and graph the charts across selected groups.

A prospect is subsequently given a priority, and any follow-up activity is recorded with the reminders automatically charted for the Close. Additionally, the history may also be updated for the prospect. Still further, a status can be selected as well where a sales funnel is created to show where the prospect is in the sales process.

A Reseller is able to see a cross-section of all registered leads as well as where the leads are in the process (e.g., closed, in process, reviewing proposal). Also, client information is included and grouped according to commission potential of, for example, what is in process or closed. Furthermore, a Reseller can search by agents to see comparisons including but not limited to averages and closes per lead called such that a Reseller can observe the abilities of agents in side by side comparisons. Based on previous closes, the Reseller can also see projections of future commissions based for instance on the rate of closes per call, the time to close, and the lead.

If a prospect decides to become a customer, a Service Manager is able to receive email confirming this fact along with access to the customer file. The Service Manager is able to update the record based on calls to follow-up and answer technical information. Once a file has been received or credit checked, for example, an email can be sent automatically to the Reseller and Closer with the customer file updated as well.

Once a company begins using the service, a pricing specialist is able to import a file from the supplier regarding individual volume per customer (e.g., bills processed) that is recorded for that customer's file and the price curve can then be changed to reflect this new volume (e.g., as referenced with the contact agreed to by the customer and the terms of aggregation).

A price curve can be sent on a schedule (e.g., monthly). Additionally, new offers can be made automatically or semi-automatically (e.g., agree to a six month contract extension and receive a 10% discount on your price curve starting next month). A yes icon or hyperlink is included in the email and the system records if the customer clicks the icon. If so, an update to the contract happens automatically and others may or may not be notified. Other options can also be included in the curve either individually or as part of a group offering (e.g., all collection agencies can opt for a color form for only $0.02 more per piece . . . click yes to accept). If clicked, then the customer profile is updated and the price curve changes to reflect this change.

The supplier is alerted to all of these changes in prices including a reduction on the price curve for any given customer. An export file can be created to update an ERP system or other system of the supplier and/or customer at the same time.

e-Marketing Campaign

An email may also contain calculations on average savings to date for a customer and all reductions in a price curve, as well as other data including, but not limited to volume ordered this month, volume ordered last month (e.g., including percentage increase or decrease), total volume, average volume, and average price savings. These savings can be annualized as well and highlighted next to a logo of the supplier/software company.

Additional items can be inserted on the email (e.g., via an HTML page) such as other products that can be ordered in a demand aggregation fashion (e.g., long distance service). An icon can also be included to facilitate viewing of a price curve and/or having a representative contact an individual with more information. In this case, a lead would be generated and sent to a default agent and would appear on the screen with the inquirer's information. An icon would denote the customer was already using demand aggregation for a product (shown) and is interested in another service. Ad space can also be created and sold as part of the program. Also, other products can be shown on the emails sent to customers prodding them to select those items that offer the greatest appeal. Alternatively, another option is to employ the demand aggregation shopping bot which allows a company to search for other items to see if demand aggregation is offered.

Demand Aggregation Tool

As price curves are reduced, a Pricing Specialist has a series of tools available to manage this activity to confirm the prices are accurate as referenced by any agreement in place and also a length of time where aggregation can take place, along with other variables. If the period is extended (e.g., as determined by the specialist) by 3 additional months, an email reflects this change and encourages referrals into the program (e.g., link with an email message to tell a friend). Again, all leads are forwarded to the default agent's email account.

Auto-Price Curve Feature

In should be noted and appreciated that a supplier has the ability to let a prospect register online and receive information automatically including a pre-selected price curve tied to any number of completed items (e.g., if $0.56 per piece is submitted, send a curve at $0.53 ending at $0.47).

Price Curves Generated from Telemarketing Activities & Online Registrations

A potential customer or sales agent can complete registration information for printing and mailing statements. Such information can include but is not limited to username, password, type of company, nature of business, type of software, whether credit cards are accepted, whether potential custom desires to sign at contract, and the like. Registration information can then be forwarded to a centralized database where it is saved and plotted. Thereafter, additional formulas can be applied to this data to determine, inter alia, what the potential revenue is from an account (e.g., calculated by taking the current price less 10% and subtract any commissions or additional costs minus the cost point of the supplier and multiplied by the total volume ordered by the customer (gross margin or net contribution margin)). Other aspects could change the first price presented including but not limited to the competitor listed, the degree of customer satisfaction with the current supplier, and the speed in which the company would be willing to switch suppliers.

A ranking system can be pre-set with Net Contribution Margin calculated over a month, quarter, annual or other figure of time. Those companies meeting a certain range will be coded as high potential (e.g., in red), medium potential, low potential, or other. Options could also be factored in including but not limited to the rate of time the customer indicated a switch could be made and the total volume of the customer per month. Other rankings can be used as well with multiple variations available (e.g., ranking by highest volume, highest volume and quickest time to make change, highest current price and quickest time to make change, print in-house . . . ).

Likewise, percentage drops in price curves can be pre-set according to the variables weighted more heavily by the supplier. For instance, a company with a certain competitor may offer a price curve at 15% below the initial price with a steep 25% drop across four breaks with $1.50 increments. In other cases, the initial price may be 10% with a 10% overall drop in $1.00 increments.

Another example includes the ability of the system to return a "probable price" of a competitor if the customer has left this answer blank. For instance, the customer says they print 5,000 statements per month and does not leave a price. The customer indicates company X prints for them currently. The software scans all other records of where company X was the printer and the price points for each, scaling or plotting these if the agent requests. Other variables to be considered can be a region of customers include the length of time customer has used supplier and the like. The system can also return the probable price for the customer in question and what the "suggested price" should be when the agent calls the customer.

Furthermore, the software can accommodate the ability of a supplier to change questions on the registration page and have that information automatically available for filtering, scanning, programming, etc. into the formula for qualifying. Likewise, a call list can be created and posted so that highest potential customers are displayed in sequential order. There can also be note sections that are included for the agent that can be free-text searched.

The customer ranking, however selected, can then become part of the file for that customer. A supplier may also have the option to select a couple of different filters at the same time such as red on net contribution margin, blue on annual profit of this account and the like. Additionally, the system could allow for the supplier to rank according to the level of high potential to low potential and then save that view for future comparisons.

Automatic and Semi-Automatic Price Curves Tied to Registration Page Information

A formula can be applied based on registration information to calculate a price curve for a customer. Again, the supplier can pre-set a default that includes any of the following as an example:

Take current price less 10% as the starting price on the price curve with a drop of 25% over four breaks at the standard volumes
   Have price breaks start at $0.25 for the first four breaks and then proceed to $0.10 after that
   High level of satisfaction with current vendor=add 10% to the discount of price curve
   Willingness to sign 1 year contract=show standard curve with an added price break of 5% on the slope of the curve
   Willingness to switch quickly for a good price=reduce by 5%
   Start initial discount at 20% for a predetermined customer
   Start all collection agencies at a standard price
   Start all manufacturers doing 3,000 statements per month at the starting price of X Additionally it should be appreciated that registration information, as well as other data connections made by the supplier (e.g., if volume is greater than x then start the price curve at 15% off) can be programmed and pre-set accordingly.

A Master Screen View

A master screen view is available to a supplier to see which variables if any have been set as defaults in any of the programs. The programs can be given names as well and saved. New defaults can be set at any time, or programmed to run according to other variables. For instance, on the $15^{th}$ of the month, if 25,000 pieces have been sold, change the default to XY program where the initial discount goes to 15% on the price curve and is good for the next 15 days of the month or until 250,000 pieces have been sold.

Other screens are available to see which price curves have been posted to which customers. This can be set to show where price was cited as an important factor for a company, and where the supplier can initiate a new contact to drop the price in exchange for using their product/service by the end of the month.

Once a company has been assigned a price curve, it can be automatically attached to an email given by the company including a series of customized attachments selected by the supplier and may include the following as but one example: A collection agency would have document #1 on Collection Agency References for the supplier, #4 with the program overview, #7 Chart on savings from collection agencies to date . . . .

These settings can be saved according to the information included in the registration sheet (e.g., manufacturer, distributor, collection agency, school . . . ) and applied accordingly. The sales representative for the supplier may also have the ability to attach or modify the information.

Once the price curves and attachments are shown, the agent can now call the customer directly. Furthermore, it should be noted that there can be fields for call notes to be captured by the agent. Also, a status bar can be viewed and customized according to where the customer is in the process (e.g., no contact made, in process, evaluating proposal—call in 1 to 90 days, sold, lost sale . . . ).

The representative could then forward the email to the company contact and subsequently complete the rest of the call including the status bar and next activity. Another note field could be employed to note the customer's reaction to the price recorded.

For additional information, a name and password could be assigned to the customer to enable the customer visit the DealRoom and see more information. Furthermore, once in the DealRoom an icon could be employed to allow the customer to change his/her password if so desired.

Real-Time Updating of Price Curves

The price curve sent via an attachment by a representative could be utilized to automatically populate the DealRoom and tied a name and password to an individual company. This is an automatic feature resulting from the anticipatory nature of the software program in place. Likewise, if changes are made to the program regarding a customer's price, then the price curve created in the DealRoom for the customer also changes. Thus, the DealRoom price curve can be tethered to the activities of the sales representative and the latitude given him or her by the supplier.

The price curve for this company can be linked with other price curves. For instance, a customer ordering 1,000 pieces of a product would see a drop in the price curve if another company ordered 1,000 pieces and the first price break started at 2,000 pieces. If a sales representative then makes a change to the company's price curve and resubmits it to the customer (e.g., a price break now starting 5% below the previous curve), then the customer's name and password could be tagged to the new curve with the new price curve reflected. The 1,000 pieces from the other customer could then be aggregated on this customer's price curve as would future orders. One benefit embedded in this application is the ability for the supplier to manage numerous price curves for a very large group of buyers which may all be at different starting, middle and end points on the curve, yet would still benefit from each other's orders.

To that end, a customer profile summary is available to automatically record price curves for a particular customer, along with the notes section from calls . . . . In this way, the supplier can see the impact of pricing on demand as well as reference earlier discounts as given to the customer. A field may also be available to show the actual volumes ordered by the customer for a period of time. For example, a registered company, which has been a customer for the past six months, purchases a product. The customer profile shows registration information that the customer indicated he/she would order 5,000 units per month and instead has ordered 2,000 units per month. A filter function could be selected to show such companies falling short of their commitment. A general email can be sent or a call can be made to the companies. Alternatively, a clause in a contract can be highlighted to show steps that can be taken if certain volumes are not reached. Optionally, a contract for that particular customer can be sent as an attachment.

Other fields for a customer summary can include but are not limited to a plotting of price curves over time, such as a first price given, a current price. As volume is ordered in the DealRoom, the fields can change in real-time such that the customer and the sales representative can view the new price that was reached and when it would be in place.

Volume Tracker for Recording Price Breaks of Customers

A volume tracker can be set to show how volumes will be calculated. For instance, all companies using a product can be grouped along their respective price curves. As a volume is recorded for all companies, the price curves will be adjusted accordingly. Furthermore, a rolling average can be employed, 90 days, for example, to level out the volume and reach a suitable price drop. For instance, month one may record 100,000 statements, month two 150,000 statements and month three 200,000 statements. The system would generate an average of 150,000 statements and then record that on the price curves of registered customers. An email confirming the price drop can be sent with a link to promote this service to other companies. The supplier can select to group by any number of criteria, including those entered during the registration process (e.g., by type of business, volume per month, competitor . . . ).

When the supplier sets this feature, the information can be updated on an online contract for the supplier. For instance, if an agent decides to group a collection agency of 5,000 statements with other agencies, such option will be selected and automatically displayed in a contract that can be sent to the customer or posted in a DealRoom for the customer to select and accept. The contracts can vary across a assortment of criteria.

Tracking Sales Funnel

A sales funnel can be created by a supplier to show a status of registered customers. Menus can be employed to facilitate tracking sales. For example, a sales representative could use standard drop down menus to select a status for customers (e.g., in process, lost sale, sold). Also, menus could include references to falling price curves, such as, "call customer when price reaches x with the ability to insert the price point here." This information can be sorted and filed accordingly, and as the volume reached that level, a notice could be sent to the sales representative and/or the customer. Also, price points and volumes of all customers who elect this option can be sorted at any time in the event the agent wants to assemble the list and see how much volume or gross margin is available at what price points. Also, a percentage close figure can be input such that if 70% of this volume were to close, the figures would automatically be shown for revenues, margins, volume, and the like. Furthermore, it should be appreciated that this feature can be applied across any number of customers.

Predictive Closing of a New Customer

Once a status of customers has been updated including companies that are inactive (e.g., sold or lost), the software can develop a profile of the company that is most likely to result in new sales. For instance, if 75% of all closed business came from companies doing 5,000 statements a month, in-house, and within the collection industry, this profile would be applied to new registrants marking similar companies as a high potential close. Furthermore, a ranking system could be devised as well with colors and icons marking the level of close rate predicted. Likewise, a suggested price point could be given based on collective experience recorded in the software and a probability of closing at these price points. All of this information can be filtered, sorted and graphed so an agent is able to optimize the time spent closing the business and maximizing the firm's profits.

Print Optimizer—Using Intelligent Print Signals

A print optimizer allows a printer to have multiple print facilities set-up in multiple locations, and uses demand aggregation software to collect files and optimize accordingly.

A profile of the file is contained within a print signal. The profile includes but is not limited to information such as, what file is being transferred, what classification is included, an identification number. An example might be: This file has 5,000 statements of 8.5 by 11 inch print requirements, black ink, white paper with visa and mastercard imprints, NCOA, print requirement within 24 hours, return envelope included in 50% of those marked, zip codes listed with the total number of 25 in zip code 44145, 35 in 44110.

Software is able to take such print signals and, based on current print runs across multiple locations, redirect individual prints to a printer that optimizes the print runs. For instance, 5 printers in Cleveland, 2 printers in Omaha, 4 printers in Reno and 2 printers in Orlando can all be networked via this print optimizer program. The system can read what is being printed currently, and also what is in the queue. The software takes the new print file and, based on a variety of settings (e.g., lowest cost possible), the file will be routed to the printer with the optimal sequence. A number of variables can also be set in the software including time required to print and mail (e.g., 24 hours, average 8 hours in lettershop so print run must be completed in 15 hours within one hour of transfer time). Also, the print signals of multiple companies can be collated where there are noted efficiencies (e.g., postage going to a 44999 zip code can be combined automatically to create a new print id and be optimized accordingly. This new file is now sent to the printer that offers the lowest per unit cost). Other features include, but are not limited to, such items as fastest time to process, lowest postage costs, lowest print cost, two colors if available for x price, and optimize NCOA process. Thus, new print runs are constantly created and recreated based on multiple criteria interacting, as well as priorities set among certain customers (e.g., large customers are optimized first and smaller companies are joined accordingly).

Additional Print Stream Options

Option #1:
1. Receive print stream in an ASCI II or comma delimited file (FTP) from customer.
2. Ability to take information and set-up (map) contents into standard formats (letters) for printing and mailing
3. Ability to identify characteristics of the print stream and default to one of these standard letters (or customized according to customer request) and save to the name and password of customer
4. Able to receive these FTP files in the future (name and password originated) and filter through the letters automatically, mapping the contents to the letter's specification
5. Taking the finished print stream and forwarding to the printer directly (no intervention required) for printing and mailing Option #2:
1. Ability to have a sample letter of the customer scanned and saved to printer and/or printer software (identification given)
2. FTP's are sent to the software connected to the printer
3. The software maps the information according to the samples given and they are saved in memory with the FTP file marked 4. Whenever the FTP is received the information is formatted automatically and then the printer begins printing the information accordingly In addition, formats can be saved under various software codes, for example, Customer 1 standard print format, Customer 2 standard print format and be referenced for automatic set-up of a print file. Likewise, particular preferences of the customer can be saved including but not limited to the following: mail within x number of hours of receipt, and/or hold for up to 3 days for the lowest postage rate attainable.

Print Wizard

A print wizard can walk a person through a set-up of having their print file ready for online printing and presentation. After registering online, the customer is walked through a series of questions such as: What type of billing software do you use? The customer may then utilize a drop-down menu to select a type of software. Furthermore, if one is selected, standard invoicing layouts may be shown (e.g., sample A, sample B . . . ). The customer can then select the type of invoice that should be set as the default. The customer, furthermore, can then identify and modify anything that is listed (e.g., color selected, font size adjustments). The customer can also insert the logo that is to appear on the form, along with any other pertinent information (e.g., PAST DUE in capital letters). Finally the customer can press Save to lock in that particular invoice. Additionally, that format can subsequently be saved to the customer's name and password and the customer is asked: Do you want to create another Invoice Format? If yes, then the process is repeated. If no, then the person is asked to confirm the final layout.

Once all invoice formats have been created, then the person is asked to submit the FTP file on the same site. Once completed, the program takes this file and formats accordingly. A sample is created for the customer for final approval.

If an option has been selected, the rest of the file is run through the program as errors are corrected (e.g., referenced against the NCOA—national change of address). Any changes are listed for the customer to copy this file and import into the billing package for correction. Other options include call forwarding (e.g., checking the proper phone number for the individual).

A total count can then be provided to the customer for example, 250 invoices ready to print, 25 of these invoices corrected, and another 20 invoices have incomplete mailing address. Optionally, the print file will also have the information of those customers prepared to receive electronic billing information. Thus, an additional 30 invoices may not be printed but emailed according to the information contained within the FTP file and set-up. The customer can be asked: Do you want to print and mail the 250 ready invoices? If yes, the information is then sent to the printer. At this point, additional information may be sent back to the customer including but not limited to such things as: the number of pieces ahead of your print stream, estimated time of printing in hours or minutes, and current postage rate.

Optionally, the customer can specify how to receive a confirmation that the pieces have been printed and mailed including, inter alia, a phone call, email confirmation after the print, email confirmation after they have been mailed, and/or posting on private website. As another Option, the customer can specify how the file should be saved (e.g., posted on mainframe for future searches, saved to a CD ROM, zip drive).

The remaining 20 invoices that were identified as having incorrect mailing addresses can be sent back to the customer to check and modify. However, they can be corrected while the customer is on the site and then resubmitted, or alternatively they can be downloaded and corrected by the customer at a later time.

Furthermore, it should be noted and appreciated that at any time during the this process, the customer can provide a credit card or agree to another form of payment such as electronic billing.

.Net Option for the Universal Printer

A .NET option provides the ability for print information to be encoded in an intermediate language (IL) which is set-up with an approved printer(s).

Scheduling software connected to the printer and billing software of the customer can speak to one another. For example, the customer's system can generate print information. Such information can then interface with the printer's software system, creating a standard print format or wrapper for any series of printable and/or mailable documents (e.g., invoice, collection letter, UB92 document, water bill . . . ) either in hard form or electronic.

The print information contained within a wrapper would prompt the printer's system to take this information and format according to a multitude of options existing within the printer's system. The options are then served up in a page generated by the system. If various options are available, the information would present itself on the page seen by the customer. Once configured, the information is then stored and identified with the print contents from that source.

The print file can be sent as frequently as desired by the customer. Furthermore, it should be noted that the print file can be set automatically or semi-automatically.

A demand aggregation component could also be available to the print system, as the price would vary depending on when the statements had to be mailed. A default in the wrapper could be set-up to contain such elements (e.g., print at lowest postage rate).

Pre-Built Print Stream Components

Figure 24:
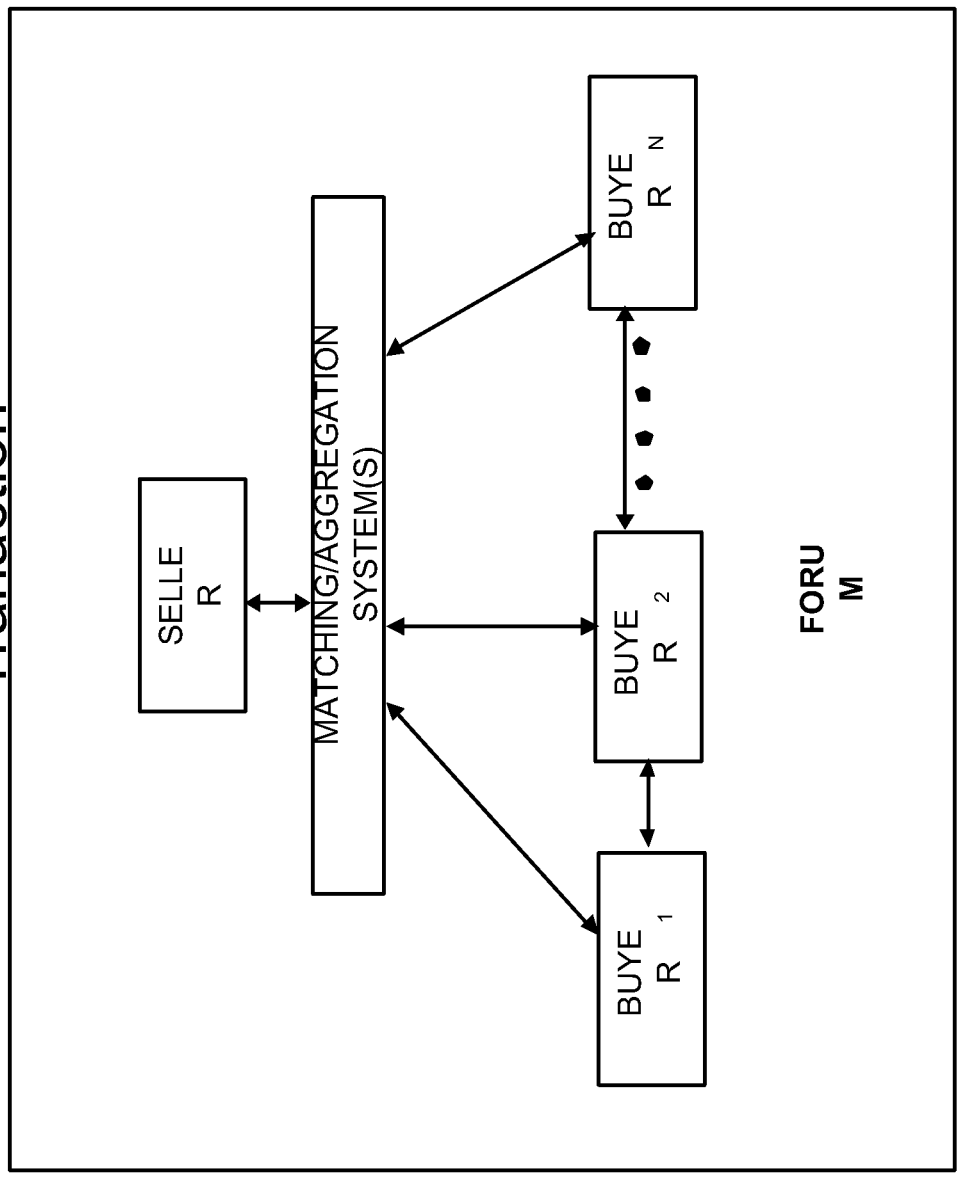
FIG. 24 is a schematic illustration of an electronic forum for conducting a seller sponsored business transaction.
Figure 25:
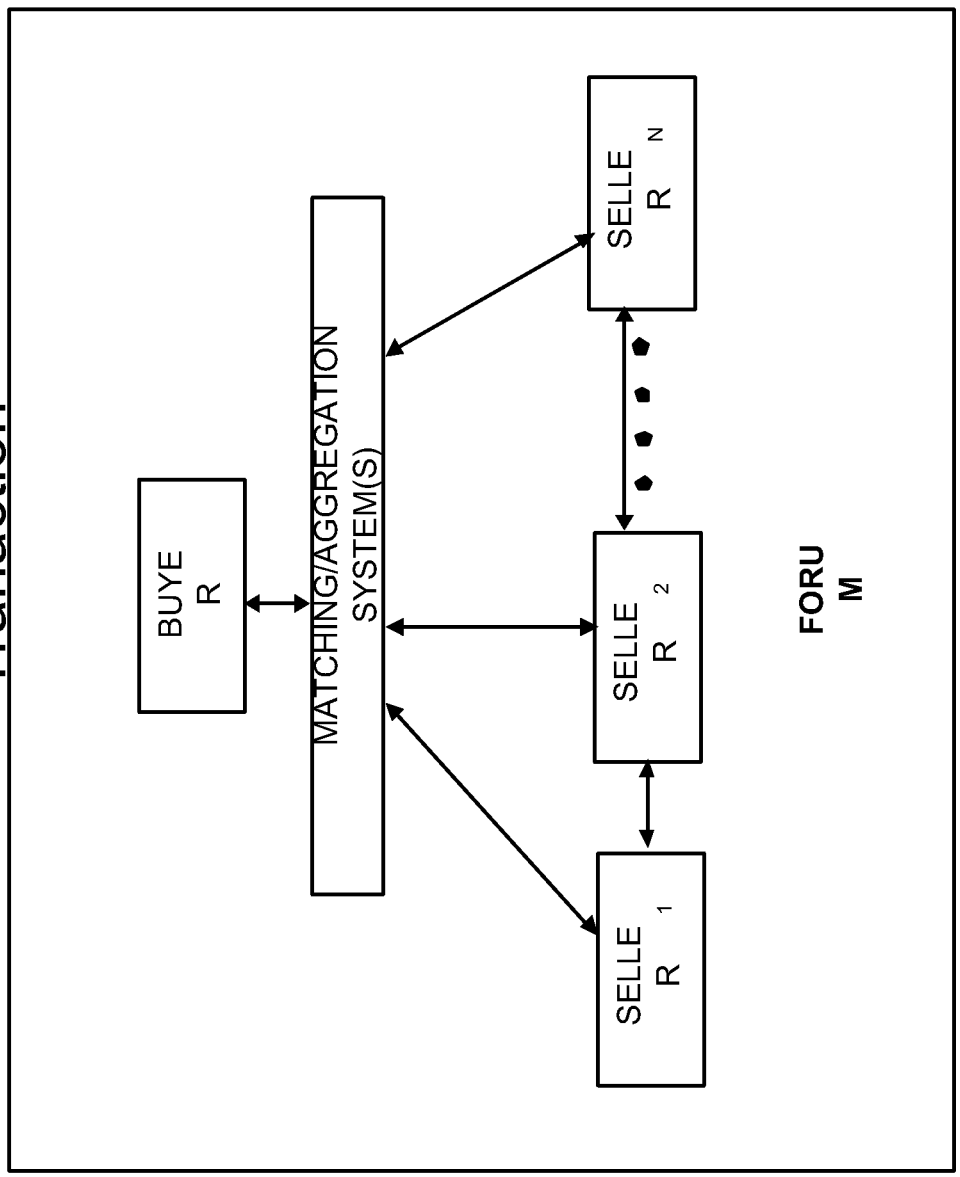
FIG. 25 is a schematic illustration of an electronic forum for conducting a buyer sponsored business transaction.

Pre-built print stream components can be made available to developers creating e-enabled solutions online where printing, mailing, and electronic billing in any of its forms are deemed beneficial. For example, a software vendor can include a component to have print streams set automatically to an IP address of the default printer(s) listed. A customer can turn a printer of choice on or off. A standard invoice could be selected within the software itself and communicated with the printer's address to set-up a print service from the customer's location. A registration page along with billing procedure and other options can be determined Additional or Alternative Aspects of the Present Invention Buyer Sponsored Deal Room Regarding FIG. 25, although the present invention has been largely described within the context of a seller sponsored deal room (See FIG. 24), it is to be appreciated that a buyer or buyers may sponsor a deal room to aggregate purchasing goods/services from a plurality of sellers. For example, a large corporate buyer may employ the present invention to create a deal room where a plurality of sellers may assemble to aggregate selling of specific goods and/or services that the buyer desires. Such a transaction facilitates the buyer satisfying purchase requirements in one forum and to coordinate deliver of goods/services. Furthermore, such a system facilitates sellers making sales to the buyer, which but for the sellers being able to aggregate the buyer may not have dealt with the individual seller because of insufficient capacity to meet the buyers needs. The subject specification describes exemplary systems and interfaces for implementing the subject invention, and therefore further discussion thereto is omitted for sake of brevity. However, it is to be appreciated that one skilled in the art based on the above discussion regarding seller sponsored deal rooms/transactions could apply such teachings to implement the aforementioned buyer sponsored deal room/transaction.

Multiple Buyer and Multiple Seller Sponsored Deal Room/Transaction

Figure 26:
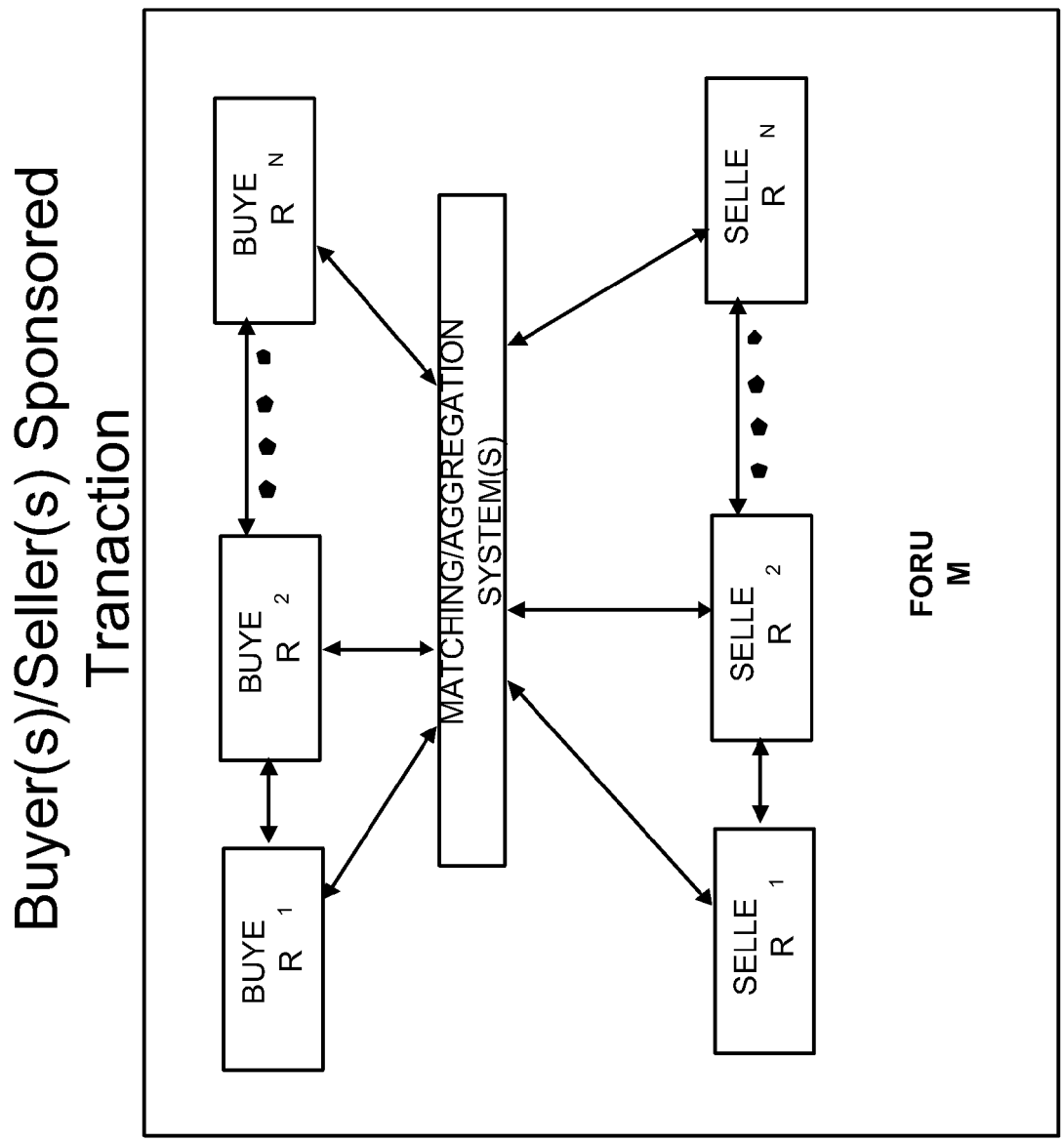
FIG. 26 is a schematic illustration of an electronic forum for conducting a buyer and seller co-sponsored business transaction.

Regarding FIG. 26, although the present invention has been largely described within the context of a seller sponsored deal room/transaction, it is to be appreciated that buyers and sellers may concurrently sponsor a deal room/transaction to aggregate selling of and purchasing of goods/services by a plurality of sellers and buyers respectively. For example, a multiple sellers and buyers may employ the present invention to create a deal room/transaction forum where a plurality of sellers and buyers may assemble to aggregate selling and buying of specific goods and/or services that the sellers which to sell and the buyers desire to purchase. Such a transaction forum creates great efficiencies with respect to purchase price and/or selling quantity of particular goods/services. For example, in such a forum dedicated to the selling and purchasing of a specific product/service, sellers can assemble to compete for the sale of their respective product/service which leads to pricing efficiencies. Buyers can assemble in such a forum to aggregate buying power in order to negotiate good prices and close deals. Sellers on the other hand may also aggregate to meet the needs of a large buying block. The subject specification describes exemplary systems and interfaces for implementing the subject invention, and therefore further discussion thereto is omitted for sake of brevity. However, it is to be appreciated that one skilled in the art based on the above discussion regarding seller sponsored deal rooms/transactions could apply such teachings to implement the aforementioned buyer sponsored deal room/transaction.

OpenOffer Management System

One alternative aspect of the present invention affords for creating, altering and/or managing OpenOffer sheets on more than one Private DealRoom at the same time.

This aspect of the invention (preferably implemented via software) enables the company completing an OpenOffer Sheet to select those private dealrooms it wishes to submit the OpenOffer sheet. For example, a first OpenOffer sheet with one price and volume schedule may be automatically submitted to DealRoom #1 and #2. A second OpenOffer sheet can be submitted for the same product with different price points and volume schedules to DealRoom #3. The system enables a supplier to track any number of dealrooms and label a customer accordingly. The supplier may create subsets of private dealrooms at any time through grouping the dealrooms and saving them with a different name (e.g., —mid-size companies, tier one, large company). This enables the supplier the real-time ability to segment all or some customers according to any number of criteria and present current pricing and capacity information. Therefore, the system is a tool for creating any number of pricing configurations among different products and updating those prices and volumes in a moment's notice among the selected dealrooms.

A company is able to see a pricing summary by product type across all dealrooms. For example, the ability to select a product category and have the system return a list of the prices submitted for each along with the current price and the lowest price to be achieved. This allows for the company to track pricing strategy across all dealrooms. The information can be reviewed in any number of configurations: pie chart, bar chart, scatter chart, etc. and any subsets of dealrooms. Statistical numbers are also available including totals, averages, etc.

The system also provides a running list of all buyers that have access to all DealRooms supported by the company. This is done through a search file in that private dealroom and saved to the master management system. Every dealroom has a different URL such as WCeWinWin.com or ADeWinWin.com with the requisite security. The system is also capable of performing a search by entering the customer name which then provides the proper dealroom and password. Changes may be made by the supplier.

The option to have an OpenOffer Sheet posted on a regular interval and/or to have it programmed to reset the offer with a rolling date (e.g., —daily, weekly, bi-weekly, monthly) is available on the master and individual sites. In addition, the ability to alter a component(s) of the OpenOffer Sheet and save that variation under a different stored name is possible. For example, if price is selected to stay constant while the ship date changes to the next business day on a regular interval, that openoffer sheet can be saved and posted. The iteration will change with the passing of time. Likewise, the function of freezing all OpenOffer sheets with or without intervals is possible with a simple freeze command.

The ability to retract a previous OpenOffer sheet is available as well. This recall feature will pull the offers from all of the dealrooms or a combination selected by the supplier. The product name and identification number can be accessed and the recall feature engaged. In the event that orders are already placed within the openoffer sheets, the supplier will fulfill the order as scheduled.

The supplier can also list and search openoffers that have no orders. This is done with a quick search that will pull up the openoffers, dealroom URL, projected ship date, etc. The master list can be perused and when highlighted, the supplier has the option of modifying the information accordingly and then post again within the specified dealrooms. Such changes as price, volumes, ship dates, close dates, etc. can be made and the new dealrooms submitted.

The ability for a supplier to create another dealroom online instantly is available. The option is resident on particular website (e.g., the current site). The supplier highlights a create new dealroom option and is presented with the room identification number and the base URL. The supplier is asked to name the URL with up to a certain number of digits. Once the name and administrator's password is selected, the new dealroom is available. Additional information including contact name, e-mail address of contact, etc. is resident.

The ability for a company to create a private dealroom online for invited buyers is provided. The invited buyers are notified of the opening of the dealroom and given a username and password, so that there name remains anonymous. Preferred customers can also be given special pseudonames, so that they can travel from dealroom to dealroom, while maintaining their anonymity from reports generated by other suppliers and buyers utilizing the OpenOffer Management system. The option of automatically sending e-mail notification of the deal to preferred customers is provided.

The ability for a company to create a private dealroom online, without revealing their identity is provided. The supplier can enter a psuedoname and basic company criteria, such as the type of company (e.g., fortune 500, midsize, small), quality ranking, type of business (e.g., specialized, conglomerate). The company can then track purchases and demand utilizing the psuedoname. The dealroom can be configured to be offered to a specified group, such as distributors or preferred customers, or the general public as a blind offer. The deal room can be configured as a single order deal or as a time specified deal that allows buyers to aggregate in and reduce the price.

The ability to request transaction fees in real-time across all dealrooms. The fee structure is applied for that customer based on the number of single transactions (e.g., completion of openoffer sheet by customer) and this figure is calculated accordingly for an online transactional fee.

Demand Aggregator System

This aspect of the present invention (preferably implemented via software) captures and collates either all current or historical orders from all OpenOffer sheets.

An OpenOffer Request Form enables a buyer on the system to alert suppliers of the product needed, category, quantity and when shipment is required. This allows the suppliers to respond with OpenOffer Sheets that match this need. The alert is by e-mail to the designated address given by the supplier. The buyer can request a private deal room, so that the identity of the buyer remains anonymous. The buyer can provide a psuedoname or an e-mail address, so that the supplier can notify the buyer or post a message to the buyer.

An OpenOffer Request Summary is available by product category. For instance, the supplier may wish to aggregate requests from all dealrooms by product category. In this way, the supplier may see the level of demand required by its buyers in advance of placing an OpenOffer for the product. This feature can be accessed in real-time. An icon can be clicked to show the summary of products being requested and pertinent data related to shipments. Excess capacity can be priced to preferred customers.

The ability to compare current orders for a product on a timeline with the aggregated volume received from OpenOffer Requests for the same product and requested ship dates is available. This aggregation and comparison enables the supplier to better estimate production estimates and forecasts. This allows for better planned production and the ability to evaluate the cost savings in terms of labor, material, production runs, etc. which, in turn, enables the supplier to estimate the savings and prepare the appropriate price and volume points.

A search engine system is included for searching for deals over different supplier sites including the particular product requested.

Other information included in the system:
Total capacity posted by product, total, timeline, etc.
Total number of orders placed by product, total, timeline, etc.
% of capacity remaining by each product category measured over the timeline
Average price per product by product category, by dealroom, by customer, etc.
Historical timeline of product ordered, average price, breakdown by dealroom, . . .
Historical review of total capacity listed by product that went unpurchased
Historical review of total orders over days, weeks, months, quarters, etc.
Chart of top customers for each product line
Projected sales taking historic information by product and extrapolating over time by weeks, months, etc.
Trend analysis of product mix over periods of time
Ability to evaluate the volume of unpurchased product over the upcoming months and when such capacity will be taken off market (e.g., —termination of specials from completed OpenOffer Sheets with close dates)

CRM Package

The CRM package records all of this information for each buyer so that custom curves can be set-up by the supplier. Thus, the CRM package can evaluate buyer patterns and tendencies and determine the optimal price curve for each buyer, group of buyers, sub-segment of buyers, etc. Information on buyer and prospective buyers are loaded into a database that includes:
Individual name
Company name and address
Email address
Phone number
Cell number
Products purchased
Volumes
Time of purchase Other aspects of purchasing can also be included, such as, times purchased, number of visits before order, price point at first visit, second visit, products ordered, etc. The record can also included information from the supplier, such as:
Whether a prospective buyer pays on time (yes or no, or ranking applied, rating, etc.)
Whether a prospective buyer gives supplier only 40% of business (potential to get more business? If yes, then buyer joins another group segmented by the supplier)
Special offers to buyers, such as, discounts and/or coupons, which may be in the form of a % off the curve or a new curve if buyer agrees to place an order during this visit.

Integration of CRM, ERP (Production Scheduling) and DAS

The following section describes how production scheduling, the supplier=s CRM package, DAS and DAS CRM can interact with one another to create a system, that adds value for buyers and suppliers. For instance, A production run can be scheduled for six weeks from now for product B with options X and Y available. The total quantity to be produced is x, and x+300 is the optimal run. The scheduler can indicate this to the Product Manager/Sales Manager etc. with the notice: Do we post the remaining quantity in the DealRoom? Alternatively, the software can be written to automatically post these offers to the DealRoom with the same ship date, fob point, etc. populating accordingly to the buyers listed in the DealRoom/CRM package. Once the curve is created and confirmed (automatically or semi-automatically by the other party), the curve is posted in the dealroom and the emails alerting the appropriate buyers (as listed in the CRM) and internal people (e.g., sales, inside customer service, etc.) are sent. Multiple curves may be sent, linear offers may be prepared (e.g., show curve 1 for 24 hours, if not takers post curve 2) or any number of other features may be included as listed in this patent application and other applications. Further elaborating on this feature, the software can be configured with a series of if, then instructions:
Post to first buyer B price curve A
Post to second set of buyers B price curve B
Post to third set of buyers B price curve C Additionally, the system allows for the supplier to change the sequence and the time between offers (first offer may be for A, if no orders or a certain thresholds not ordered then offer B and C concurrently with linked curves).

If an order were to be received online in the DealRoom, it would automatically populate the production schedule with quantity ordered and other specifics and/or the order entry software. Likewise, if an order can in from the order entry system, the change would be reflected in the DealRoom (e.g. B capacity changed, minimums changed, curves changed, etc.). A Astimulus@ event would impact the other parts of the system, and show up as a way to price out the available capacity. Likewise, cancelled orders/changes to production runs would immediately change the offers and order entry data. If the total quantity has been ordered, a notice would be sent to production regarding additional capacity/quantity?

A change in the production schedule would also alert the Marketing/Sales Manager of available capacity and the ability to add to the curve. The cost curve for the product is also available for viewing. The manager can determine what price curve should be set. Also, customer feedback as to when they would like to receive their next order can be tabulated and sent to the production manager. The production manager can put into the schedule and agree to the total volume optimal in the run. The Marketing Manager is notified, approving of the offer specifics and the buyers to be contacted, and the order entry software is also contacted with the information and is shown on the screen for internal order takers/sales representatives. The data collected from the order entry system regarding the customers who ordered, their volumes, prices, etc. can be shared and inputted into the CRM package for data analysis. Buyer spending limits set in the order entry system can be set and carried across to the DAS DealRoom. A credit system/amount available can also be referenced in the software and indicated to the buyer and supplier. If the buyer attempts to exceed his limit, a notice is given that he is doing so and needs to speak with the supplier. The order has not impacted the curve at this time.

Telemarketing Software

Telemarketing software is a component of the CRM that provides for increased functionality within the Demand Aggregation System. More specifically, the software provides for search functionality (e.g., searches on first name, last name, company, city, state, zip code, phone number, fax number) and sort functionality (e.g., sorts by first name, last name, company, interest level). Furthermore, the software provides telemarketers with individual profiles which enables telemarketers to, inter alia, view info, edit info, transfer their contact over to someone, take notes and follow up on any contact. Each follow up is customized for each marketer. Accordingly, they can view, for example, top five closest follow-up users. There is also a reminder when there is about five minutes left before the follow up is due. In addition, a marketer can open a profile, snooze for certain period of time or dismiss the follow up. The telemarketing software also allows marketers to make list on such things as company, category, subcategory, interest level, marketer, invoices, state, contact date, and the like. Additionally, marketers may utilize a tree view provided by the software, which is beneficial in narrowing a search by company, category, subcategory or interest level. The tree view also highlights the users in red if they don't want to be called again. Finally, the telemarketing software allows action managers to add new companies, categories or subcategories to the system.

Customized Registration Page

Registration pages can be customized according to a company utilizing qualification questions, which can automatically populate a buyer profile (e.g., name, title, company, address, what is purchased, volumes, current prices, type of software used). A customized registration page provides for additional functionality such that the page may send automated email to a specified user when someone registers. Additionally a customized registration page may take information from current profile and assign a price curve automatically (e.g., set in the software by licensee). For instance, a company that lists $0.42 per pound as the current price for product X will have generated a graph that shows the price curve starting at $0.41 for the buyer and going to a predetermined price over specific volumes of orders. Within the HTML that is sent with this price, the customer has the ability to accept this offer by clicking on the "accept" button. Alternatively the button would trigger access to the DealRoom with that particular curve loaded, confirming the name and password and copying the supplier and other noted parties. An email would confirm buyer's active status.

Sales Representative View

A category page can be customized for a sales representative such that they see only those DealRoom specifics requested which include but are not limited to sub-DealRoom, price points, companies participating, those companies who have ordered in the last 24 hours, 48 hours, week, those companies within a certain territory (e.g., Ohio), and by product. Furthermore, the representative view can be broken down by each DealRoom within company.

Customized Company Confirmation Email

When a user is initially given access to a DealRoom, a confirmation email can be sent out automatically according to the company. As a reminder, a username and password can also be sent to the user. Additionally, the date an email was sent can be displayed in an individual user profile.

Do Not Allow Order

The orders will not be placed through a company if an allow order bit is set. This could be set when creating a new company or editing a new company under action manager.

Customized Category Page

Customized Category pages allow Buyers to see only what company administrators want them to see. In particular, these pages may restrict what a buyer is able to see on the category page. Such restrictions can be set under a company admin page.

Customized Offer Page

Customized offer pages can restrict what a buyer will see on the offer page. This restriction can be set under the company admin page.

Delete DealRoom

This is a function an action manager can employ to delete any DealRoom not being used as well as product categories.

Password Retrieval

Users can enter their username, or last name, state, and zip code to retrieve their password. If the email address was blank then the email will be sent to a system administrator or a default user email address.

Business Monitor Update

This allows Action managers to be able to go directly into a user's profile by clicking on their name.

Action Manager CRM Updates

The action manager includes the power to view and modify CRM data as follows:
  Info: displays users profile and current notes.
  Edit: edit user information at anytime. This also displays when the user accepted the terms & conditions of the system administrator, a supplier, and also when their confirmation email was sent out to them.
  Customer access: Here one can see where the user has access. Additionally, access rights can given and taken away at any time.
  Product: Here, and individual will see all of the products where the buyer has placed an order(s), and on the right all of the products that he has access. If the person is interested in any of the products, those products can be added to their interest list.
  Tracer: in this instance software provides the ability to trace people on system administrator DealRoom(s), search by day, see history over a period of time, graph by individual buyer (e.g., what products they have reviewed compared to what they have purchased). Additionally, software tracks history of products reviewed by customers and determines patterns in behavior. Furthermore, to facilitate tracking the software may produce a may a graphical indication (e.g., a box) after a customer has ordered or previewed one item.

Mass Offer Loader

The mass offer loader facilitates copying offers in mass numbers by having the option exist in a copy function on the screen. The user can specify what offers can be copied and confirms.

Offer Linker

An Offer Linker enables linking offers in the same dealroom by clicking a single icon. This allows a price drop on some or all of the linked offers.

Mass Price Loader

Loading many products can be a long process. To speed up the process one can skip the step where they have to enter the price breaks and the prices. When done loading products, the user can go to a price loader under action manager control center. Then, the user selects a company and chooses a category where products have been saved. The next step is to enter in a number of price breaks needed. Then enter in starting order and percentage value, a list price for each product and press hit submit. A calculation for each tier will be given. A Load Price function can insert a price for each product or go back and modify a List Price. However, it should be noted that if you don't want to add a price for a certain product, or if you already have a price added for the product, you can leave the list price field blank. The mass price loader will skip over that product automatically.

Mass Offer Linker

The mass offer linker links offers in common DealRooms. Consequently, quantity ordered on one offer will reflect on linked offers. This allows any number of offers to link at one time more quickly. Moreover, this is lot faster than other offer linkers, and no other tables need to be added to the database. Furthermore, it should be noted that be using View/Unlink offers, a user can view which offers are linked, and unlinked offers at any time.

Customize Product for a Specific Customer

Here, a customer gets a specific price on a product which is edited by an Action Manager or supplier directly. More options can be added or deleted as well.

Supplier Order Details Page

This page enables viewing of orders placed between specified time periods. Further, it should be noted that orders can grouped by products on this page.

Category Contract Price

A customer gets a specified contract price within a category. Thus, the customer does not have to pay above that price, however, if the price dropped below their contract price they get that price.

Edit Current Order

Customers are able to edit orders by adding more to the order or changing options. The current orders can be listed on a welcome screen when the customer logs in.

Offer Price Drop Notification

An action manager screen allows an administrator to determine who receives emails for a particular company. Every time there is a price drop on any offer in that DealRoom, that individual will get an automatic email with details on that offer.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An electronic business system, comprising:
  memory that stores computer readable instructions;
  at least one processor coupled to memory, the processor executing the following computer readable instructions stored in memory to perform a method for offering a volume discount to a plurality of buyers over a finite period of time, the method comprising:
    maintaining respective customer profiles associated with current and prospective customers;
    determining a likelihood of a potential recipient of a volume discount offer offered over the finite period of time to make a purchase associated with the volume discount offer, the determination based at least in part on the respective customer profiles; and
    presenting the volume discount offer to the potential recipient upon the estimated likelihood value exceeding a predetermined threshold.

2. The system of claim 1, wherein the computer readable instructions are further executable to implement a Bayesian-based artificial intelligence technique for generating at least a portion of the respective customer profiles.

3. The system of claim 1, wherein the computer readable instructions are further executable to implement a Bayesian-based artificial intelligence technique for generating the likelihood value.

4. The system of claim 1, wherein the computer readable instructions are further executable to implement a follow-up process with the potential recipient following presentation of the volume discount offer, wherein the follow-up process includes determining a strategy for soliciting the potential recipient in connection with the volume discount offer.

5. The system of claim 1, wherein the computer readable instructions are further executable to implement a follow-up process with a provider of a product or service associated with the volume discount offer, wherein the follow-up process includes determining a strategy for soliciting the potential recipient in connection with the volume discount offer.

6. The system of claim 1, wherein the computer readable instructions are further executable to construct a list of current and prospective customers in accordance with at least information provided by a merchant associated with the volume discount offer.

7. The system of claim 1, wherein the computer readable instructions are further executable to update the likelihood parameters in accordance with at least information provided by a merchant associated with the volume discount offer.

8. The system of claim 1, wherein the computer readable instructions are further executable to monitor a behavior of the potential recipient whereby the volume discount offer is revised based at least in part upon the behavior.

9. The system of claim 1, wherein the computer readable instructions are further executable to monitor broad market pricing information whereby the volume discount offer is revised based at least in part upon the broad market pricing information.

10. The system of claim 1, wherein computer readable instructions are further executable to maintain customer feedback associated with the volume discount offer, whereby the volume discount offer is revised based at least in part on the customer feedback.

11. A computer-implemented method for providing a volume discount offer to a plurality of buyers over a predetermined period of time, the method comprising:
   executing non-transitory computer readable instruction stored in memory to maintain a list of current and prospective customers;
   executing non-transitory computer readable instruction stored in memory to maintain respective customer profiles for one or more of the current and prospective customers;
   generating a likelihood value of a potential recipient of the volume discount offer to make a purchase associated with the volume discount offer based at least in part upon the respective customer profiles; and
   transmitting the volume discount offer to the potential recipient upon the estimated likelihood value exceeding a predetermined threshold.

12. The computer-implemented method of claim 11, further comprising employing a Bayesian-based artificial intelligence technique for generating at least a portion of the list of current and prospective customers.

13. The computer-implemented method of claim 11, further comprising employing a Bayesian-based artificial intelligence technique for generating the likelihood value.

14. The computer-implemented method of claim 11, further comprising employing a customer follow-up process in connection with the potential recipient following the presenting the volume discount offer, wherein the follow-up process includes determining a strategy for soliciting the potential recipient in connection with the volume discount offer.

15. The computer-implemented method of claim 11, further comprising employing a merchant follow-up process in connection with a provider of a product or service associated with the volume discount offer, wherein the follow-up process includes determining a strategy for soliciting the potential recipient in connection with the volume discount offer.

16. The computer-implemented method of claim 11, further comprising accepting at least one variable parameter in connection with the generating a likelihood value.

17. The computer-implemented method of claim 11, further comprising examining activity of the potential recipient and presenting or updating the volume discount offer based upon the activity.

18. The computer-implemented method of claim 11, further comprising examining extrinsic market pricing information and presenting or updating the volume discount offer based upon the extrinsic market pricing information.

19. The computer-implemented method of claim 11, further comprising maintaining feedback associated with the volume discount offer and presenting or updating the volume discount based offer upon the feedback.

20. A non-transitory computer readable storage medium having embodied thereon instructions executable by a processor to:
   construct a volume discount offer that includes a discounted price for a product or service that varies as a function of a potential recipient of the volume discount offer;
   maintain a list of current and prospective customers;
   maintain respective customer profiles for one or more of the current and prospective customers;
   generate a likelihood value of the potential recipient of the volume discount offer to make a purchase associated with the volume discount offer based at least in part upon the respective customer profiles; and
   present the volume discount offer to the potential recipient in response to the estimated likelihood value exceeding a predetermined threshold.

* * * * *